United States Patent
Wang et al.

(10) Patent No.: US 11,528,098 B2
(45) Date of Patent: Dec. 13, 2022

(54) METHOD AND APPARATUS FOR TRANSMITTING HYBRID AUTOMATIC REPEAT AND REQUEST INFORMATION IN A WIRELESS COMMUNICATION SYSTEM

(71) Applicant: Samsung Electronics Co., Ltd., Suwon-si (KR)

(72) Inventors: Yi Wang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 16/961,072

(22) PCT Filed: Jan. 11, 2019

(86) PCT No.: PCT/KR2019/000456
§ 371 (c)(1),
(2) Date: Jul. 9, 2020

(87) PCT Pub. No.: WO2019/139405
PCT Pub. Date: Jul. 18, 2019

(65) Prior Publication Data
US 2021/0067276 A1   Mar. 4, 2021

(30) Foreign Application Priority Data

Jan. 11, 2018   (CN) ......................... 201810028080.X
Jan. 19, 2018   (CN) ......................... 201810055641.5
(Continued)

(51) Int. Cl.
*H04L 1/18*     (2006.01)
*H04L 5/00*     (2006.01)
*H04W 72/04*    (2009.01)

(52) U.S. Cl.
CPC .......... *H04L 1/1812* (2013.01); *H04L 1/1861* (2013.01); *H04L 5/0055* (2013.01); *H04W 72/0413* (2013.01); *H04W 72/0453* (2013.01)

(58) Field of Classification Search
CPC ... H04L 1/1812; H04L 1/1861; H04L 5/0055; H04L 1/1614; H04L 5/0094; H04W 72/0413; H04W 72/0453
See application file for complete search history.

(56) References Cited

U.S. PATENT DOCUMENTS

2017/0318566 A1   11/2017  Deogun et al.
2019/0045533 A1*   2/2019  Chatterjee ............. H04L 5/0094
(Continued)

FOREIGN PATENT DOCUMENTS

EP   3 673 607        7/2020
WO   2019/066630 A1   4/2019

OTHER PUBLICATIONS

Catt, 'Discussion on HARQ management and HARQ-ACK feedback', R1-1717834, 3GPP TSG RAN WG1 Meeting #90bis, Prague, CZ, See section 4; and figures 1-2. Oct. 3, 2017.
(Continued)

*Primary Examiner* — Vinncelas Louis
(74) *Attorney, Agent, or Firm* — Jefferson IP Law, LLP

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention provides a method of a base station for supporting an inter-system handover from an
(Continued)

---

Detect, by a UE, a PDCCH and receive a PDSCH scheduled by the PDCCH; and for one slot of one carrier, determine, according to a configured slot pattern and a configured PDCCH monitoring occasion, the HARQ-ACK occasion and the number of HARQ-ACK bits occupied by the one slot — 201

Generate, by the UE, an HARQ-ACK codebook according to the HARQ-ACK occasion and the number of HARQ-ACK bits occupied by the one slot, and transmit HARQ-ACK information — 202 evolved packet system (EPS) system to a 5th generation (5G) system. The present application provides a method for transmitting HARQ-ACK information, including steps of: detecting, by a UE, a PDCCH and receiving a PDSCH scheduled by the PDCCH; for one slot of one carrier, determining, according to a configured slot pattern and a configured PDCCH monitoring occasion, the HARQ-ACK occasion and the number of HARQ-ACK bits occupied by the one slot; and, generating, by the UE, an HARQ-ACK codebook according to the HARQ-ACK occasion and the number of HARQ-ACK bits occupied by the one slot, and transmitting HARQ-ACK information. By the method of the present invention, the number of HARQ-ACK bits to be fed back within each slot is reduced, and the feedback overhead is reduced; moreover, the number of bits of the generated HARQ-ACK codebook changes semi-statically, so that the confusion between a base station and a UE is avoided.

15 Claims, 3 Drawing Sheets

(30) Foreign Application Priority Data

| Jan. 22, 2018 | (CN) | 201810060464.X |
| Jan. 25, 2018 | (CN) | 201810074379.9 |
| Jan. 31, 2018 | (CN) | 201810097264.1 |
| Feb. 8, 2018 | (CN) | 201810128997.7 |
| Feb. 27, 2018 | (CN) | 201810162483.3 |
| Apr. 2, 2018 | (CN) | 201810284380.4 |
| May 10, 2018 | (CN) | 201810443350.3 |
| Jul. 4, 2018 | (CN) | 201810725007.8 |

(56) References Cited

U.S. PATENT DOCUMENTS

| 2020/0092880 | A1* | 3/2020 | Choi | H04L 5/0094 |
| 2020/0235866 | A1* | 7/2020 | Liu | H04L 5/0094 |
| 2020/0358487 | A1* | 11/2020 | Yang | H04L 1/1614 |

OTHER PUBLICATIONS

NTT Docomo, Inc.,'DL/UL scheduling and HARQ management',R1-1720822, 3GPP TSG RAN WG1 Meeting #91, Reno, USA, See section 2.2. Nov. 18, 2017.

ZTE et al.,'On the support of different numerologies in one PUCCH group',RP-172390, 3GPP TSG RAN Meeting 78, Lisbon, Portugal, See sections 5.1-5.2. Dec. 11, 2017.

Samsung,'HARQ Management and Feedback',R1-1720340, 3GPP TSG RAN WG1 Meeting #91,Reno, USA, See sections 2.1-4.2. Nov. 18, 2017.

Samsung, 'HARQ Management and Feedback', 3GPP Draft; R1-1716005, 3rd Generation Partnership Project (3GPP), Nagoya, Japan; Sep. 12, 2017; URL:http://www.3gpp.org/ftp/tsg_ran/WG1_RL1/TSGR1_AH/NR_AH_1709Docs/.

European Search Report dated Dec. 1, 2020, issued in European application No. 119738670.9.

* cited by examiner

[Fig. 1]
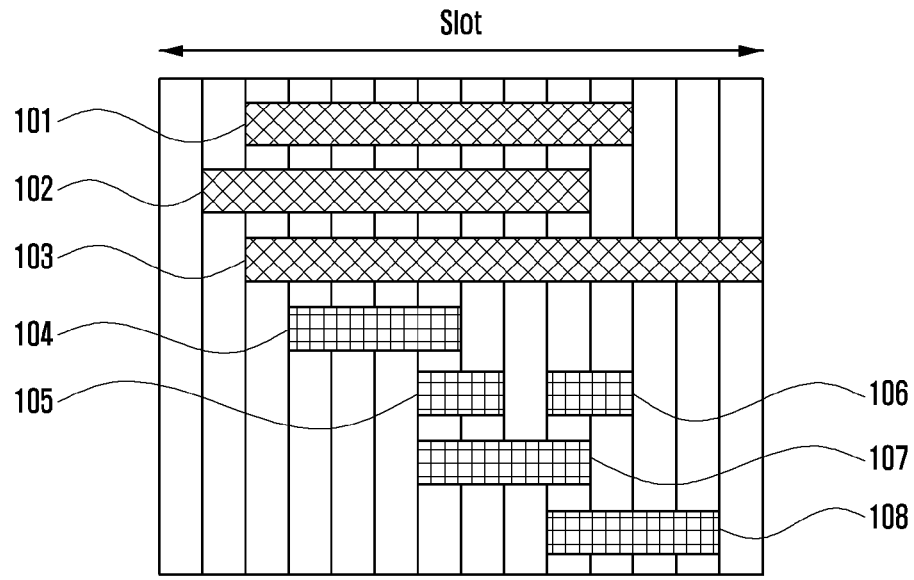
[Fig. 2]
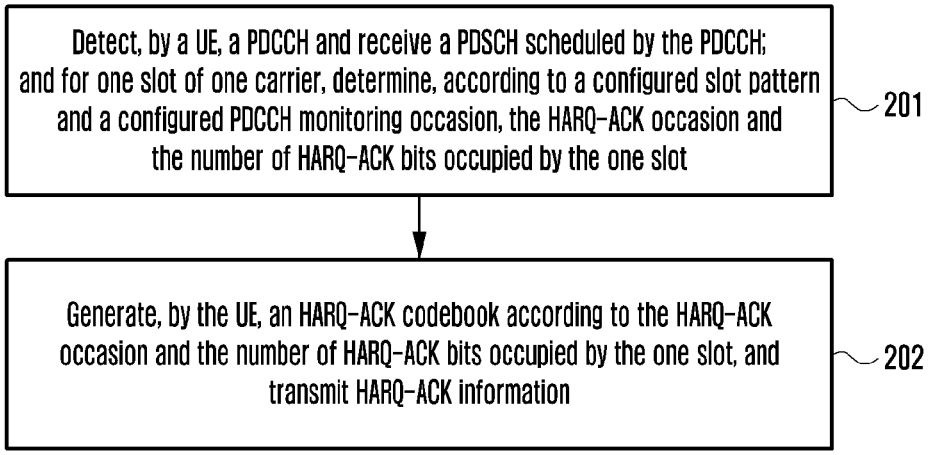

[Fig. 3]
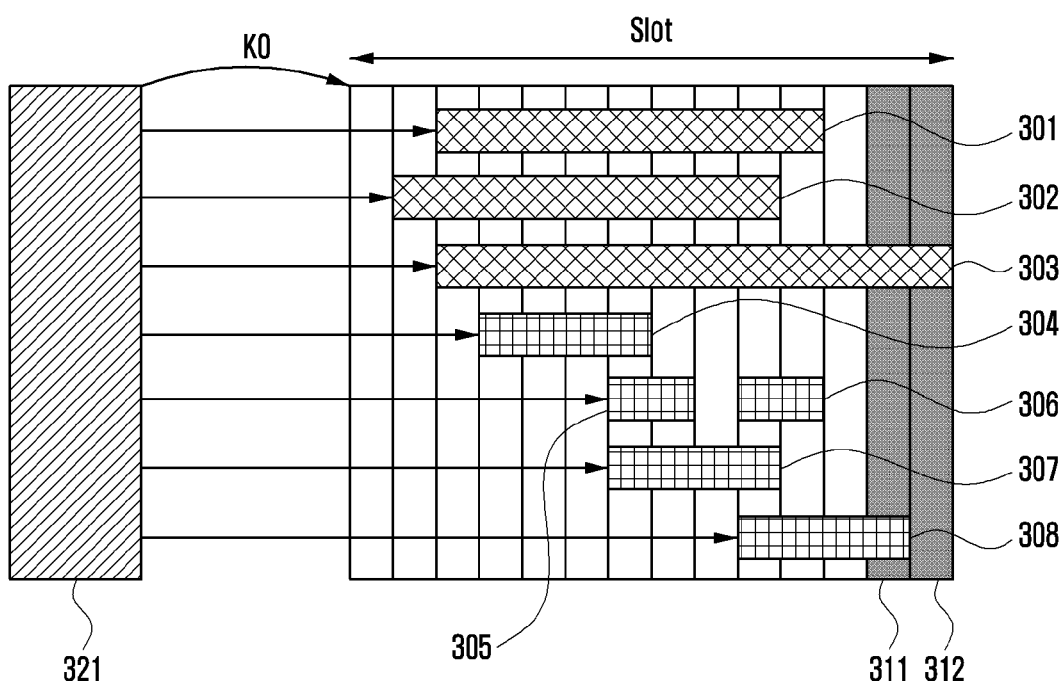

[Fig. 4]
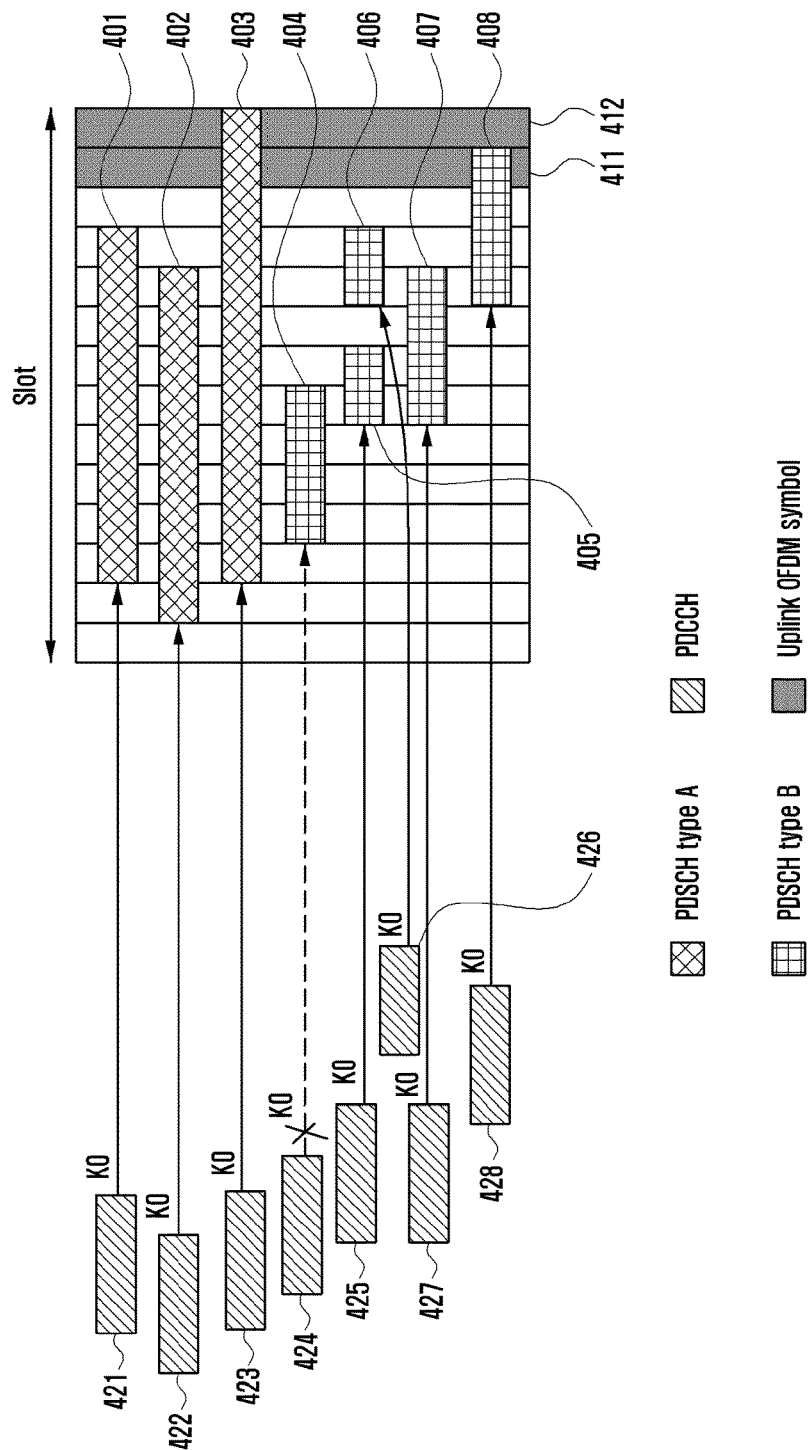
[Fig. 5]
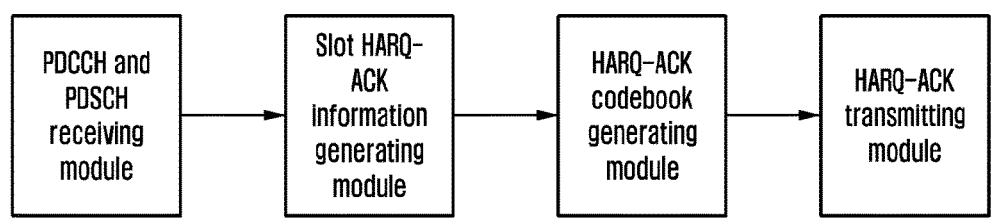

METHOD AND APPARATUS FOR TRANSMITTING HYBRID AUTOMATIC REPEAT AND REQUEST INFORMATION IN A WIRELESS COMMUNICATION SYSTEM

TECHNICAL FIELD

The present invention relates to the technical field of wireless communication systems, in particular to a method and equipment for transmitting HARQ-ACK information.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The rapid development of information industry, particularly the increasing demand from the mobile Internet and the Internet of Things (IoT), brings about unprecedented challenges in the future mobile communications technology. In response to this unprecedented challenge, the communications industry and academia have prepared for 2020s by launching an extensive study of the fifth generation of mobile communications technology (5G). In accordance with the work plan of the 3rd Generation Partnership Project (3GPP), the task in the first stage of 5G has been in progress.

The downlink transmission means that a signal is transmitted from a base station to a User Equipment (UE). A downlink signal includes a data signal, a control signal and a reference signal (pilot frequency). Here, the base station transmits downlink data in a Physical Downlink Shared Channel (PDSCH) or transmits downlink control information in a downlink control channel. The uplink transmission means that a signal is transmitted from a UE to a base station. An uplink signal also includes a data signal, a control signal and a reference signal. Here, the UE transmits uplink data in a Physical Uplink Shared Channel (PUSCH) or transmits uplink control information in a Physical Uplink Control Channel (PUCCH). The base station can dynamically schedule the PDSCH transmission and the PUSCH transmission of the UE through a Physical Downlink Control Channel (PDCCH). The uplink control information carried on the PUCCH can be classified into multiple types, including Hybrid Automatic Repeat Request Acknowledgment (HARQ-ACK), Channel State Indicator (CSI), Scheduling Request (SR) or more.

In a 5G system, a slot can be divided into at most three parts, i.e., a DL part, an Unknown part and a UL part, which are referred to as slot patterns hereinafter. The DL part can include ND OFDM symbols for downlink transmission, where ND is greater than or equal to 0. The UL part can include NU OFDM symbols for uplink transmission, where NU is greater than or equal to 0. The Unknown part can include NK OFDM symbols, where NK is greater than or equal to 0. The Unknown part represents an unknown part, that is, it is uncertain whether uplink/downlink transmission is performed on the Unknown part. In order to determine a slot pattern, one or more of methods in the following four levels can be employed.

The first level: a semi-statically configured slot pattern can be a pattern common to cells or common to a group of UEs. For example, by using Np slots as a period, a pattern for each slot within one period is configured.

The second level: a semi-statically configured slot pattern can be a pattern configured for each UE respectively. For example, by using Np slots as a period, a pattern for each slot within one period is configured.

The third level: a dynamically indicated slot pattern can be a pattern common to cells or common to a group of UEs, for example, a common PDCCH. For example, by using Np slots as a period, a pattern for each slot within one period is configured; or, within one period, a pattern for only one or more slots of Np slots can be configured, and non-dynamically configured slots can be determined according to other information, for example, a semi-statically configured slot pattern.

The fourth level: a dynamically indicated slot pattern can be a pattern determined according to a PDCCH for scheduling the uplink/downlink transmission of a UE. For example, OFDM symbols for dynamically scheduling downlink transmission belong to the DL part, and OFDM symbols for dynamically scheduling uplink transmission belong to the UL part.

When the slot patterns indicated by the indication methods in the four levels are inconsistent, the priority of overridden can be defined. For example, in a simple method, an OFDM symbol indicated as the DL part in one level cannot be indicated as the UL part in other levels; an OFDM symbol indicated as the UL part in one level cannot be indicated as the DL part in other levels; and, an OFDM symbol indicated as the Unknown part in one level can be further indicated to belong to the DL part, the Unknown part or the UL part in a higher level (for example, the second level is superior to the first level).

The 5G system still supports the Multi-input Multi-output (MIMO) transmission. When operating in an MIMO transmission mode, multiple Transport Blocks (TBs) may be simultaneously scheduled on one carrier. For example, for an initial transmission, when the number of MIMO transmission layers is less than or equal to 4, only one TB is scheduled. When the number of layers is greater than 4, two TBs are scheduled. Or, for a retransmission, even if the number of layers is less than or equal to 4, it is also possible to schedule two TBs. Of course, the number of TBs actually scheduled by a base station each time changes dynamically. In addition, the 5G system further supports that one TB is divided into multiple Code Block Groups (CBGs), so that the transmission of TBs and the HARQ-ACK feedback are processed in accordance with CBGs. For a TB-based PDSCH transmission, when a PDSCH is configured to contain one TB, one bit is fed back; and, when a PDSCH is configured to contain two TBs, two bits are fed back. When it is configured that the operation is performed in accordance with CBGs, for one PDSCH, HARQ-ACK information is fed back according to the total number of configured CBGs. When a PDSCH is configured to contain one TB which contains N CBGs, N bits are fed back; and, when a PDSCH is configured to contain two TBs and each TB contains M CBGs, 2 M bits are fed back.

In the 5G system, for the downlink data transmission, the delay between a PDCCH and a PDSCH scheduled by the PDCCH is K0, where K0 is greater than or equal to 0. The delay between the PDSCH and the HARQ-ACK transmission corresponding to the PDSCH is K1, where K1 is greater than or equal to 0. For example, the delays K0 and K1 can be measured in slots. Within one slot, a starting OFDM symbol of a PDSCH of the UE scheduled by the base station and the number of symbols of the PDSCH can have one or more variations. As shown in FIG. 1, eight possible PDSCH resources 101 to 108 can be configured, and the starting OFDM symbols and/or the number of OFDM symbols of these PDSCH resources can be different. In addition, the base station further supports that one PDSCH is allocated within N slots. For example, time-frequency resources for the PDSCH within N successive slots can be identical. The parameter K0, the starting OFDM symbol, the number of symbols or the parameter K1 can be configured and indicated separately or can be configured and indicated jointly. For example, the base station can configure G groups of parameters (K0, the starting OFDM symbol and the number of symbols) and configure multiple possible values of K1, where G is less than or equal to 16. The parameter group (K0, the starting OFDM symbol and the number of symbols) and the parameter K1 can be indicated by occupying different fields in the PDCCH respectively. Within one slot, the base station may transmit multiple PDSCHs, so that HARQ-ACK information needs to be fed back. In addition, to flexibly utilize frequency spectrum resources, the 5G still supports carrier aggregation. That is, the base station can configure multiple carriers for one UE; and accordingly, HARQ-ACK information of the multiple carriers also needs to be fed back. Therefore, a novel solution is urgently required to effectively support HARQ-ACK transmission.

DISCLOSURE OF INVENTION

Technical Problem

In the 5G system, for the downlink data transmission, the delay between a PDCCH and a PDSCH scheduled by the PDCCH is K0, where K0 is greater than or equal to 0. The delay between the PDSCH and the HARQ-ACK transmission corresponding to the PDSCH is K1, where K1 is greater than or equal to 0. For example, the delays K0 and K1 can be measured in slots. Within one slot, a starting OFDM symbol of a PDSCH of the UE scheduled by the base station and the number of symbols of the PDSCH can have one or more variations. As shown in FIG. 1, eight possible PDSCH resources 101 to 108 can be configured, and the starting OFDM symbols and/or the number of OFDM symbols of these PDSCH resources can be different. In addition, the base station further supports that one PDSCH is allocated within N slots. For example, time-frequency resources for the PDSCH within N successive slots can be identical. The parameter K0, the starting OFDM symbol, the number of symbols or the parameter K1 can be configured and indicated separately or can be configured and indicated jointly. For example, the base station can configure G groups of parameters (K0, the starting OFDM symbol and the number of symbols) and configure multiple possible values of K1, where G is less than or equal to 16. The parameter group (K0, the starting OFDM symbol and the number of symbols) and the parameter K1 can be indicated by occupying different fields in the PDCCH respectively. Within one slot, the base station may transmit multiple PDSCHs, so that HARQ-ACK information needs to be fed back. In addition, to flexibly utilize frequency spectrum resources, the 5G still supports carrier aggregation. That is, the base station can configure multiple carriers for one UE; and accordingly, HARQ-ACK information of the multiple carriers also needs to be fed back. Therefore, a novel solution is urgently required to effectively support HARQ-ACK transmission.

Solution to Problem

The present application provides a method and equipment for transmitting HARQ-ACK information, and provides a mechanism for reducing the overhead of HARQ-ACK feedback and avoiding the confusion between a base station and a UE.

For this purpose, the present application employs the following technical solutions.

A method for transmitting HARQ-ACK information is provided, including steps of: detecting, by a UE, a PDCCH and receiving a PDSCH scheduled by the PDCCH; for one slot of one carrier, determining, according to a configured slot pattern and a configured PDCCH monitoring occasion, the HARQ-ACK occasion and the number of HARQ-ACK bits occupied by the one slot; and generating, by the UE, an HARQ-ACK codebook according to the HARQ-ACK occasion and the number of HARQ-ACK bits occupied by the one slot, and transmitting HARQ-ACK information.

Preferably, the step of determining the number of HARQ-ACK bits occupied by the one slot includes: for one slot of the one carrier, determining, according to a configured slot pattern and a configured PDCCH monitoring occasion, the HARQ-ACK occasion and the number of HARQ-ACK bits occupied by each BWP, and determining the number of HARQ-ACK bits to be fed back according to a maximum value of the number of HARQ-ACK bits to be fed back on each BWP.

Preferably, the step of determining the number of HARQ-ACK bits occupied by the one slot includes: for one slot of one carrier, jointly processing BWPs to obtain the HARQ-ACK occasion and the number of HARQ-ACK bits to be fed back within this slot.

Preferably, the step of determining the HARQ-ACK occasion and the number of HARQ-ACK bits occupied by the one slot includes: when it is supported that one PDSCH spans over multiple slots, determining, according to a first slot to which the PDSCH is mapped, the HARQ-ACK occasion and the number of HARQ-ACK bits.

Preferably, the step of determining the number of HARQ-ACK bits occupied by the one slot includes: classifying PDSCHs scheduled within the one slot into two types for which the PDSCHs are configured with different numbers of TBs, different determinations as to whether to configure Code Block Group (CBG) based transmissions and/or different numbers of CBGs; and, determining the number of HARQ-ACK bits according to the type of a PDSCH.

Preferably, the step of determining the HARQ-ACK occasion and the number of HARQ-ACK bits occupied by the one slot includes: for the one slot, determining, according to a configured slot pattern, a configured PDCCH monitoring occasion and a set T for configuring a PDSCH scheduling, the total number X of HARQ-ACK occasions to be mapped within the one slot, and mapping each element in the set T to one of the X HARQ-ACK occasions respectively, wherein each element in the set T includes: a scheduling delay parameter K0, a starting OFDM symbol of the PDSCH, the number of OFDM symbols of the PDSCH and the type of the PDSCH.

Preferably, the step of determining the total number X of HARQ-ACK occasions to be mapped within the one slot and mapping each element in the set T to one of the X HARQ-ACK occasions respectively includes: determining the total number X of HARQ-ACK occasions to be mapped as the total number of HARQ-ACK occasions of schedulable elements in the set T, and mapping each schedulable element in the set T to one of the X HARQ-ACK occasions, wherein each schedulable element stratifies the following conditions: any OFDM symbol of a PDSCH resource for the schedulable element cannot be indicated as an uplink OFDM symbol in a semi-static slot pattern; and in accordance with the parameter K0 of the schedulable element, a slot n−K0 supports the transmission of a PDCCH according to the parameter K0 and schedules a PDSCH within a slot n.

Preferably, the step of determining the total number X of HARQ-ACK occasions to be mapped within the one slot and mapping each element in the set T to one of the X HARQ-ACK occasions respectively includes: determining the parameter X to be equal to the number of schedulable elements in the set T, and determining the $k^{th}$ schedulable element in the set T to be mapped to the $k^{th}$ HARQ-ACK occasion, where k is a positive integer; or determining the parameter X to be equal to the number of different parameter pairs indicated by schedulable elements in the set T, sequencing the parameter pairs indicated by the schedulable elements in the set T, and determining an HARQ-ACK occasion according to the parameter pairs indicated by an element, wherein the parameter pair includes K0 and a starting OFDM symbol of a PDSCH.

Preferably, the step of determining the total number X of HARQ-ACK occasions to be mapped within the one slot and mapping each element in the set T to one of the X HARQ-ACK occasions respectively includes one of the following: determining the parameter X to be equal to NTB+NTA, and mapping each schedulable element in the set T to one of the X HARQ-ACK occasions in an order of elements of type B in the set T, wherein the NTB is equal to the number of schedulable elements of type B in the set T; determining the parameter X to be equal to NTB+NTA, sequencing parameter pairs indicated by schedulable elements of type B in the set T, and determining one of the X HARQ-ACK occasions according to the parameter pair indicated by the element of type B, wherein the NTB is equal to the number of different parameter pairs indicated by schedulable elements of type B in the set T, and the parameter pair includes K0 and the starting OFDM symbol of the PDSCH; and determining the parameter X to be equal to NTB+NTA, wherein the NTB is equal to the total number of HARQ-ACK occasions to be mapped by all schedulable elements of type B in the set T, and a base station cannot simultaneously schedule PDSCH resources for two elements in the set T if the PDSCH resources for the two elements of type B in the set T are overlapped; wherein, if there are schedulable PDSCH resources of type A in the set T, the NTA is 1; or otherwise, the NTA is 0.

Preferably, a PDSCH of type A is mapped to the first occasion or the last occasion of the X HARQ occasions.

Preferably, the step of determining the total number X of HARQ-ACK occasions to be mapped within the one slot and mapping each element in the set T to one of the X HARQ-ACK occasions respectively includes: determining the parameter X to be equal to NTB+NTA, wherein, if there are schedulable PDSCH resources of type B in the set T, the NTB is 1; or otherwise, the NTB is 0; or determining the parameter X to be equal to NTB+NTA, the NTB being equal to Bmax or min($B_{max}$,$N_B$), where the Bmax is the maximum value of the number of HARQ-ACK occasions allocated to PDSCHs of type B, the $N_B$ is equal to the number of schedulable elements of type B in the set T or the number of different parameter pairs indicated by schedulable elements of type B in the set T, and the parameter pair includes K0 and the starting OFDM symbol of the PDSCH;

wherein, if there are schedulable PDSCH resources of type A in the set T, the NTA is 1; or otherwise, the NTA is 0.

Preferably, the step of determining the total number X of HARQ-ACK occasions to be mapped within the one slot and mapping each element in the set T to one of the X HARQ-ACK occasions respectively includes: the parameter X is 1 if there are schedulable elements in the set T; or otherwise, the parameter X is 0.

Preferably, for an uplink slot m for HARQ-ACK feedback, when an HARQ-ACK feedback delay K1 exceeds a threshold D, at most one HARQ-ACK occasion is allocated to a slot m−K1; when K1 is less than the threshold D, an HARQ-ACK occasion for PDSCH of type A and the HARQ-ACK occasion(s) for PDSCH of type B are allocated to a slot m−K1.

Preferably, the step of determining the total number X of HARQ-ACK occasions to be mapped within the one slot and mapping each element in the set T to one of the X HARQ- ACK occasions respectively includes: determining the parameter X to be equal to the maximum number of non-overlapped PDSCH resources among PDSCH resources for all schedulable elements in the set T, assuming a base station cannot simultaneously schedule PDSCH resources for two elements in the set T if the PDSCH resources for the two schedulable elements in the set T are overlapped.

A user equipment is provided, including a PDCCH and PDSCH receiving module, a slot HARQ-ACK information generating module, an HARQ-ACK codebook generating module and an HARQ-ACK transmitting module, wherein: the PDCCH and PDSCH receiving module is configured to monitor a PDCCH and receive a PDSCH scheduled by the PDCCH; the slot HARQ-ACK information generating module is configured to determine, for one slot of one carrier and according to a configured slot pattern and a configured PDCCH monitoring occasion, the HARQ-ACK occasion and the number of HARQ-ACK bits occupied by the one slot; the HARQ-ACK codebook generating module is configured to generate, by a UE, an HARQ-ACK codebook according to the HARQ-ACK occasion and the number of HARQ-ACK bits occupied by the one slot; and the HARQ-ACK transmitting module is configured to transmit HARQ-ACK information.

By the method of the present invention, the number of HARQ-ACK bits to be fed back within each slot is reduced, and the feedback overhead is reduced; moreover, the number of bits of the generated HARQ-ACK codebook changes semi-statically, so that the confusion between a base station and a UE is avoided.

Advantageous Effects of Invention

Additional aspects and advantages of the present invention will be partially appreciated and become apparent from the descriptions below, or will be well learned from the practices of the present invention.

The present invention effectively support HARQ-ACK transmission.

BRIEF DESCRIPTION OF DRAWINGS

FIG. 1 is a schematic diagram of PDSCH time resources.
FIG. 2 is a flowchart of the present invention.
FIG. 3 is a first schematic diagram of schedulable PDSCH resources.
FIG. 4 is a second schematic diagram of schedulable PDSCH resources.
FIG. 5 is a diagram of an equipment of the present invention.

MODE FOR THE INVENTION

The present application provides a method and equipment for transmitting HARQ-ACK information, and provides a mechanism for reducing the overhead of HARQ-ACK feedback and avoiding the confusion between a base station and a UE.

For this purpose, the present application employs the following technical solutions.

A method for transmitting HARQ-ACK information is provided, including steps of: detecting, by a UE, a PDCCH and receiving a PDSCH scheduled by the PDCCH; for one slot of one carrier, determining, according to a configured slot pattern and a configured PDCCH monitoring occasion, the HARQ-ACK occasion and the number of HARQ-ACK bits occupied by the one slot; and generating, by the UE, an HARQ-ACK codebook according to the HARQ-ACK occasion and the number of HARQ-ACK bits occupied by the one slot, and transmitting HARQ-ACK information.

Preferably, the step of determining the number of HARQ-ACK bits occupied by the one slot includes: for one slot of the one carrier, determining, according to a configured slot pattern and a configured PDCCH monitoring occasion, the HARQ-ACK occasion and the number of HARQ-ACK bits occupied by each BWP, and determining the number of HARQ-ACK bits to be fed back according to a maximum value of the number of HARQ-ACK bits to be fed back on each BWP.

Preferably, the step of determining the number of HARQ-ACK bits occupied by the one slot includes: for one slot of one carrier, jointly processing BWPs to obtain the HARQ-ACK occasion and the number of HARQ-ACK bits to be fed back within this slot.

Preferably, the step of determining the HARQ-ACK occasion and the number of HARQ-ACK bits occupied by the one slot includes: when it is supported that one PDSCH spans over multiple slots, determining, according to a first slot to which the PDSCH is mapped, the HARQ-ACK occasion and the number of HARQ-ACK bits.

Preferably, the step of determining the number of HARQ-ACK bits occupied by the one slot includes: classifying PDSCHs scheduled within the one slot into two types for which the PDSCHs are configured with different numbers of TBs, different determinations as to whether to configure Code Block Group (CBG) based transmissions and/or different numbers of CBGs; and, determining the number of HARQ-ACK bits according to the type of a PDSCH.

Preferably, the step of determining the HARQ-ACK occasion and the number of HARQ-ACK bits occupied by the one slot includes: for the one slot, determining, according to a configured slot pattern, a configured PDCCH monitoring occasion and a set T for configuring a PDSCH scheduling, the total number X of HARQ-ACK occasions to be mapped within the one slot, and mapping each element in the set T to one of the X HARQ-ACK occasions respectively, wherein each element in the set T includes: a scheduling delay parameter K0, a starting OFDM symbol of the PDSCH, the number of OFDM symbols of the PDSCH and the type of the PDSCH.

Preferably, the step of determining the total number X of HARQ-ACK occasions to be mapped within the one slot and mapping each element in the set T to one of the X HARQ-ACK occasions respectively includes: determining the total number X of HARQ-ACK occasions to be mapped as the total number of HARQ-ACK occasions of schedulable elements in the set T, and mapping each schedulable element in the set T to one of the X HARQ-ACK occasions, wherein each schedulable element stratifies the following conditions: any OFDM symbol of a PDSCH resource for the schedulable element cannot be indicated as an uplink OFDM symbol in a semi-static slot pattern; and in accordance with the parameter K0 of the schedulable element, a slot n−K0 supports the transmission of a PDCCH according to the parameter K0 and schedules a PDSCH within a slot n.

Preferably, the step of determining the total number X of HARQ-ACK occasions to be mapped within the one slot and mapping each element in the set T to one of the X HARQ-ACK occasions respectively includes: determining the parameter X to be equal to the number of schedulable elements in the set T, and determining the $k^{th}$ schedulable element in the set T to be mapped to the $k^{th}$ HARQ-ACK occasion, where k is a positive integer; or determining the parameter X to be equal to the number of different parameter pairs indicated by schedulable elements in the set T, sequencing the parameter pairs indicated by the schedulable elements in the set T, and determining an HARQ-ACK occasion according to the parameter pairs indicated by an element, wherein the parameter pair includes K0 and a starting OFDM symbol of a PDSCH.

Preferably, the step of determining the total number X of HARQ-ACK occasions to be mapped within the one slot and mapping each element in the set T to one of the X HARQ-ACK occasions respectively includes one of the following: determining the parameter X to be equal to NTB+NTA, and mapping each schedulable element in the set T to one of the X HARQ-ACK occasions in an order of elements of type B in the set T, wherein the NTB is equal to the number of schedulable elements of type B in the set T; determining the parameter X to be equal to NTB+NTA, sequencing parameter pairs indicated by schedulable elements of type B in the set T, and determining one of the X HARQ-ACK occasions according to the parameter pair indicated by the element of type B, wherein the NTB is equal to the number of different parameter pairs indicated by schedulable elements of type B in the set T, and the parameter pair includes K0 and the starting OFDM symbol of the PDSCH; and determining the parameter X to be equal to NTB+NTA, wherein the NTB is equal to the total number of HARQ-ACK occasions to be mapped by all schedulable elements of type B in the set T, and a base station cannot simultaneously schedule PDSCH resources for two elements in the set T if the PDSCH resources for the two elements of type B in the set T are overlapped; wherein, if there are schedulable PDSCH resources of type A in the set T, the NTA is 1; or otherwise, the NTA is 0.

Preferably, a PDSCH of type A is mapped to the first occasion or the last occasion of the X HARQ occasions.

Preferably, the step of determining the total number X of HARQ-ACK occasions to be mapped within the one slot and mapping each element in the set T to one of the X HARQ-ACK occasions respectively includes: determining the parameter X to be equal to NTB+NTA, wherein, if there are schedulable PDSCH resources of type B in the set T, the NTB is 1; or otherwise, the NTB is 0; or determining the parameter X to be equal to NTB+NTA, the NTB being equal to Bmax or min($B_{max}$,$N_B$), where the Bmax is the maximum value of the number of HARQ-ACK occasions allocated to PDSCHs of type B, the $N_B$ is equal to the number of schedulable elements of type B in the set T or the number of different parameter pairs indicated by schedulable elements of type B in the set T, and the parameter pair includes K0 and the starting OFDM symbol of the PDSCH;

wherein, if there are schedulable PDSCH resources of type A in the set T, the NTA is 1; or otherwise, the NTA is 0.

Preferably, the step of determining the total number X of HARQ-ACK occasions to be mapped within the one slot and mapping each element in the set T to one of the X HARQ-ACK occasions respectively includes: the parameter X is 1 if there are schedulable elements in the set T; or otherwise, the parameter X is 0.

Preferably, for an uplink slot m for HARQ-ACK feedback, when an HARQ-ACK feedback delay K1 exceeds a threshold D, at most one HARQ-ACK occasion is allocated to a slot m−K1; when K1 is less than the threshold D, an HARQ-ACK occasion for PDSCH of type A and the HARQ-ACK occasion(s) for PDSCH of type B are allocated to a slot m−K1

Preferably, the step of determining the total number X of HARQ-ACK occasions to be mapped within the one slot and mapping each element in the set T to one of the X HARQ-ACK occasions respectively includes: determining the parameter X to be equal to the maximum number of non-overlapped PDSCH resources among PDSCH resources for all schedulable elements in the set T, assuming a base station cannot simultaneously schedule PDSCH resources for two elements in the set T if the PDSCH resources for the two schedulable elements in the set T are overlapped.

A user equipment is provided, including a PDCCH and PDSCH receiving module, a slot HARQ-ACK information generating module, an HARQ-ACK codebook generating module and an HARQ-ACK transmitting module, wherein: the PDCCH and PDSCH receiving module is configured to monitor a PDCCH and receive a PDSCH scheduled by the PDCCH; the slot HARQ-ACK information generating module is configured to determine, for one slot of one carrier and according to a configured slot pattern and a configured PDCCH monitoring occasion, the HARQ-ACK occasion and the number of HARQ-ACK bits occupied by the one slot; the HARQ-ACK codebook generating module is configured to generate, by a UE, an HARQ-ACK codebook according to the HARQ-ACK occasion and the number of HARQ-ACK bits occupied by the one slot; and the HARQ-ACK transmitting module is configured to transmit HARQ-ACK information.

By the method of the present invention, the number of HARQ-ACK bits to be fed back within each slot is reduced, and the feedback overhead is reduced; moreover, the number of bits of the generated HARQ-ACK codebook changes semi-statically, so that the confusion between a base station and a UE is avoided.

In the 5G system, for the downlink data transmission, the delay between a PDCCH and a PDSCH scheduled by the PDCCH is K0, where K0 is greater than or equal to 0. The delay between the PDSCH and the HARQ-ACK transmission corresponding to the PDSCH is K1, where K1 is greater than or equal to 0. For example, the delays K0 and K1 can be measured in slots. Within one slot, a starting OFDM symbol of a PDSCH of the UE scheduled by the base station and the number of symbols of the PDSCH can have one or more variations. As shown in FIG. 1, eight possible PDSCH resources 101 to 108 can be configured, and the starting OFDM symbols and/or the number of OFDM symbols of these PDSCH resources can be different. In addition, the base station further supports that one PDSCH is allocated within N slots. For example, time-frequency resources for the PDSCH within N successive slots can be identical. The parameter K0, the starting OFDM symbol, the number of symbols or the parameter K1 can be configured and indicated separately or can be configured and indicated jointly. For example, the base station can configure G groups of parameters (K0, the starting OFDM symbol and the number of symbols) and configure multiple possible values of K1, where G is less than or equal to 16. The parameter group (K0, the starting OFDM symbol and the number of symbols) and the parameter K1 can be indicated by occupying different fields in the PDCCH respectively. Within one slot, the base station may transmit multiple PDSCHs, so that HARQ-ACK information needs to be fed back. In addition, to flexibly utilize frequency spectrum resources, the 5G still supports carrier aggregation. That is, the base station can configure multiple carriers for one UE; and accordingly, HARQ-ACK information of the multiple carriers also needs to be fed back. Therefore, a novel solution is urgently required to effectively support HARQ-ACK transmission.

To make the objectives, technical solutions and advantages of the present invention clearer, the present invention will be further described below in details by embodiments with reference to the accompanying drawings.

For the downlink data transmission, in order to determine an HARQ-ACK codebook, FIG. 2 shows a flowchart of the present invention.

Step 201: A UE monitors a PDCCH and receives a PDSCH scheduled by the PDCCH; and, for one slot of one carrier, the HARQ-ACK occasion and the number of HARQ-ACK bits occupied by the one slot are determined according to a configured slot pattern and a configured PDCCH monitoring occasion.

For one carrier, one or multiple Bandwidth Parts (BWPs) can be configured to the UE. When multiple BWPs are configured, configurations for downlink HARQ transmissions of different BWPs can be different. For example, PDCCH monitoring occasions configured on different BWPs may be different, the set of the starting OFDM symbols and the number of OFDM symbols of supported PDSCHs configured on different BWPs may be different, and the set of HARQ-ACK feedback delays K1 configured on different BWPs may be different. For example, one BWP is configured to perform Code Block Group (CBG)-based downlink transmission, while another BWP is configured to perform only TB-based downlink transmission; or, although two BWPs are configured to perform CBG-based downlink transmission, the number of configured CBGs is different; or, the set of HARQ-ACK feedback delays configured on one BWP is {1,3}, while the set of HARQ-ACK feedback delays configured on another BWP is {2,4}. Based on the above analysis, the number of HARQ-ACK bits to be fed back on different BWPs within one slot can be different. Particularly, for each downlink BWP of one carrier, a set of K1 for a same uplink BWP for transmitting HARQ-ACKs is the same, and a set of K1 for different uplink BWPs for transmitting HARQ-ACKs can be different.

If it is assumed that only one BWP is configured, for one slot, the number of HARQ-ACK bits to be fed back for this BWP is the number of HARQ-ACK bits to be fed back within this slot. In the present invention, the processing method used in the situation where only one BWP is configured is also applicable to a situation where no BWP is configured on one carrier. That is, for one carrier, the situation where no BWP is configured is equivalent to the situation where only one BWP is configured. When multiple BWPs are configured, if it is assumed that the currently activated BWP of the UE can be switched dynamically, in order to avoid the confusion on the number of bits of the HARQ-ACK codebook due to the loss of PDCCHs or other reasons, the number of HARQ-ACK bits to be fed back within one slot should not be related to the currently activated BWP. For example, for one slot on one carrier, it is possible to first determine the number of HARQ-ACK bits to be fed back on each BWP and then obtain the number of HARQ-ACK bits to be fed back within this slot according to a maximum value of the number of HARQ-ACK bits to be fed back on each BWP. For the one slot on one carrier, for one BWP, there may be no schedulable PDSCH resource. For example, if the sets of HARQ-ACK feedback delays of two BWPs are {1,3} and {2,4}, respectively, and if it is assumed that an HARQ-ACK is to be fed back within a slot m, there may be no PDSCH transmission on BWP2 within a slot m−1 and a slot m−3. Therefore, for the slot m−1 and the slot m−3, the number of HARQ-ACK bits to be fed back for the BWP2 is 0. Within the two slots, the maximum value of the number of HARQ-ACK bits of the BWP1 and BWP2 is the number of HARQ-ACK bits of the BWP1. Similarly, there may be no PDSCH transmission on BWP1 within a slot m−2 and a slot m−4. Therefore, for the slot m−2 and the slot m−4, the number of HARQ-ACK bits to be fed back for the BWP1 is 0. Within the two slots, the maximum value of the number of HARQ-ACK bits of the BWP1 and BWP2 is the number of HARQ-ACK bits of the BWP2. Or, for one slot, BWPs are jointly processed to obtain the number of HARQ-ACK bits to be fed back within this slot. Or, when multiple BWPs are configured, for one slot, the number of HARQ-ACK bits to be fed back within this slot can be determined according to the number of HARQ-ACK bits to be fed back for the currently activated BWP. This method can be applied to a situation where the activated downlink BWP of the UE remains unchanged corresponding to an uplink slot for feeding back an HARQ-ACK.

Within one slot, the base station may transmit multiple PDSCHs, so that HARQ-ACK information needs to be fed back. The starting OFDM symbols and the number of OFDMs of the multiple PDSCHs can be varied. When it is supported that one PDSCH spans over N slots, time-frequency resources for the PDSCH within the N slots can be identical. For one slot, M HARQ-ACK occasions can be configured, and each HARQ-ACK occasion can carry HARQ-ACK information of one PDSCH. Corresponding to one HARQ-ACK occasion, the UE may receive a PDSCH and thus carry HARQ-ACK information of this PDSCH; or, corresponding to one HARQ-ACK occasion, the UE may not receive any PDSCH, and in this case, the UE can fill some HARQ-ACK bits, for example, NACK.

When it is supported that one PDSCH spans over N slots, the HARQ-ACK occasion can be determined according to one slot (e.g., the first slot or the last slot) mapped by this PDSCH. That is, the HARQ-ACK information is carried by one of M HARQ-ACK occasions of the one slot mapped by this PDSCH. For example, within the one slot, one of the M HARQ-ACK occasions, to which this PDSCH is mapped, is determined by the same method as the method used handling the PDSCH transmission within one slot. Or, during the determination of the number of HARQ-ACK occasions within the one slot, schedulable PDSCH resources of the N slots mapped by a PDSCH need to be taken into consideration to determine one HARQ-ACK occasion to which this PDSCH is mapped. Within an uplink slot n, if it is assumed that the parameter K1 is defined as an interval between the last one of the N slots of the PDSCH and the uplink slot n, the first one of the N slots of the PDSCH is actually n−K1−N+1. During the implementation of the all following embodiments, the parameter K1 needs to be replaced with K1+N−1, so that the first one of the N slots of the PDSCH is obtained according to the uplink slot n.

For one BWP, the number of HARQ-ACK bits to be allocated at one HARQ-ACK occasion can be determined according to the configuration of a PDSCH. The PDSCH can be transmitted based on TBs. If the PDSCH is configured to contain one TB, one HARQ-ACK bit needs to be fed back. Or, if the PDSCH is configured to contain two TBs, two HARQ-ACK bits need to be fed back. Or, if the PDSCH is configured to be transmitted based on CBGs, the number of HARQ-ACK bits to be fed back is equal to the total number of configured CBGs. When the PDSCH is configured to contain one TB which contains N CBGs, N HARQ-ACK bits need to be fed back; however, when the PDSCH is configured to contain two TBs and each TB contains P CBGs, 2P HARQ-ACK bits need to be fed back. When multiple BWPs are configured, the number of HARQ-ACK bits to be allocated at one HARQ-ACK occasion can be equal to the maximum value of the number of HARQ-ACK bits to be fed back for the PDSCHs on one or more BWPs.

In addition, for one BWP, PDSCHs scheduled within one slot can be classified into two types, i.e., type A and type B. For example, in an NR system, the first DMRS symbol of a PDSCH of type A is at a particular OFDM symbol of a slot, for example, OFDM symbol 3 or OFDM symbol 4. The first OFDM symbol of a PDSCH of type B contains a DMRS. The transmission mechanism for the two PDSCH types can be different. The transmission mechanism includes the number of configured TBs of PDSCHs, whether to configure CBG-based transmission and/or the number of configured CBGs. The number of TBs, whether to configure CBG-based transmission and the number of CBGs of each PDSCH type can be configured by a higher-layer signaling or predefined. Correspondingly, the number of HARQ-ACK bits to be fed back for PDSCHs of the two types can be different. For example, PDSCHs of the two types are configured to support TB-based transmission, but the number of configured TBs can be different; or, PDSCHs of one type (e.g., type A) support CBG-based transmission, while PDSCHs of the other type support only TB-based transmission; or, PDSCHs of the two types are configured to support CBG-based transmission, but the number of configured CBGs is different. In accordance with the above analysis, for one BWP of one slot, the number of HARQ-ACK bits can be determined by distinguishing PDSCHs of type A from PDSCHs of type B.

When the downlink PDSCH scheduling is supported, two types of Downlink Control Information (DCI) can be defined. For example, DCI of type 1 is used for improving the reliability, and only one HARQ-ACK bit is fed back for a scheduled PDSCH; and, DCI of type 2 is used for improving the downlink transmission performance, and it can be configured that multiple HARQ-ACK bits are fed back for a scheduled PDSCH. In NR system, within Common Search Space (CSS), the UE only detects DCI of type 1; within UE Specific Search Space (USS), the UE may detect DCI of type 1 and/or DCI of type 2. In the present invention, the configured number of HARQ-ACK bits of PDSCHs refers to the configured number of HARQ-ACK bits of PDSCHs scheduled by the DCI of type 2. The set of K1 for the DCI of type 1 and the set of K1 for the DCI of type 2 can be configured by a higher-layer signaling or predefined. Particularly, the set of K1 for the DCI of type 1 is predefined, and the set of K1 for the DCI of type 2 is configured by a higher-layer signaling. For the two types of DCI, the set of K1 can be same or different.

During the generation of an HARQ-ACK codebook, for one BWP, the set K of K1 to be considered can be determined by the following method.

If an intersection set of the set of K1 for the DCI of type 1 and the set of K1 for the DCI of type 2 is recorded as F, the DCI of type 2 can schedule a PDSCH by using the value(s) of K1 in the set of K1 for the DCI of type 2, while the DCI of type 1 can only schedule a PDSCH by using the value(s) of K1 in the intersection set F. By this method, the set of K1 that can schedule PDSCHs is the set of K1 for the DCI of type 2, so that the set K can be the set of K1 for the DCI of type 2. For example, after the UE establishes an RRC connection, the DCI of type 1 can only schedule PDSCHs by using the value(s) of K1 in the intersection set F, and the overhead of the HARQ-ACK feedback is controlled by the above method. Before the UE establishes an RRC connection, the set of K1 for the DCI of type 2 is not yet configured, so that it is not necessary to limited that the DCI of type 1 can only schedule PDSCHs by using the value(s) of K1 in the intersection set F.

The set K can also be a superset of the set of K1 for the DCI of type 1 and the set of K1 for the DCI of type 2. During the generation of an HARQ-ACK codebook, for each element in the above superset, the HARQ-ACK occasion and the number of HARQ-ACK bits of a corresponding slot can be determined. Or, during the generation of an HARQ-ACK codebook, in addition to the determination of the HARQ-ACK occasion in accordance with the elements in the set of K1 for the DCI of type 2, it could allocate an HARQ-ACK occasion to one additional slot which is for PDSCH scheduled by the DCI of type 1. Or, during the generation of an HARQ-ACK codebook, if any element in the set of K1 for the DCI of type 1 belongs to the set of K1 for the DCI of type 2, the HARQ-ACK occasion is determined according to the set of K1 for the DCI of type 2; if at least one element in the set of K1 for the DCI of type 1 does not belong to the set of K1 for the DCI of type 2, in addition to the determination of the HARQ-ACK occasion according to the set of K1 for the DCI of type 2, it could allocate an HARQ-ACK occasion to one additional slot which is for PDSCH scheduled by the DCI of type 1. This HARQ-ACK occasion is applied to elements which do not belong to the set of K1 for the DCI of type 2 in the set of K1 for the DCI of type 1.

The number of HARQ-ACK occasions allocated to one additional slot is equal to the maximum value of the number of HARQ-ACK occasions of slots corresponding to all elements in the set of K1 for the DCI of type 1, or equal to the maximum value of the number of HARQ-ACK occasions of slots corresponding to elements which belong to the set of K1 for the DCI of type 1 but do not belong to the set of K1 for the DCI of type 2. For the one additional slot, for an uplink slot n for feeding back an HARQ-ACK, it is assumed that the base station schedules PDSCHs based on the DCI of type 1 within at most one slot; or, it is assumed that the base station schedules PDSCH based on the DCI of type 1 within at most one slot, except for the slots corresponding to the intersection set of the set of K1 for the DCI of type 1 and the set of K1 for the DCI of type 2.

During the generation of an HARQ-ACK codebook, when multiple BWPs are configured, if it is assumed that BWPs are jointly processed to obtain the HARQ-ACK occasion and the number of HARQ-ACK bits to be fed back within this slot and it is assumed that the sets of K1 configured on different BWPs can be different, the set K can be a superset of the sets of K1 on the BWPs; or otherwise, the sets of K1 can be used as the set K. Here, for one BWP, the set of K1 for this BWP can be determined by the method for processing the set K of K1 for one BWP.

When it is supported that one PDSCH spans over N slots, for different K1 in the set of K1, PDSCHs spanning over N slots can be overlapped partially. It is assumed that a base station cannot simultaneously schedule the partially overlapped PDSCHs or a UE may not feed HARQ-ACKs back for the partially overlapped PDSCHs, respectively, the number of HARQ-ACK bits fed back by the UE can be compressed. If it is assumed that the set of K1 is divided into one or more subsets, each value of K1 belongs to only one subset. For one subset $K_s$ of the set of K1, if there are multiple K1 and PDSCHs spanning over N slots corresponding to any two K1 are partially overlapped, that is, $|K_{1,a} - K_{1,b}| < N$ (where $K_{1,a} \in K_s$ and $K_{1,b} \in K_s$), the HARQ-ACK occasion can be determined for each subset. For example, for one subset $K_s$, the HARQ-ACK occasion is determined in accordance with one K1 in $K_s$, for example, minimum K1 or maximum $K_1$. Or, for one subset $K_s$, the HARQ-ACK occasion is determined by comprehensively considering all K1 in the $K_s$.

In addition, the number of HARQ-ACK bits to be allocated at one HARQ-ACK occasion can also be related to the specific HARQ-ACK transmission method.

During the determination of the number of HARQ-ACK occasions required within one slot, the overhead can be reduced by considering one or more of the following factors.

1) Whether a slot can transmit PDSCHs, for example, a slot containing only uplink OFDM symbols cannot transmit PDSCHs.

2) In accordance with a semi-statically configured slot pattern, it is possible that only some OFDM symbols can transmit PDSCHs.

3) Whether a slot can transmit PDCCHs, for example, a slot containing only uplink OFDM symbols cannot transmit PDCCHs; and/or, a slot configured with no PDCCH monitoring occasion cannot transmit PDCCHs. For example, in accordance with the configured PDCCH monitoring occasion, there are no PDCCH candidates within this slot.

4) Whether a slot can transmit PDCCHs according to a particular parameter K0. For example, in accordance with the configured PDCCH monitoring occasion, there exist PDCCH candidates within one slot, but these PDCCH candidates cannot schedule PDSCHs according to the parameter K0, so that this slot cannot transmit PDCCHs according to the parameter K0.

For one carrier, if it is assumed that one BWP is configured, or only for the currently activated BWP, in accordance with the set of HARQ-ACK feedback delays configured on this BWP and for a slot corresponding to each element in the set, the HARQ-ACK occasion to be allocated for the BWP is obtained by one of the following five embodiments.

For one carrier, when W BWPs are configured (where W is greater than or equal to 1), for one slot, the HARQ-ACK occasion and the number of HARQ-ACK bits to be fed back for a BWP can be obtained by processing the BWP respectively.

For one carrier, when W BWPs are configured, the HARQ-ACK occasion to be allocated within one slot can be obtained by the following method. Firstly, if it is assumed that the sets of K1 configured on different BWPs can be different, a superset of the set of HARQ-ACK feedback delays configured on the W BWPs is determined as the set K; or otherwise, the sets of K1 can be used as the set K. Then, the HARQ-ACK occasion to be allocated is determined according to the slot corresponding to each element in the set K. For one element in the set K, for one BWP, if the set of HARQ-ACK feedback delays configured on this BWP contains this element, the HARQ-ACK occasion to be allocated for this BWP is obtained by one of the following five embodiments; or otherwise, the number of HARQ-ACK occasions to be allocated for this BWP is 0. For one element in the set K, the number of HARQ-ACK occasions to be allocated is equal to the maximum value of the number of HARQ-ACK occasions of the W BWPs.

Or, for one carrier, when W BWPs are configured, HARQ-ACK bits to be allocated within one slot can be obtained by the following method. Firstly, if it is assumed that the sets of K1 configured on different BWPs can be different, a superset of the set of HARQ-ACK feedback delays configured on the W BWPs is determined as the set K; or otherwise, the sets of K1 can be used as the set K. Then, the HARQ-ACK bits to be allocated are determined according to the slot corresponding to each element in the set K. For one element in the set K, for one BWP, if the set of HARQ-ACK feedback delays configured on this BWP contains this element, the HARQ-ACK occasion to be allocated for this BWP is obtained by one of the following five embodiments, and the number of HARQ-ACK bits is then determined; or otherwise, the number of HARQ-ACK bits to be allocated for this BWP is 0. For one element in the set K, the number of HARQ-ACK bits to be allocated is equal to the maximum value of the number of HARQ-ACK bits to be allocated for the W BWPs.

For one carrier, when W BWPs are configured, for one slot, the HARQ-ACK occasion and the number of HARQ-ACK bits to be fed back within this slot can also be obtained by jointly processing the BWPs. For example, the W BWPs are jointly processed according to a superset of the sets of K1 on the BWPs as the set K, for example, by one of the following five embodiments.

Step 202: The UE generates an HARQ-ACK codebook according to the HARQ-ACK occasion and the number of HARQ-ACK bits occupied by the one slot, and transmits HARQ-ACK information.

For one carrier, when it is configured that K1 can have multiple possible values, within an uplink slot n, the UE needs to feed back HARQ-ACK information of PDSCHs of multiple slot n−K1. If it is assumed that the number of carriers of the UE is configured as Ncc (where the Ncc is greater than or equal to 1), the UE needs to feed back HARQ-ACK information of the Ncc carriers. Particularly, within an uplink slot n of an uplink carrier, the UE can feed back HARQ-ACK information of Ncc downlink carriers and HARQ-ACK information of PDSCHs of a slot corresponding to a set of K1 for each carrier. For example, the UE can cascade HARQ-ACK occasions of slots n−K1 (where K1∈K') in an increasing order of time to obtain all HARQ-ACK occasions corresponding to one carrier, where K' is a set of K1 required to feed back an HARQ-ACK within the slot n. Subsequently, the UE can further cascade HARQ-ACK occasions of Ncc carriers in an increasing order of carrier indexes.

For one carrier, if it is assumed that one BWP is configured, or only for the currently activated BWP, the HARQ-ACK occasion to be allocated for the one carrier can be obtained by the following method. Firstly, in accordance with the set of HARQ-ACK feedback delays configured on the BWP and for the slot corresponding to each element in the set, the HARQ-ACK occasion to be allocated for this BWP is obtained by one of the following five embodiments. Then, the HARQ-ACK occasion to be allocated with respect to each element in the set is cascaded to obtain the HARQ-ACK occasion to be allocated for the one carrier.

For one carrier, when W BWPs are configured (where W is greater than or equal to 1), for one slot, the HARQ-ACK occasion and the number of HARQ-ACK bits to be fed back for a BWP can be obtained by separately processing the BWP, and the HARQ-ACK occasion and the number of HARQ-ACK bits to be fed back within this slot are obtained by jointly processing the W BWPs.

For one carrier, when W BWPs are configured, the HARQ-ACK occasion to be allocated for the one carrier can be obtained by the following method. Firstly, if it is assumed that the sets of K1 configured on different BWPs can be different, a superset of the sets of HARQ-ACK feedback delays configured on the W BWPs is determined as the set K; or otherwise, the sets of K1 can be used as the set K. Then, the HARQ-ACK occasion to be allocated is determined according to the slot corresponding to each element in the set K. For one element in the set K, for one BWP, if the set of HARQ-ACK feedback delays configured on this BWP contains this element, the HARQ-ACK occasion to be allocated for this BWP is obtained by one of the following five embodiments; or otherwise, the number of HARQ-ACK occasions to be allocated for this BWP is 0. For one element in the set K, the number of HARQ-ACK occasion to be allocated is equal to the maximum value of the number of HARQ-ACK occasions to be allocated for the W BWPs. Subsequently, the HARQ-ACK occasion to be allocated with respect to each element in the set K is cascaded to obtain the HARQ-ACK occasion to be allocated for the one carrier.

Or, for one carrier, when W BWPs are configured, HARQ-ACK bits to be allocated for the one carrier can be obtained by the following method. Firstly, if it is assumed that the sets of K1 configured on different BWPs can be different, a superset of the set of HARQ-ACK feedback delays configured on the W BWPs is determined as the set K; or otherwise, the sets of K1 can be used as the set K. Then, the HARQ-ACK bits to be allocated are determined according to the slot corresponding to each element in the set K. For one element in the set K, for one BWP, if the set of HARQ-ACK feedback delays configured on this BWP contains this element, the HARQ-ACK occasion to be allocated for this BWP is obtained by one of the following five embodiments, and the number of HARQ-ACK bits is then determined; or otherwise, the number of HARQ-ACK bits to be allocated for this BWP is 0. For one element in the set K, the number of HARQ-ACK bits to be allocated is equal to the maximum value of the number of HARQ-ACK bits to be allocated for the W BWPs. Subsequently, the HARQ-ACK bits to be allocated for each element in the set K are cascaded to obtain the HARQ-ACK bits to be allocated for the one carrier.

For one carrier, when W BWPs are configured, for one slot, the HARQ-ACK occasion and the number of HARQ-ACK bits to be fed back within this slot can also be obtained by jointly processing the BWPs. For example, the W BWPs are jointly processed according to a superset of the sets of K1 on the BWPs as the set K, for example, by one of the following five embodiments. Subsequently, the HARQ-ACK bits to be allocated for each element in the set K are cascaded to obtain the HARQ-ACK bits to be allocated for the one carrier.

For one carrier, when a Semi-Persistent Scheduling (SPS) is configured, PDSCH resources allocated for SPS release can be indicated by DCI. A field for indicating K1 in the DCI can be redefined to indicate an HARQ-ACK timing for the SPS Release, i.e., the delay from a slot where the DCI is located to a slot where the HARQ-ACK is located. For one carrier, in order to feed back the HARQ-ACK of the SPS Release, in addition to the HARQ-ACK occasion determined for the one carrier, one HARQ-ACK bit is added to indicate whether the UE has received the SPS Release. The one HARQ-ACK bit can be located in front of the HARQ-ACK occasion determined for the one carrier, or located behind the HARQ-ACK occasion determined for the one carrier. Or, the one HARQ-ACK bit can be located in front of the HARQ-ACK occasion determined for the Ncc carriers, or located behind the HARQ-ACK occasion determined for the Ncc carriers. When the SPS is configured on multiple carriers, HARQ-ACK bits of the SPS Release of the multiple carriers can be correspondingly added in front of or behind the HARQ-ACK occasion determined for the Ncc carriers. Or, in the DCI of the indicating the SPS release, a virtual PDSCH can be indicated, so that the HARQ-ACK of the SPS Release is processed according to this virtual PDSCH. Specifically, in the DCI, the delay K0 from a slot where the DCI is located to a slot where the virtual PDSCH is located and the delay K1 from the slot where the virtual PDSCH is located to a slot where the HARQ-ACK is located are indicated, so that the slot for feeding back the HARQ-ACK of the SPS Release is determined. By this method, the HARQ-ACK of the SPS Release can occupy the HARQ-ACK occasion of the virtual PDSCH, so that the HARQ-ACK occasion can be determined by a method the same as that of other dynamic PDSCHs, for example, by one of the following five embodiments of the present invention.

For one carrier, when a Semi-Persistent Scheduling (SPS) is configured and after the SPS is activated, for a PDSCH allocated for the SPS, to feed back the HARQ-ACK of the SPS PDSCH, in addition to the HARQ-ACK occasion determined for the one carrier, one HARQ-ACK bit can be added to indicate the HARQ-ACK of the SPS PDSCH. The one HARQ-ACK bit can be located in front of the HARQ-ACK occasion determined for the one carrier, or located behind the HARQ-ACK occasion determined for the one carrier. Or, without distinguishing the SPS PDSCH from other dynamic PDSCHs, the HARQ-ACK occasion and the number of HARQ-ACK bits are determined by one of the following five embodiments of the present invention.

When the UE receives only one PDCCH, for example, when the UE receives one PDCCH on a primary carrier (Pcell), and if a Downlink Allocation Indicator count (C-DAI) of this PDCCH is a particular value (e.g., 1), the UE can feed back only HARQ-ACK bits corresponding to the one PDCCH. The PDCCH may schedule a dynamic PDSCH, or the PDCCH may not schedule a dynamic PDSCH, for example, SPS Release. In other cases, the UE can determine the HARQ-ACK codebook by the method for feeding back HARQ-ACKs of the Ncc carriers and HARQ-ACKs of a slot corresponding to the set of K1 for each carrier in the present invention. If it is assumed that the DCI of type 1 contains the C-DAI field and the DCI of type 2 does not contain the C-DAI field, when the UE receives only one PDCCH of the DCI of type 1 on the Pcell and the C-DAI is equal to 1, the UE can feed only one HARQ-ACK bit corresponding to the one PDCCH back; or otherwise, the UE determines the HARQ-ACK codebook by the method for feeding back HARQ-ACKs of the Ncc carriers and HARQ-ACKs of a slot corresponding to the set of K1 for each carrier in the present invention.

For one slot, the method for determining the number of allocated HARQ-ACK occasions and the method for mapping one PDSCH to one HARQ-ACK occasion in the present invention will be described below by embodiments.

Embodiment 1

For one slot, if the starting OFDM symbol and the number of symbols of a PDSCH can only be some particular values, the overhead for indicating time resources for the PDSCH can be reduced accordingly. All possible PDSCH time resources form a set T for configuring a PDSCH scheduling. Each element in the set T indicates one possibility of the starting OFDM symbol and the number of symbols of the PDSCH. Each element in the set T can further indicate the type of the PDSCH. Each element in the set T can further indicate a scheduling delay K0. The set T can only contain all possible PDSCH time resources corresponding to one BWP. When multiple BWPs are configured, for one element in the set K, the set T can contain all possible PDSCH time resources for the multiple BWPs. Or, when multiple BWPs are configured, for one element in the set K, the set T can contain all possible PDSCH time resources for this BWP if the set of K1 of the BWP contains the one element of the set K.

For example, the set T can be in form of a table, and an element in the set T corresponds to a row of the table; or, the set T can correspond to multiple tables, and an element in the set T corresponds to a row of one table. When multiple BWPs are configured, it is possible that a table is respectively configured for each BWP; and, for one element in the set K, the set T contains the table for a BWP if the set of K1 for the BWP contains the one element in the set K. Or, the set T can contain the tables for the multiple BWPs. For example, for one BWP, different tables are configured for the two DCI types respectively. The table for the DCI of type 1 of each BWP can be identical.

For one element in the set K, for one BWP, if the element only corresponds to one of the two DCI types, the set T can only contain the table for this DCI type; and, if the element corresponds to the two DCI types, the set T contains the tables for the two DCI types. Or, for one element in the set K, for one BWP, the set T always contain the tables for the two DCI types.

For one BWP, if identical rows in the table for the DCI of type 1 and the table for the DCI of type 2 are recorded as Ft, the DCI of type 2 can schedule PDSCHs by using rows in the table for the DCI of type 2, while the DCI of type 1 can only schedule PDSCHs by using rows in the Ft. By this method, the table which can schedule PDSCHs is the table for the DCI of type 2, so that the set T can always be the table for the DCI of type 2. For example, after the UE establishes an RRC connection, the DCI of type 1 can only schedule PDSCHs by using the rows in the Ft, and the overhead of the HARQ-ACK feedback is controlled by the above method. Before the UE establishes the RRC connection, the table for the DCI of type 2 is not yet configured, so that it is not necessary to limit that the DCI of type 1 can only schedule PDSCHs by using the rows in the Ft.

Or, for one element in the set K, for one BWP, if the element only corresponds to one of the two DCI types, the set T can only contain the table for this DCI type, and for the DCI of type 1, it is not limited that the DCI of type 1 can only schedule PDSCHs by using rows in the Ft; however, if the element corresponds to the two DCI types, the DCI of type 2 can schedule PDSCHs by using rows in the table for the DCI of type 2, and the DCI of type 1 can only schedule PDSCHs by using rows in the Ft, so that the set T can be the table for the DCI of type 2.

Or, for one BWP, the set T can contain the table for the DCI of type 2 and at least a part of rows of the table for the DCI of type 1. The number of HARQ-ACK bits calculated in the case where the set T contains at least a part of rows of the table for the DCI of type 1 is equal to the number of HARQ-ACK bits calculated in the case where the set T only contains the table for the DCI of type 2.

Or, for one element in the set K, for one BWP, if the element only corresponds to one of the two DCI types, the set T can only contain the table for this DCI type; however, if the element corresponds to the two DCI types, the set T can contain the table for the DCI of type 2 and at least a part of rows of the table for the DCI of type 1. The number of HARQ-ACK bits calculated in the case where the set T contains at least a part of rows of the table for the DCI of type 1 is equal to the number of HARQ-ACK bits calculated in the case where the set T only contains the table for the DCI of type 2.

The set T can further contain some other elements. For example, in order to support the SPS, the base station needs to dynamically activate the SPS and allocate PDSCH resources. For the activation of the SPS and the allocation of PDSCH resources, the related parameter K0, the starting OFDM symbol and the number of symbols of the PDSCH and the PDSCH type can be configured independently. After the activation of the SPS, without transmitting any PDCCH, the PDSCHs allocated for the SPS can be transmitted directly.

The following method in this embodiment can be used for allocating the HARQ-ACK occasion and the HARQ-ACK bit only for one BWP. At this time, the set K is a set of K1 for this BWP. Or, when multiple BWPs are configured, the following method in this embodiment can also be used for allocating HARQ-ACK occasions and HARQ-ACK bits for the multiple BWPs. At this time, the set K is a superset of the set of K1 for the multiple BWPs.

For an uplink slot n, in accordance with the set K of the parameter K1, it is possible that slot n−K1 corresponding to only a part of K1 needs to feed back HARQ-ACKs within the slot n. The set of K1 required to feed back HARQ-ACKs within the slot n is recorded as K. During the determination of the HARQ-ACK codebook for the slot n, only the set K' will be taken into consideration.

A first method for determining the set K' is as follows. A slot n−K1 (where K1∈K') should be able to transmit a PDSCH. The condition can be as follows: the slot n−K1 cannot only contain uplink OFDM symbols, for example, no downlink OFDM symbols and unknown OFDM symbols. The condition can also be as follows: for the slot n−K1, there is at least one element in the set T, any OFDM symbol of a PDSCH resource of the element cannot be indicated as an uplink OFDM symbol in a semi-static slot pattern. Here, it can be further required that the DCI type of the at least one element in the set T is the same as at least one DCI type corresponding to the parameter K1 on a BWP corresponding to at least one element in the set T.

A second method for determining the set K' is as follows. Within a slot n−K1 (where K1∈K'), PDSCH resources for the SPS are allocated; or, there is at least one element in the set T, and in accordance with the parameter K0 of this element or the independently indicated K0, a slot n−K1−K0 should be able to transmit a PDCCH to schedule the PDSCH resources for this element. The slot n−K1−K0 cannot only contain uplink OFDM symbols, for example, no downlink OFDM symbols and unknown OFDM symbols. The slot n−K1−K0 should be able to transmit a PDCCH according to the parameter K0 so as to schedule PDSCH resources for this element. For example, there is a PDCCH candidate within the slot n−K1−K0 in accordance with the configured PDCCH monitoring occasion, and the PDCCH candidate can schedule the PDSCH of this element according to the parameter K0. Here, it can be further required that the DCI type of the PDCCH candidate should be the same as at least one DCI type corresponding to at least one element in the set T; and/or, it can be further required that the DCI type of the at least one element in the set T is the same as at least one DCI type corresponding to the parameter K1 on a BWP corresponding to at least one element in the set T.

A third method for determining the set K' is as follows. For a slot n−K1, at least one element in the set T can satisfy the following conditions: 1) any OFDM symbol of a PDSCH resource of this element cannot be indicated as an uplink OFDM symbol in a semi-static slot pattern. 2) For the PDSCH resources allocated for the SPS, or in accordance with the parameter K0 of this element or the independently indicated K0, a slot n−K1−K0 should be able to transmit a PDCCH according to the parameter K0 so as to schedule the PDSCH resources for this element. Here, it can be further required that the DCI type of the PDCCH candidate should be the same as at least one DCI type corresponding to at least one element in the set T; and/or, it can be further required that the DCI type of the at least one element in the set T is the same as at least one DCI type corresponding to the parameter K1 on a BWP corresponding to at least one element in the set T.

A fourth method for determining the set K' is that K' is allowed to be equal to K. That is, no additional operations are unnecessary for determining K'.

For one carrier, if it is assumed that the number of elements in the set K' is NK, the HARQ-ACK codebook needs to include HARQ-ACK information of PDSCHs of NK slots. Moreover, for a slot of one element K1 in the set K', X HARQ-ACK occasions can be fixed, so that the total number of HARQ-ACK occasions allocated to this carrier is NK*X.

The parameter X can be equal to the number of elements in the set T. The k element in the set T is mapped to the $k^{th}$ HARQ-ACK occasion. In FIG. 1, X is equal to 8. For one slot, a special HARQ-ACK occasion is allocated to each possible PDSCH resource so as to maximize the flexibility of the base station in scheduling PDSCHs.

In accordance with the set T, HARQ-ACK occasions for PDSCHs of type A and HARQ-ACK occasions for PDSCHs of type B can be determined, respectively. For the set T, when multiple PDSCH resources of type A are configured, it is assumed that the base station will actually schedule at most one PDSCH of type A within one slot. In addition, within one slot, the base station can schedule zero, one or more PDSCHs of type B. If there are PDSCH resources of type A in the set T, the NTA is 1; or otherwise, the NTA is 0. Correspondingly, it is only necessary to allocate NTA HARQ-ACK occasions for PDSCHs of type A. NTB HARQ-ACK occasions are allocated for PDSCHs of type B, and the parameter X can be equal to NTB+NTA. For the X HARQ-ACK occasions, it is possible that, first, NTA occasions are used for PDSCHs of type A and then NTB occasions are used for PDSCHs of type B. Or, it is possible that, first, NTB occasions are used for PDSCHs of type B and then NTA occasions are used for PDSCHs of type A.

Based on the above analysis, the NTB can be equal to the number of PDSCH resources of type B in the set T. In FIG. 1, X is equal to 6, and PDSCH resources 301 to 303 are mapped to a same HARQ-ACK occasion. If the NTA is equal to 1, the HARQ-ACK occasions for PDSCHs of type A can be the first occasion, followed by NTB HARQ-ACK occasions for PDSCHs of type B; or, the NTB HARQ-ACK occasions for PDSCHs of type B can start from the first occasion, followed by the HARQ-ACK occasions for PDSCHs of type A. For an element of type B, one of the NTB HARQ-ACK occasions occupied by this element can be determined according to the order of elements in the set T, for example, according to the row number.

Or, if there are PDSCH resources of type B in the set T, the NTB is 1; or otherwise, the NTB is 0. The base station can schedule at most one PDSCH of type B within one slot. Correspondingly, it is only necessary to allocate NTB HARQ-ACK occasions for PDSCHs of type B. Or, it is supported that the base station schedules multiple PDSCHs of type B within one slot, and the UE can bind HARQ-ACK information of the multiple PDSCHs of type B so that the number of HARQ-ACK bits is equal to the number of HARQ-ACK bits of one PDSCH of type B. For example, if it is assumed that the PDSCHs are transmitted based on TBs, the binding can be to perform an AND operation on HARQ-ACKs of the multiple PDSCHs of type B. The AND operation means that, ACK is output when all bits are ACKs; or otherwise, NACK is output. If it is assumed that the PDSCHs of type B are generally applied to services having very high requirements for the delay and the reliability, since the error probability of PDCCHs is very low, the probability of occurrence of confusion during the binding is very low.

Or, it is assumed that the base station schedules at most Bmax PDSCHs of type B within one slot, where the Bmax is greater than 1 and the NTB can be equal to Bmax. In PDCCHs scheduling the PDSCHs of type B, a Downlink Allocation Indicator (DAI) can be included. For example, the DAI indicates that how many PDSCHs of type B are scheduled till to the current PDSCH of type B within the current slot. The UE can obtain one of Bmax HARQ-ACK occasions according to the value of the DAI. The parameter Bmax can be semi-statically configured by a higher-level signaling or predefined.

Or, if PDSCH resources for two elements of type B in the set T are overlapped completely or partially, it is assumed that the UE does not need to feed back HARQ-ACK information of the two PDSCHs, so that the number of HARQ-ACK occasions to be allocated can be reduced by utilizing this characteristic. Here, it is possible that the base station cannot simultaneously schedule the PDSCH resources for the two elements, or it is also possible that the UE only feeds back HARQ-ACK information of one PDSCH according to a certain preference strategy although the base station simultaneously schedules the PDSCH resources for the two elements. For all elements of type B in the set T, the total number NTB of HARQ-ACK occasions to be mapped is determined; and for each element of type B, one of the NTB HARQ-ACK occasions to which the element is mapped is determined. By this method, the NTB is equal to the maximum number of non-overlapped PDSCH resources among PDSCH resources for all elements of type B in the set T. In FIG. 1, X is equal to 3, PDSCH resources 101 to 103 are mapped to a same HARQ-ACK occasion, PDSCH resources 104, 105 and 107 are mapped to a same HARQ-ACK occasion, and PDSCH resources 106 and 108 are mapped to a same HARQ-ACK occasion.

In order to determine the NTB and one of the NTB HARQ-ACK occasions corresponding to a PDSCH of an element of type B in the set T, the following method can be used:

1) the counter h of HARQ-ACK occasions is initialized as 0;

2) for the current set T, the minimum index of an ending OFDM symbol of the PDSCH represented by each element of type B is determined as E;

3) for one element of type B in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements of type B satisfying S≤E are processed; and 4) h=h+1; if there are still elements of type B in the current set T, the process proceeds to 2); or otherwise, NTB=h, and the process ends.

Or, the following equivalent method can be used:

1) the counter h of HARQ-ACK occasions is initialized as 0;

2) the minimum index of an ending OFDM symbol of a PDSCH represented by each element of type B in the set T, which has been not yet allocated with any HARQ-ACK occasion, is determined as E;

3) for one element of type B in the set which has been not yet allocated with any HARQ-ACK occasion, if the index of the starting OFDM symbol of the PDSCH represented by this element is recorded as S and S×E, the PDSCH represented by the one element is mapped to an HARQ-ACK occasion h; and the step 3) is repeated until all elements of type B satisfying S≤E are processed; and 4) h=h+1; if not all elements of type B in the set T have been processed, the process proceeds to 2); or otherwise, NTB=h, and the process ends.

The flow of determining the NTB and the HARQ-ACK occasion of one element of type B in the present invention has been described above. Actually, the specific form of the flow should not be limited in the present invention, and any flow having the same effect or essence as the above method shall fall into the scope of the present invention.

For one slot n−K1, it is possible that at most one HARQ-ACK occasion is allocated so that the feedback overhead is reduced as far as possible. The parameter X is less than or equal to 1. If the UE receives the scheduling to multiple PDSCH within one slot n−K1 and the multiple PDSCHs are mapped to a same PUCCH feedback within an uplink slot n, the UE can only feed back HARQ-ACK information of one of the PDSCHs, for example, the latest scheduled PDSCH. Or, if the UE receives the scheduling to multiple PDSCHs within one slot S and the uplink slot for feeding back HARQ-ACKs for the multiple PDSCHs can include one or more slots, the UE only feeds back HARQ-ACK information of one PDSCH within the one slot S. For example, for only the latest scheduled PDSCH, the HARQ-ACK information of this PDSCH is fed back within an uplink slot for feeding back an HARQ-ACK for this PDSCH.

In the method for respectively determining HARQ-ACK occasions for PDSCHs of type A and HARQ-ACK occasions for PDSCHs of type B, in one possible scenario, when the base station has scheduled a PDSCH of type A within one slot, due to a more urgent service, the base station has to schedule a PDSCH of type B again within this slot, and the PDSCH of type B can even be mapped to part of or all of time-frequency resources of a PDSCH of type A. When this requirement is satisfied, for the PDSCH of type B, a small delay is generally required to feed back the HARQ-ACK, so that the setting of K1 is limited. In accordance with the various methods in this embodiment, for one slot n−K1, the method used for processing the HARQ-ACK occasion can be related to K1. When the delay of the HARQ-ACK feedback is large, the method for allocating at most one HARQ-ACK occasion for one slot n−K1 is employed; however, when the delay of the HARQ-ACK feedback is small, the method for respectively determining HARQ-ACK occasions for PDSCHs of type A and HARQ-ACK occasions for PDSCHs of type B is employed. For example, when K1 exceeds a threshold D, the method for allocating at most one HARQ-ACK occasion for one slot n−K1 is employed; however, when K1 is less than the threshold D, the method for respectively determining HARQ-ACK occasions for PDSCHs of type A and HARQ-ACK occasions for PDSCHs of type B is employed. Or, for the configured minimum value or multiple values of K1, the method for respectively determining HARQ-ACK occasions for PDSCHs of type A and HARQ-ACK occasions for PDSCHs of type B is employed; however, for other configured values of K1, the method for allocating at most one HARQ-ACK occasion for one slot n−K1 is employed.

In the various methods in this embodiment, one HARQ-ACK occasion is not related to the PDSCH type of schedulable elements in the set T, and Y HARQ-ACK bits are allocated. For one BWP, Y is the number of HARQ-ACK bits of the configured PDSCHs. When multiple BWPs are configured, Y can be the maximum value of the number of HARQ-ACK bits of PDSCHs configured on the multiple BWPs.

Or, in the various methods in this embodiment, if all elements in the set T employ the same PDSCH type, for the one HARQ-ACK occasion, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits configured for this PDSCH type on the multiple BWPs.

Or, in the various methods in this embodiment, if all elements in the set T employ the PDSCH type A, YA HARQ-ACK bits are allocated to one HARQ-ACK occasion; if all elements in the set T employ the PDSCH type B, YB HARQ-ACK bits are allocated to one HARQ-ACK occasion; and, if the elements in the set T employ both the PDSCH type A and the PDSCH type B, Y HARQ-ACK bits are allocated to one HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits configured for the PDSCH type A on the multiple BWPs, YB can be the maximum value of the number of HARQ-ACK bits configured for the PDSCH type B on the multiple BWPs, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, for one HARQ-ACK occasion, Y can be the maximum value of the number of HARQ-ACK bits of PDSCHs configured on BWPs of all elements mapped to this HARQ-ACK occasion in the set T.

Or, in the various methods in this embodiment, for one HARQ-ACK occasion, if all elements mapped to this HARQ-ACK occasion in the set T employ the PDSCH type A, YA HARQ-ACK bits are allocated to this HARQ-ACK occasion; if all elements mapped to this HARQ-ACK occasion in the set T employ the PDSCH type B, YB HARQ-ACK bits are allocated to this HARQ-ACK occasion; and, if the elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, for one HARQ-ACK occasion, YA can be the maximum value of the number of HARQ-ACK bits configured on BWPs of all elements of the PDSCH type A mapped to this HARQ-ACK occasion in the set T, YB can be the maximum value of the number of HARQ-ACK bits configured on BWPs of all elements of the PDSCH type B mapped to this HARQ-ACK occasion in the set T, and Y is the larger one of the YA and YB.

Embodiment 2

For one slot, it is assumed that the starting OFDM symbol and the number of symbols of a PDSCH can only be some particular values, so that the overhead for indicating the PDSCH time resources can be reduced. All possible PDSCH time resources form a set T for configuring a PDSCH scheduling. Each element in the set T indicates one possibility of the starting OFDM symbol and the number of symbols of the PDSCH. Each element in the set T can further indicate the type of the PDSCH. The set T can only contain all possible PDSCH time resources corresponding to one BWP. When multiple BWPs are configured, for one element in the set K, the set T can contain all possible PDSCH time resources for the multiple BWPs. Or, when multiple BWPs are configured, for one element in the set K, the set T can contain all possible PDSCH time resources for a BWP if the set of K1 of the BWP contains the one element of the set K.

For example, the set T can be in form of a table, and an element in the set T corresponds to a row of the table; or, the set T can correspond to multiple tables, and an element in the set T corresponds to a row of one table. When multiple BWPs are configured, it is possible that a table is respectively configured for each BWP; and, for one element in the set K, the set T contains the table for a BWP if the set of K1 for the BWP contains the one element in the set K. Or, the set T can contain the tables for the multiple BWPs. For example, for one BWP, different tables are configured for the two DCI types respectively. The table for the DCI of type 1 of each BWP can be identical.

For one element in the set K, for one BWP, if the element only corresponds to one of the two DCI types, the set T can only contain the table for this DCI type; and, if the element corresponds to the two DCI types, the set T contains the tables for the two DCI types. Or, for one element in the set K, for one BWP, the set T always contain the tables for the two DCI types. Here, it is assumed that the K0 and the starting OFDM symbol and the number of symbols of the PDSCH are indicated independently.

For one BWP, if identical rows in the table for the DCI of type 1 and the table for the DCI of type 2 are recorded as Ft, the DCI of type 2 can schedule PDSCHs by using rows in the table for the DCI of type 2, while the DCI of type 1 can only schedule PDSCHs by using rows in the Ft. By this method, the table used for scheduling PDSCHs is the table for the DCI of type 2, so that the set T can always be the table for the DCI of type 2. For example, after the UE establishes an RRC connection, the DCI of type 1 can only schedule PDSCHs by using the rows in the Ft, and the overhead of the HARQ-ACK feedback is controlled by the above method. Before the UE establishes the RRC connection, the table for the DCI of type 2 is not yet configured, so that it is not necessary to limit that the DCI of type 1 can only schedule PDSCHs by using the rows in the Ft.

Or, for one element in the set K, for one BWP, if the element only corresponds to one of the two DCI types, the set T can only contain the table for this DCI type, and for the DCI of type 1, it is not limited that the DCI of type 1 can only schedule PDSCHs by using rows in the Ft; however, if the element corresponds to the two DCI types, the DCI of type 2 can schedule PDSCHs by using rows in the table for the DCI of type 2, and the DCI of type 1 can only schedule PDSCHs by using rows in the Ft, so that the set T can be the table for the DCI of type 2.

Or, for one BWP, the set T can contain the table for the DCI of type 2 and at least parts of rows of the table for the DCI of type 1. The number of HARQ-ACK bits calculated in the case where the set T contains at least a part of rows of the table for the DCI of type 1 is equal to the number of HARQ-ACK bits calculated in the case where the set T only contains the table for the DCI of type 2.

Or, for one element in the set K, for one BWP, if the element only corresponds to one of the two DCI types, the set T can only contain the table for this DCI type; however, if the element corresponds to the two DCI types, the set T can contain the table for the DCI of type 2 and at least a part of rows of the table for the DCI of type 1. The number of HARQ-ACK bits calculated in the case where the set T contains at least a part of rows of the table for the DCI of type 1 is equal to the number of HARQ-ACK bits calculated in the case where the set T only contains the table for the DCI of type 2.

The set T can further contain some other elements. For example, in order to support the SPS, the base station needs to dynamically activate the SPS and allocate PDSCH resources. For the activation of the SPS and the allocation of PDSCH resources, the related parameter K0, the starting OFDM symbol and the number of symbols of the PDSCH and the PDSCH type can be configured independently. After the activation of the SPS, without transmitting any PDCCH, the PDSCHs allocated for the SPS can be transmitted directly.

The following method in this embodiment can be used for allocating the HARQ-ACK occasion only for one BWP. At this time, the set K is a set of K1 for this BWP. Or, when multiple BWPs are configured, the following method in this embodiment can also be used for allocating HARQ-ACK occasions for the multiple BWPs. At this time, the set K is a superset of the set of K1 for the multiple BWPs.

For an uplink slot n, in accordance with the set K of the parameter K1, it is possible that slot n−K1 corresponding to only a part of K1 needs to feed back HARQ-ACKs within the slot n. The set of K1 required to feed back HARQ-ACKs within the slot n is recorded as K'. During the determination of an HARQ-ACK codebook for the slot n, only the set K' will be taken into consideration.

A first method for determining the set K' is as follows. A slot n−K1 (where K1∈K') should be able to transmit a PDSCH. The condition can be that the slot n−K1 cannot only contain uplink OFDM symbols, for example, no downlink OFDM symbols and unknown OFDM symbols. The condition can also be as follows: for the slot n−K1, there is at least one element in the set T, any OFDM symbol of a PDSCH resource of the element cannot be indicated as an uplink OFDM symbol in a semi-static slot pattern. Here, it can be further required that the DCI type of the at least one element in the set T is the same as at least one DCI type of the corresponding parameter K1 on a BWP corresponding to at least one element in the set T.

A second method for determining the set K' is as follows. Within a slot n−K1 (where K1∈K'), PDSCH resources for the SPS are allocated; or, there is at least one parameter K0 so that a slot n−K1−K0 should be able to transmit a PDCCH to schedule the PDSCH resources for this element. The slot n−K1−K0 cannot only contain uplink OFDM symbols, for example, no downlink OFDM symbols and unknown OFDM symbols. The slot n−K1−K0 should be able to transmit a PDCCH according to the parameter K0 so as to schedule PDSCH resources for this element. For example, as shown in FIG. 3, there are PDCCH candidates within the slot n−K1−K0 in accordance with the parameter K0 and the configured PDCCH monitoring occasion, and the PDCCH candidate can schedule the PDSCH of this element according to the parameter K0. Here, it can be further required that the DCI type of the PDCCH candidate should be the same as at least one DCI type corresponding to at least one element in the set T; and/or, it can be further required that the DCI type of the at least one element in the set T is the same as at least one DCI type corresponding to the parameter K1 on a BWP corresponding to at least one element in the set T.

A third method for determining the set K' is as follows. For a slot n−K1, at least one element in the set T can satisfy the following conditions: 1) any OFDM symbol of a PDSCH resource for this element cannot be indicated as an uplink OFDM symbol in a semi-static slot pattern. 2) For PDSCH resources for the SPS are allocated; or, there is at least one parameter K0 so that a slot n−K1−K0 should be able to transmit a PDCCH to schedule the PDSCH resources for this element. Here, it can be further required that the DCI type of the PDCCH candidate should be the same as at least one DCI type corresponding to at least one element in the set T; and/or, it can be further required that the DCI type of the at least one element in the set T is the same as at least one DCI type corresponding to the parameter K1 on a BWP corresponding to at least one element in the set T.

A fourth method for determining the set K' is that K' is allowed to be equal to K. That is, no additional operations are needed to determine K'.

For one slot n−K1 (where K1∈K'), in accordance with a semi-static slot pattern (it is possible to employ the indication method in the first level and/or the second level) and according to the configured set T, the total number X of HARQ-ACK occasions to which all possible PDSCH time resources within one slot are necessary to be mapped is determined; and for each PDSCH time resource in the set T, one of the X HARQ-ACK occasions to which the PDSCH time resource is mapped is determined.

In accordance with the semi-statically configured slot pattern or other information, it is possible that PDSCH resources for only part of elements in the set T are schedulable. For one slot, the number of required HARQ-ACK occasions can be determined according to schedulable elements in the set T, and then one HARQ-ACK occasion occupied by one schedulable element is determined. For one slot, each schedulable element satisfies the following condition: any OFDM symbol of a PDSCH resource for the schedulable element cannot be indicated as an uplink OFDM symbol in a semi-static slot pattern. Or, each schedulable element satisfies the following condition: the DCI type of the schedulable element is the same as at least one DCI type corresponding to the parameter K1 on a BWP corresponding to the schedulable element. Or, each schedulable element satisfies the following conditions: any OFDM symbol of a PDSCH resource for the schedulable element cannot be indicated as an uplink OFDM symbol in a semi-static slot pattern, and the DCI type of the schedulable element is the same as at least one DCI type corresponding to the parameter K1 on a BWP corresponding to the schedulable element. As shown in FIG. 3, since the last two OFDM symbols 311 and 312 of the slot are uplink OFDM symbols, PDSCH resources 303 and 308 are not schedulable. Therefore, for this slot, the required HARQ-ACK occasions can be determined only according to the PDSCH resources 301, 302 and 304-307.

When it is supported that one PDSCH spans over N slots, for one slot n−K1, schedulable elements in the set T can be obtained with reference to the N slots of the PDSCH, i.e., a slot n−K1+q, where q=0, 1, . . . N−1. Subsequently, for the slot n−K1, the number of required HARQ-ACK occasions can be determined according to the schedulable elements in the set T, and then one HARQ-ACK occasion occupied by one schedulable element is determined. For the slot n−K1, each schedulable element satisfies the following conditions: there is at least one q, and within the slot n−K1+q, any OFDM symbol of a PDSCH resource for this schedulable element cannot be indicated as an uplink OFDM symbol in a semi-static slot pattern. Or, each schedulable element satisfies the following conditions: there is at least one q, and within the slot n−K1+q, the DCI type of this schedulable element is the same as at least one DCI type corresponding to the parameter K1. Or, each schedulable element satisfies the following conditions: there is at least one q, and within the slot n−K1+q, any OFDM symbol of a PDSCH resource for this schedulable element cannot be indicated as an uplink OFDM symbol in a semi-static slot pattern; and, the DCI type of this schedulable element is the same as at least one DCI type corresponding to the parameter K1.

The parameter X can be equal to the number of schedulable elements in the set T. The $k^{th}$ schedulable element in the set T is mapped to the $k^{th}$ HARQ-ACK occasion. In FIG. 3, X is equal to 6. For one slot, a special HARQ-ACK occasion is allocated to each schedulable PDSCH resource so as to maximize the flexibility of the base station in scheduling PDSCHs.

In accordance with the schedulable elements in the set T, HARQ-ACK occasions for PDSCHs of type A and HARQ-ACK occasions for PDSCHs of type B can be determined, respectively. For the set T, when multiple PDSCH resources of type A are configured, it is assumed that the base station will actually schedule at most one PDSCH of type A within only one slot. In addition, within one slot, the base station can schedule zero, one or more PDSCHs of type B. If there are schedulable PDSCH resources of type A in the set T, the NTA is 1; or otherwise, the NTA is 0. Correspondingly, it is only necessary to allocate NTA HARQ-ACK occasions for PDSCHs of type A. NTB HARQ-ACK occasions are allocated for PDSCHs of type B, and the parameter X can be equal to NTB+NTA. For the X HARQ-ACK occasions, it is possible that, first, NTA occasions are used for PDSCHs of type A, and then NTB occasions are used for PDSCHs of type B. Or, it is possible that, first, NTB occasions are used for PDSCHs of type B, then NTA occasions are used for PDSCHs of type A.

Based on the above analysis, the NTB can be equal to the number of schedulable PDSCH resources of type B in the set T. In FIG. 3, X is equal to 5, and PDSCH resources 301 and 302 are mapped to a same HARQ-ACK occasion. If the NTA is equal to 1, the HARQ-ACK occasions for PDSCHs of type A can be the first occasion, followed by NTB HARQ-ACK occasions for PDSCHs of type B; or, if the NTB is greater than or equal to 1, the NTB HARQ-ACK occasions for PDSCHs of type B can start from the first occasion, followed by the HARQ-ACK occasions for PDSCHs of type A. For a schedulable element of type B, one of the NTB HARQ-ACK occasions occupied by this element can be determined according to the order of elements in the set T, for example, according to the row number.

Or, if there are schedulable PDSCH resources of type B in the set T, the NTB is 1; or otherwise, the NTB is 0. The base station can schedule at most one PDSCH of type B within one slot, and correspondingly, it is only necessary to allocate NTB HARQ-ACK occasions for the PDSCH of type B. Or, it is supported that the base station schedules multiple PDSCHs of type B within one slot, and the UE can bind HARQ-ACK information of the multiple PDSCHs of type B so that the number of HARQ-ACK bits is equal to the number of HARQ-ACK bits of one PDSCH of type B. For example, if it is assumed that the PDSCHs are transmitted based on TBs, the binding can be to perform an AND operation on HARQ-ACKs of the multiple PDSCHs of type B. The AND operation means that, ACK is output when all bits are ACKs, or otherwise, NACK is output. If it is assumed that the PDSCHs of type B are generally applied to services having very high requirements for the delay and the reliability, since the error probability of PDCCHs is very low, the probability of occurrence of confusion during the binding is very low.

Or, it is assumed that the base station at most schedules Bmax PDSCHs of type B within one slot, where the Bmax is greater than 1, and the NTB can be equal to Bmax or $\min(B_{max}, N_B)$. The N is the number of schedulable elements of type B in the set T. In PDCCHs scheduling the PDSCHs of type B, a DAI can be included. For example, the DAI indicates that how many PDSCHs of type B are scheduled till to the current PDSCH of type B within the current slot. The UE can obtain one of Bmax HARQ-ACK occasions according to the value of the DAI. The parameter Bmax can be semi-statically configured by a higher-level signaling or predefined.

Or, if PDSCH resources for two elements of type B in the set T are overlapped completely or partially, it is assumed that the UE does not need to feed back HARQ-ACK information of the two PDSCHs, so that the number of HARQ-ACK occasions to be allocated can be reduced by utilizing this characteristic. Here, it is possible that the base station cannot simultaneously schedule the PDSCH resources for the two elements, or it is also possible that the UE feeds back HARQ-ACK information of only one PDSCH according to a certain preference strategy although the base station simultaneously schedules the PDSCH resources for the two elements. For all schedulable elements of type B in the set T, the total number NTB of HARQ-ACK occasions to be mapped is determined; and for each schedulable element of type B, one of the NTB HARQ-ACK occasions to which the element is mapped is determined. By this method, the NTB is equal to the maximum number of non-overlapped PDSCH resources among PDSCH resources for all schedulable elements of type B in the set T. In FIG. 3, X is equal to 3, PDSCH resources 301 and 302 are mapped to a same HARQ-ACK occasion, and PDSCH resources 304, 305 and 307 are mapped to a same HARQ-ACK occasion.

In order to determine the NTB and one of the NTB HARQ-ACK occasions corresponding to a PDSCH of a schedulable element of type B in the set T, the following method can be used.

A first method for determining HARQ-ACK occasions of PDSCH time resources for schedulable elements of type B in the set T is as follows.

Firstly, schedulable elements of type B in the set T are marked according to a semi-static slot pattern. Specifically, for one element of type B in the set T, in accordance with the starting OFDM symbol and the number of OFDM symbols, if any OFDM symbol of this PDSCH is not indicated as an uplink OFDM symbol in the semi-static slot pattern, this element in the set T is marked as being available.

Then, for the set T, for each element of type B, one of the NTB HARQ-ACK occasion to which this element is mapped is determined.

For example, the following method is employed:
1) the counter h of HARQ-ACK occasions is initialized as 0;
2) for the current set T, the minimum index of an ending OFDM symbol of the PDSCH represented by each schedulable element is determined as E;
3) for one schedulable element in the current set T, if the index of the starting OFDM symbol of the PDSCH represented by this schedulable element is recorded as S and S≤E, the PDSCH represented by the one element is mapped to an HARQ-ACK occasion h; the one element is removed from the current set T; and the step 3) is repeated until all schedulable elements satisfying S≤E are processed; and
4) h=h+1; if there are still schedulable elements in the set T, the process proceeds to 2); or otherwise, NTB=h, and the process ends.

For example, the following method is employed:
1) the counter h of HARQ-ACK occasions is initialized as 0;
2) the minimum index of an ending OFDM symbol of a PDSCH represented by each schedulable element in the set T, which has been not yet allocated with any HARQ-ACK occasion, is determined as E;
3) for one schedulable element in the set T which has been not yet allocated with any HARQ-ACK occasion, if the index of the starting OFDM symbol of the PDSCH represented by this schedulable element is recorded as S and S≤E, the PDSCH represented by the one element is mapped to an HARQ-ACK occasion h; and the step 3) is repeated until all schedulable elements satisfying S≤E are processed; and
4) h=h+1; if not all schedulable elements in the set T have been processed, the process proceeds to 2); or otherwise, NTB=h, and the process ends.

A second method for determining HARQ-ACK occasions of PDSCH time resources for schedulable elements of type B in the set T is as follows.

For the set T, for each element of type B, one of the NTB HARQ-ACK occasion to which this element is mapped is determined.

For example, the following method is employed:
1) the counter h of HARQ-ACK occasions is initialized as 0;
2) for the current set T, the minimum index of an ending OFDM symbol of the PDSCH represented by each schedulable element of type B in the set T is determined as E; if the OFDM symbol E is indicated as an uplink OFDM symbol in a semi-static slot pattern, NTB=h; or otherwise, the process ends;
3) for one schedulable element of type B in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all schedulable elements of type B satisfying S≤E are processed; and
4) h=h+1; if there are still schedulable elements of type B in the current set T, the process proceeds to 2); or otherwise, NTB=h, and the process ends.

Or, the following equivalent method is employed:
1) the counter h of HARQ-ACK occasions is initialized as 0;
2) the minimum index of an ending OFDM symbol of a PDSCH represented by each schedulable element of type B in the set T, which has been not yet allocated with any HARQ-ACK occasion, is determined as E; if the OFDM symbol E is indicated as an uplink OFDM symbol in a semi-static slot pattern, NTB=h; or otherwise, the process ends;
3) for one schedulable element of type B in the set T which has been not yet allocated with any HARQ-ACK occasion, if the index of the starting OFDM symbol of the PDSCH represented by this element is recorded as S and S≤E, the PDSCH represented by the one element is mapped to an HARQ-ACK occasion h; and the step 3) is repeated until all schedulable elements of type B satisfying S≤E are processed; and 4) h=h+1; if not all schedulable elements of type B in the set T have been processed, the process proceeds to 2); or otherwise, NTB=h, and the process ends.

A third method for determining HARQ-ACK occasions of PDSCH time resources for schedulable elements of type B in the set T is as follows.

For the set T, depending upon the condition that all OFDM symbols of one slot are not uplink OFDM symbols, the total number of MK1 of HARQ-ACK occasions to which all schedulable elements of type B are to be mapped is determined; and for each schedulable element of type B, one of the MK1 HARQ-ACK occasions to which this element is mapped is determined.

For example, the following method is employed:

1) the counter h of HARQ-ACK occasions is initialized as 0;

2) for the current set T, the minimum index of an ending OFDM symbol of the PDSCH represented by each schedulable element of type B is determined as E;

3) for one schedulable element of type B in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all schedulable elements of type B satisfying S≤E are processed; and 4) h=h+1; if there are still schedulable elements of type B in the set T, the process proceeds to 2); or otherwise, NTB=h, and the process ends.

Or, the following equivalent method is employed:

1) the counter h of HARQ-ACK occasions is initialized as 0;

2) the minimum index of an ending OFDM symbol of a PDSCH represented by each schedulable element of type B in the set T, which has been not yet allocated with any HARQ-ACK occasion, is determined as E;

3) for one schedulable element of type B in the set T which has been not yet allocated with any HARQ-ACK occasion, if the index of the starting OFDM symbol of the PDSCH represented by this element is recorded as S and S≤E, the PDSCH represented by the one element is mapped to an HARQ-ACK occasion h; and the step 3) is repeated until all schedulable elements of type B satisfying S≤E are processed; and 4) h=h+1; if not all schedulable elements of type B in the set T have been processed, the process proceeds to 2); or otherwise, NTB=h, and the process ends.

In accordance with the semi-static slot pattern, if the maximum value of the index of the HARQ-ACK occasion of a schedulable element of type B in the set is recorded as hmax, the total number NTB of HARQ-ACK occasions to which the schedulable elements of type B within a slot n−K1 are to be mapped is equal to hmax+1.

The flow of determining the NTB and the HARQ-ACK occasion of one element of type B in the present invention has been described above. Actually, the specific form of the flow should not be limited in the present invention, and any flow having the same effect or essence as the above method shall fall into the scope of the present invention.

For one slot n−K1, it is possible that at most one HARQ-ACK occasion is allocated so that the feedback overhead is reduced as far as possible. If there are schedulable elements in the set T, the parameter X is 1; or otherwise, the parameter X is 0. If it is assumed that the UE receives the scheduling to multiple PDSCHs within one slot n−K1 and the multiple PDSCHs are mapped to a same PUCCH feedback within an uplink slot n, the UE can feed back HARQ-ACK information of only one of the PDSCHs, for example, the latest scheduled PDSCH. Or, if it is assumed that the UE receives the scheduling to multiple PDSCHs within one slot S, the uplink slot for feeding back HARQ-ACKs for the multiple PDSCHs can include one or more slots, and the UE only feeds back HARQ-ACK information of one PDSCH within the one slot S. For example, for only the latest scheduled PDSCH, the HARQ-ACK information of this PDSCH is fed back within an uplink slot for feeding back an HARQ-ACK for this PDSCH.

In the method for respectively determining HARQ-ACK occasions for PDSCHs of type A and HARQ-ACK occasions for PDSCHs of type B, in one possible scenario, when the base station has scheduled a PDSCH of type A within one slot, due to a more urgent service, the base station has to schedule the PDSCH of type B again within this slot, and the PDSCH of type B can even be mapped to part of or all of time-frequency resources of the PDSCH of type A. When this requirement is satisfied, for the PDSCH of type B, a small delay is generally required to feed back the HARQ-ACK, so that the setting of K1 is limited. In accordance with the various methods in this embodiment, for one slot n−K1, the method used for processing the HARQ-ACK occasion can be related to K1. When the delay of the HARQ-ACK feedback is large, the method for allocating at most one HARQ-ACK occasion for one slot n−K1 is employed; however, when the delay of the HARQ-ACK feedback is small, the method for respectively determining HARQ-ACK occasions for PDSCHs of type A and HARQ-ACK occasions for PDSCHs of type B is employed. For example, when K1 exceeds a threshold D, the method for allocating at most one HARQ-ACK occasion for one slot n−K1 is employed; however, when K1 is less than the threshold D, the method for respectively determining HARQ-ACK occasions for PDSCHs of type A and HARQ-ACK occasions for PDSCHs of type B is employed. Or, for the configured minimum value or multiple values of K1, the method for respectively determining HARQ-ACK occasions for PDSCHs of type A and HARQ-ACK occasions for PDSCHs of type B is employed; however, for other configured values of K1, the method for allocating at most one HARQ-ACK occasion for one slot n−K1 is employed.

In the various embodiments of this embodiment, one HARQ-ACK occasion is not related to the PDSCH type of schedulable elements in the set T, and Y HARQ-ACK bits are allocated. For one BWP, Y is the number of HARQ-ACK bits of the configured PDSCHs. When multiple BWPs are configured, Y can be the maximum value of the number of HARQ-ACK bits of PDSCHs configured on the multiple BWPs.

Or, in the various methods in this embodiment, if it is assumed that all elements in the set T employ the same PDSCH type, for the one HARQ-ACK occasion, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits configured for this PDSCH type on the multiple BWPs.

Or, in the various methods in this embodiment, if all elements in the set T employ the PDSCH type A, YA HARQ-ACK bits are allocated to one HARQ-ACK occasion; if all elements in the set T employ the PDSCH type B, YB HARQ-ACK bits are allocated to one HARQ-ACK occasion; and, if the elements in the set T employ both the PDSCH type A and the PDSCH type B, Y HARQ-ACK bits are allocated to one HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits configured for the PDSCH type A on the multiple BWPs, YB can be the maximum value of the number of HARQ-ACK bits configured for the PDSCH type B on the multiple BWPs, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, for one HARQ-ACK occasion, Y can be the maximum value of the number of HARQ-ACK bits of PDSCHs configured on BWPs of all elements mapped to this HARQ-ACK occasion in the set T.

Or, in the various methods in this embodiment, for one HARQ-ACK occasion, if all elements mapped to this HARQ-ACK occasion in the set T employ the PDSCH type A, YA HARQ-ACK bits are allocated to this HARQ-ACK occasion; if all elements mapped to this HARQ-ACK occasion in the set T employ the PDSCH type B, YB HARQ-ACK bits are allocated to this HARQ-ACK occasion; and, if the elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, for one HARQ-ACK occasion, YA can be the maximum value of the number of HARQ-ACK bits configured on BWPs of all elements of the PDSCH type A mapped to this HARQ-ACK occasion in the set T, YB can be the maximum value of the number of HARQ-ACK bits configured on BWPs of all elements of the PDSCH type B mapped to this HARQ-ACK occasion in the set T, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, Y can be the maximum value of the number of HARQ-ACK bits of PDSCHs configured on BWPs of all schedulable elements in the set T.

Or, in the various methods in this embodiment, if it is assumed that all schedulable elements in the set T employ the same PDSCH type, for the one HARQ-ACK occasion, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits of PDSCHs configured on BWPs of all schedulable elements of this PDSCH type in the set T.

Or, in the various methods in this embodiment, if all schedulable elements in the set T employ the PDSCH type A, YA HARQ-ACK bits are allocated to one HARQ-ACK occasion; if all schedulable elements in the set T employ the PDSCH type B, YB HARQ-ACK bits are allocated to one HARQ-ACK occasion; and, if the schedulable elements in the set T employ both the PDSCH type A and the PDSCH type B, Y HARQ-ACK bits are allocated to one HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits of PDSCHs configured on BWPs of all schedulable elements of the PDSCH type A in the set T, YB can be the maximum value of the number of HARQ-ACK bits of PDSCHs configured on BWPs of all schedulable elements of the PDSCH type B in the set T, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, for one HARQ-ACK occasion, Y can be the maximum value of the number of HARQ-ACK bits of PDSCHs configured on BWPs of all schedulable elements mapped to this HARQ-ACK occasion in the set T.

Or, in the various methods in this embodiment, for one HARQ-ACK occasion, if all schedulable elements mapped to this HARQ-ACK occasion in the set T employ the PDSCH type A, YA HARQ-ACK bits are allocated to this HARQ-ACK occasion; if all schedulable elements mapped to this HARQ-ACK occasion in the set T employ the PDSCH type B, YB HARQ-ACK bits are allocated to this HARQ-ACK occasion; and, if the schedulable elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, for one HARQ-ACK occasion, YA can be the maximum value of the number of HARQ-ACK bits of PDSCHs configured on BWPs of all schedulable elements of the PDSCH type A mapped to this HARQ-ACK occasion in the set T, YB can be the maximum value of the number of HARQ-ACK bits of PDSCHs configured on BWPs of all schedulable elements of the PDSCH type B mapped to this HARQ-ACK occasion in the set T, and Y is the larger one of the YA and YB.

Embodiment 3

For one slot, it is assumed that the K0, the starting OFDM symbol and the number of symbols of a PDSCH can only be some particular values, so that the overhead for indicating PDSCH time resources can be reduced. All possible PDSCH time resources form a set T for configuring a PDSCH scheduling. Each element in the set T can indicate one possibility of the K0, the starting OFDM symbol and the number of symbols of the PDSCH. Each element in the set T can further indicate the type of the PDSCH. The set T can only contain all possible PDSCH time resources corresponding to one BWP. When multiple BWPs are configured, for one element in the set K, the set T can contain all possible PDSCH time resources for the multiple BWPs. Or, when multiple BWPs are configured, for one element in the set K, the set T can contain all possible PDSCH time resources for a BWP if the set of K1 of the BWP contains the one element of the set K.

For example, the set T can be in form of a time resource table, and an element in the set T corresponds to a row of the time resource table; or, the set T can correspond to multiple time resource tables, and an element in the set T corresponds to a row of one time resource table. When multiple BWPs are configured, it is possible that a time resource table is respectively configured for each BWP; and, for one element in the set K, the set T contains the time resource table for a BWP if the set of K1 for the BWP contains the one element in the set K. Or, the set T can contain the time resource tables for the multiple BWPs.

For one BWP, the time resource table for two DCI types may be the same, so that the set T is the same time resource table. Alternatively, for one BWP, the UE may receive the PDSCH according to the D time resource tables, for example, D is equal to 2. The time resource table of the DCI of type 2 is expressed as time resource table A. For example, different time resource tables may be configured separately for the two DCI types. The time resource table for the DCI of type 1 of each BWP may be the same. For the DCI of type 1, the UE may receive the PDSCH according to the D time resource tables, and one of the time resource tables is the same as the time resource table A described above. For example, the time resource table for the DCI of type 1 transmitted within the CSS and the USS may be different, and the time resource table for the DCI of type 1 transmitted within the USS is the same as the DCI of type 2 (i.e. the time resource table A). Alternatively, the time resource tables for the DCI of type 1 of different CSSs may be different. In the NR system, a control resource set (CORESET) is used for transmitting the PDCCH, wherein CORESET 0 is a common CORESET indicated by pdcch-ConfigSIB1 of the PBCH, and it is possible to schedule transmission of remaining system information (RMSI) and etc. Differentiating the CSS associated with CORESET 0 and the CSS not associated with CORESET 0, the time resource table for the DCI of type 1 may be different, and the time resource table for the DCI of type 1 transmitted within the CSS not associated with CORESET 0 described above is the same as the DCI of type 1 and the DCI of type 2 within the USS (i.e. the time resource table A).

For example, in the NR system, three types of multiplexing patterns of synchronization channels/PBCH and CORE-SET 0/RMSI are supported, and correspondingly, time resource tables corresponding to the three multiplexing patterns are predefined, which are used to transmit the RMSI, respectively. Wherein, the first multiplexing pattern supports the multiplexing of the synchronization channel/PBCH, CORESET 0 and RMSI by using Time Division Multiplexing (TDM). In the communication after receiving the RMSI, for the DCI of type 1 and the DCI of type 2 in the USS and the DCI of type 1 of the CSS not associated with CORESET 0, if the high layer signaling is configured with a dedicated time resource table, this table is used to schedule PDSCH transmission; if the dedicated time resource table is not configured, but a time resource table is configured in the RMSI, the time resource table configured in the RMSI is used to schedule the PDSCH transmission; if the dedicated time resource table is not configured, the time resource table is not configured in RMSI either, the time resource table of the first multiplexing pattern described above is used to schedule the PDSCH transmission. For the DCI of type 1 of the CSS associated with CORESET 0, if the time resource table is configured in the RMSI, this table is used to schedule the PDSCH transmission; if the time resource table is not configured in the RMSI, the time resource table of the first multiplexing pattern described above is used to schedule the PDSCH transmissions.

For one element in the set K, for one BWP, if the element corresponds to only one of the two DCI types, the set T can only contain the time resource table for this DCI type; and, if the element corresponds to the two DCI types, the set T contains the time resource tables for the two DCI types. Or, for one element in the set K, for one BWP, the set T always contain the time resource tables for the two DCI types. For one BWP, assuming that the UE receives the PDSCH according to the D time resource tables, the D time resource tables need to be contained in the set T.

Or, for one BWP, if identical rows in the time resource table for the DCI of type 1 and the time resource table for the DCI of type 2 are recorded as Ft, the DCI of type 2 can schedule PDSCHs by using rows in the time resource table for the DCI of type 2, while the DCI of type 1 can only schedule PDSCHs by using rows in the Ft. By this method, the table used for scheduling PDSCHs is the time resource table for the DCI of type 2, so that the set T can always be the time resource table for the DCI of type 2. For example, after the UE establishes an RRC connection, the DCI of type 1 can only schedule PDSCHs by using the rows in the Ft, and the overhead of the HARQ-ACK feedback is controlled by the above method. Before the UE establishes the RRC connection, the time resource table for the DCI of type 2 is not yet configured, so that it is not necessary to limit that the DCI of type 1 can only schedule PDSCHs by using the rows in the Ft. Or, for one BWP, it is assumed that the UE receives the PDSCH according to the D time resource tables, and the same row of the D time resource tables is expressed as Ft. The set T may be the time resource table A described above. For the case where the time table A is not used, only the rows in the Ft may be used to schedule the PDSCH. For example, the DCI of type 1 and the DCI of type 2 in the USS and the DCI of type 1 of the CSS not associated with CORESET 0 may use the rows of the time resource table A to schedule the PDSCH, and the DCI of type 1 of the CSS associated with the CORESET 0 may only use the row in the Ft to schedule the PDSCH. Alternatively, the DCI of type 1 and the DCI of type 2 in the USS may use the rows of the time resource table A described above to schedule the PDSCH, and the DCI of type 1 in the CSS may schedule a PDSCH only by using the row in the Ft.

Or, for one element in the set K, for one BWP, if the element only corresponds to one of the two DCI types, the set T can only contain the time resource table for this DCI type, and for the DCI of type 1, it is not limited that the DCI of type 1 can only schedule PDSCHs by using rows in the Ft; however, if the element corresponds to the two DCI types, the DCI of type 2 can schedule PDSCHs by using rows in the time resource table for the DCI of type 2, and the DCI of type 1 can only schedule PDSCHs by using rows in the Ft, so that the set T can be the time resource table for the DCI of type 2.

Or, for one BWP, the set T can contain the time resource table for the DCI of type 2 and at least parts of rows of the time resource table for the DCI of type 1. The number of HARQ-ACK bits calculated in the case where the set T contains at least a part of rows of the time resource table for the DCI of type 1 is equal to the number of HARQ-ACK bits calculated in the case where the set T only contains the time resource table for the DCI of type 2.

Or, for one element in the set K, for one BWP, if the element only corresponds to one of the two DCI types, the set T can only contain the time resource table for this DCI type; however, if the element corresponds to the two DCI types, the set T can contain the time resource table for the DCI of type 2 and at least a part of rows of the time resource table for the DCI of type 1. The number of HARQ-ACK bits calculated in the case where the set T contains at least a part of rows of the time resource table for the DCI of type 1 is equal to the number of HARQ-ACK bits calculated in the case where the set T only contains the time resource table for the DCI of type 2.

For example, for one element in the set K, for one BWP, the set T can always be the time resource table for the DCI of type 2. The DCI of type 2 can schedule a PDSCH by a row in the time resource table for the DCI of type 2, while DCI of type 1 can schedule PDSCH by using the row of the time resource tables of the DCI of type 1, and the PDSCH scheduled by the DCI of type 1 is always mapped to one occasion (for example, the first occasion) among HARQ-ACK occasions determined according to the time resource table for the DCI of type 2. Or, it is assumed that the UE receives the PDSCH according to the D time resource tables, and the set T may be the time resource table A. For the case where the time table A is not used, the PDSCH is scheduled by using the rows of the corresponding time resource tables, and the HARQ-ACK is mapped to one of the HARQ-ACK occasions determined according to the time resource table A described above. For the DCI of type 1 and the DCI of type 2 in the USS and the DCI of type 1 of the CSS not associated with CORESET 0, the PDSCH may be scheduled by using the row of time resource table A described above, and for the DCI of type 1 of the CSS associated with CORESET 0, it is always mapped to one of the HARQ-ACK occasions (for example, the first occasion) determined according to the time resource table A described above. If it is unnecessary to allocate the HARQ-ACK occasion within one slot according to the set T, then this slot cannot schedule the PDSCH by using the DCI of type 1 of the CSS associated with CORESET 0. Or, the DCI of type 1 and the DCI of type 2 in the USS may schedule the PDSCH by using the rows of the time resource table A described above, and for the DCI of type 1 in the CSS, it is always mapped to one of the HARQ-ACK occasions (for example, the first occasion) determined according to the time resource table A described above. If it is not necessary to allocate the HARQ-ACK occasion within one slot according to the set T, this slot cannot schedule the PDSCH by using the DCI of type 1 of the CSS.

For example, for one element in the set K, for one BWP, the DCI of type 2 can schedule a PDSCH by a row in the time resource table for the DCI of type 2, and the DCI of type 1 can schedule a PDSCH only by a row for the PDSCH type A in the time resource table for the DCI of type 1. In this way, the set T can always be the time resource table for the DCI of type 2. The PDSCH scheduled by the DCI of type 1 can be mapped to the same HARQ-ACK occasion as the PDSCH type A scheduled by the DCI of type 2. Or, it is assumed that the UE receives the PDSCH according to the D time resource tables, and the set T may be the time resource table A. For the case where the time table A is not used, only the rows of the PDSCH type A may be used to schedule the PDSCH, and thus mapping to the same HARQ-ACK occasion with the PDSCH type A of the time resource table A. For the DCI of type 1 and the DCI of type 2 in the USS and the DCI of type 1 of the CSS not associated with CORESET 0, the PDSCH may be scheduled by using the rows of the time resource table A described above, and DCI of type 1 in the CSS associated with CORESET 0 may only use the row of the PDSCH type A to schedule the PDSCH, thus mapping to the same HARQ-ACK occasion with the PDSCH type A of the time resource table A described above. If the HARQ-ACK occasion for PDSCH type A does not need to be allocated within one slot according to the set T, then this slot cannot schedule the PDSCH by using the DCI of type 1 of the CSS associated with CORESET 0. Or, the DCI of type 1 and the DCI of type 2 in the USS may use the rows of the time resource table A to schedule the PDSCH. The DCI of type 1 in the CSS may only use the rows of the PDSCH type A to schedule the PDSCH, and thus mapping to the same HARQ-ACK occasion by using the PDSCH type A of the time resource table A described above. If the HARQ-ACK occasion for PDSCH type A does not need to be allocated within one slot according to the set T, this slot cannot schedule the PDSCH by using the DCI of type 1 of the CSS.

For example, firstly, an HARQ-ACK occasion for one slot is determined according to the time resource table for the DCI of type 2 as the set T; and then, one HARQ-ACK occasion determined according to the time resource table for the DCI of type 2 to which one row in the time resource table for DCI of type 1 is mapped is further determined. Or, it is assumed that the UE receives the PDSCH according to the D time resource tables, and the set T may be the time resource table A, and the HARQ-ACK occasion of one slot is determined according to the set T. For the case where the time table A is not used, the rows of the corresponding time resource table are used to schedule the PDSCH and are mapped to one HARQ-ACK occasion determined according to the time resource table A described above. For example, the row of the time resource table of DCI of type 1 of the CSS associated with CORESET 0 is mapped to one HARQ-ACK occasion determined according to the above-described time resource table A. Or, the row of the time resource table of the DCI of type 1 of the CSS is mapped to one HARQ-ACK occasion determined according to the time resource table A described above.

The set T can further contain some other elements. For example, in order to support the SPS, the base station needs to dynamically activate the SPS and allocate PDSCH resources. For the activation of the SPS and the allocation of PDSCH resources, the related parameter K0, the starting OFDM symbol and the number of symbols of the PDSCH and the PDSCH type can be configured independently. After the activation of the SPS, without transmitting any PDCCH, the PDSCHs allocated for the SPS can be transmitted directly.

The following method in this embodiment can be used for allocating the HARQ-ACK occasion only for one BWP. At this time, the set K is a set of K1 for this BWP. Or, when multiple BWPs are configured, the following method in this embodiment can also be used for allocating HARQ-ACK occasions for the multiple BWPs. If it is assumed that the sets of K1 configured on different BWPs can be different, the set K is a superset of the sets of K1 for the multiple BWPs; or otherwise, the sets of K1 can be used as the set K.

For an uplink slot n, in accordance with the set K of the parameter K1, it is possible that the slot n−K1 corresponding to only a part of K1 need to feed back HARQ-ACKs within the slot n. The set of K1 required to feed back HARQ-ACKs within the slot n is recorded as K'. During the determination of an HARQ-ACK codebook for the slot n, only the set K' will be taken into consideration.

A first method for determining the set K' is as follows. A slot n−K1 (where K1∈K') should be able to transmit a PDSCH. The condition can be that the slot n−K1 cannot contain only uplink OFDM symbols, for example, no downlink OFDM symbols and unknown OFDM symbols. The condition can also be as follows: for the slot n−K1, there is at least one element in the set T, any OFDM symbol of a PDSCH resource of the element cannot be indicated as an uplink OFDM symbol in a semi-static slot pattern. Here, it can be further required that the DCI type of the at least one element in the set T is the same as at least one DCI type of the corresponding parameter K1 on a BWP corresponding to at least one element in the set T.

A second method for determining the set K' is as follows. For the one slot n−K1, PDSCH resources for the SPS are allocated; or, there is at least one element in the set T so that a slot n−K1−K0 should be able to transmit a PDCCH to schedule PDSCH resources for this element. The slot n−K1−K0 cannot contain only uplink OFDM symbols, for example, no downlink OFDM symbols and unknown OFDM symbols. The slot n−K1−K0 should be able to transmit a PDCCH according to the parameter K0 so as to schedule PDSCH resources of this element. For example, there are PDCCH candidates within the slot n−K1−K0 in accordance with the configured PDCCH monitoring occasion, and the PDCCH candidate can schedule the PDSCH of this element according to the parameter K0. Here, it can be further required that the DCI type of the PDCCH candidate should be the same as at least one DCI type corresponding to at least one element in the set T; and/or, it can be further required that the DCI type of the at least one element in the set T is the same as at least one DCI type corresponding to the parameter K1 on a BWP corresponding to at least one element in the set T.

A third method for determining the set K' is as follows. For a slot n−K1, at least one element in the set T can satisfy the following conditions: 1) any OFDM symbol of a PDSCH resource for this element cannot be indicated as an uplink OFDM symbol in a semi-static slot pattern. 2) Corresponding PDSCH resources for the SPS are allocated; or, in accordance with the parameter K0 of this element, a slot n−K1−K0 should be able to transmit a PDCCH to schedule PDSCH resources for this element. Here, it can be further required that the DCI type of the PDCCH candidate should be the same as at least one DCI type corresponding to at least one element in the set T; and/or, it can be further required that the DCI type of the at least one element in the set T is the same as at least one DCI type corresponding to the parameter K1 on a BWP corresponding to at least one element in the set T.

A fourth method for determining the set K' is that K' is allowed to be equal to K. That is, no additional operations are needed to determine K'.

For one slot n−K1 (where K1∈K'), in accordance with a semi-static slot pattern (it is possible to employ the indication method in the first level and/or the second level) and according to the configured PDCCH monitoring occasion and the configured set T, the total number X of HARQ-ACK occasions to which all possible PDSCH time resources within one slot are necessary to be mapped is determined; and for each PDSCH time resource in the set T, one of the X HARQ-ACK occasions to which the PDSCH time resource is mapped is determined.

In accordance with the semi-statically configured slot pattern or other information, it is possible that PDSCH resources for only part of elements in the set T are schedulable. For one slot, the number of required HARQ-ACK occasions can be determined according to schedulable elements in the set T, and then one HARQ-ACK occasion occupied by one schedulable element is determined. For one slot, each schedulable element satisfies one or more of the following conditions.

The first condition is as follows: any OFDM symbol of a PDSCH resource for the schedulable element cannot be indicated as an uplink OFDM symbol in a semi-static slot pattern. Or, the first condition is as follows: the DCI type of the schedulable element is the same as at least one DCI type corresponding to the parameter K1 on a BWP corresponding to the schedulable element. Or, the first condition is as follows: any OFDM symbol of a PDSCH resource for the schedulable element cannot be indicated as an uplink OFDM symbol in a semi-static slot pattern, and the DCI type of the schedulable element is the same as at least one DCI type corresponding to the parameter K1 on a BWP corresponding to the schedulable element. As shown in FIG. 4, since the last two OFDM symbols 411 and 412 of the slot are uplink OFDM symbols, PDSCH resources 403 and 408 are not schedulable.

The second condition is as follows: in accordance with the parameter K0 of the schedulable element, a slot n−K1−K0 can transmit a PDCCH according to the parameter K0 so as to schedule PDSCH resources for this schedulable element. For example, in accordance with the configured PDCCH monitoring occasion, there exists a PDCCH candidate within the slot n−K1−K0, and the PDSCH of this schedulable element is scheduled according to the parameter K0. Or, the second condition is as follows: in accordance with the parameter K of the schedulable element, a slot n−K1−K0 can transmit a PDCCH to schedule PDSCH resources for this schedulable element. For example, in accordance with the configured PDCCH monitoring occasion, there is a PDCCH candidate within the slot n−K1−K0, and the PDSCH of this schedulable element is scheduled. As shown in FIG. 4, since there is no available PDCCH resource 424, the PDSCH resource 404 is not schedulable. Here, it can be further required that the DCI type of the PDCCH candidate should be the same as at least one DCI type corresponding to the schedulable element; and/or, it can be further required that the DCI type of the schedulable element is the same as at least one DCI type corresponding to the parameter K1 on a BWP corresponding to the schedulable element. Or, if it is assumed that there are PDSCH resources allocated for the SPS within the slot n−K1, it is not necessary to determine, according to the parameter K0, whether elements in the set T corresponding to the PDSCH resources allocated for the SPS are schedulable.

In FIG. 4, for this slot, the required HARQ-ACK occasions can be determined only according to the PDSCH resources 401, 402 and 405-407.

When it is supported that one PDSCH spans over N slots, for one slot n−K1, schedulable elements in the set T can be obtained with reference to the N slots of the PDSCH, i.e., a slot n−K1+q, where q=0, 1, . . . N−1. Subsequently, the number of required HARQ-ACK occasions can be determined according to the schedulable elements in the set T, and then one HARQ-ACK occasion occupied by one schedulable element is determined. Each schedulable element satisfies one or more of the following conditions.

The first condition is as follows: there is at least one q, and within a slot n−K1+q, any OFDM symbol of a PDSCH resource for the schedulable element cannot be indicated as an uplink OFDM symbol in a semi-static slot pattern. Or, the first condition is as follows: there is at least one q, and within a slot n−K1+q, the DCI type of the schedulable element is the same as at least one DCI type corresponding to the parameter K1 on a BWP corresponding to the schedulable element. Or, the first condition is as follows: there is at least one q, and within a slot n−K1+q, any OFDM symbol of a PDSCH resource for the schedulable element cannot be indicated as an uplink OFDM symbol in a semi-static slot pattern; and the DCI type of the schedulable element is the same as at least one DCI type corresponding to the parameter K1 on a BWP corresponding to the schedulable element.

The second condition is as follows: in accordance with the parameter K0 of the schedulable element, a slot n−K1−K0 can transmit a PDCCH according to the parameter K0 so as to schedule PDSCH resources for this schedulable element. For example, in accordance with the configured PDCCH monitoring occasion, there are PDCCH candidates within the slot n−K1−K0, and the PDSCH of this schedulable element is scheduled according to the parameter K0. Or, the second condition is as follows: in accordance with the parameter K of the schedulable element, a slot n−K1−K0 can transmit a PDCCH to schedule PDSCH resources for this schedulable element. For example, in accordance with the configured PDCCH monitoring occasion, there are PDCCH candidates within the slot n−K1−K0, and the PDSCH of this schedulable element is scheduled. Here, it can be further required that the DCI type of the PDCCH candidate should be the same as at least one DCI type corresponding to the schedulable element; and/or, it can be further required that the DCI type of the schedulable element is the same as at least one DCI type corresponding to the parameter K1 on a BWP corresponding to the schedulable element. Or, if it is assumed that there are PDSCH resources allocated for the SPS within the slot n−K1, it is not necessary to determine, according to the parameter K0, whether elements in the set T corresponding to the PDSCH resources allocated for the SPS are schedulable.

The parameter X can be equal to the number of schedulable elements in the set T. The $k^{th}$ schedulable element in the set T is mapped to the $k^{th}$ HARQ-ACK occasion. In FIG. 4, X is equal to 5. For one slot, a special HARQ-ACK occasion is allocated to each schedulable PDSCH resource so as to maximize the flexibility of the base station in scheduling PDSCHs.

Within one slot, it is assumed that the base station should not simultaneously schedule two PDSCHs and the two PDSCHs have identical starting OFDM symbols. The parameter X can be equal to the number of different parameter pairs (K0 and the starting OFDM symbol of the PDSCH) indicated by schedulable elements in the set T. Here, as long as one of the K0 and the OFDM symbol of the PDSCH is different from other parameter pairs, it is considered as a different parameter pair. In FIG. 4, X is equal to 4, and PDSCH resources 405 and 407 are mapped to a same HARQ-ACK occasion. The parameter pairs (K0 and the OFDM symbol of the PDSCH) of the schedulable elements in the set T are sequenced. For example, the parameter pairs are sequenced in an order of elements first appearing in the set T. If the set T is a table, the order can be the row number. For one element, one of the X HARQ-ACK occasions occupied by this element can be determined according to the parameter pair (K0 and the starting OFDM symbol of the PDSCH) of this element. In this method, the base station can control the overhead of HARQ-ACK feedback by rationally configuring the number of parameter pairs (K0 and the starting OFDM symbol of the PDSCH).

The maximum number of PDSCHs which can be received by the UE within one slot is recorded as C. The parameter C can be determined by the capability of the UE to receive the maximum number of PDSCHs within one slot, or the C can be semi-statically configured by a higher layer. Within one slot, for one schedulable element in the set T, the HARQ-ACK occasion to which this schedulable element is mapped can be determined according to the starting OFDM symbol of the PDSCH of the schedulable element. A first method for processing according to the starting OFDM symbol is as follows. The number of OFDM symbols within one slot is recorded as L. For example, L is equal to 14. The L OFDM symbols can be classified into C sets, and at most one HARQ-ACK occasion is allocated for each set, so that the HARQ-ACK occasion to which the schedulable element is mapped is determined according to the set to which the starting OFDM symbol of the PDSCH of the schedulable element belongs. For example, successive OFDM symbols are classified to one set, and the c set includes an OFDM symbol index $$\left\lfloor \frac{L}{C} \cdot c \right\rfloor \le p < \left\lfloor \frac{L}{C} \cdot (c+1) \right\rfloor,$$

where c=0, 1, . . . C−1 and p is an index of an OFDM symbol within the slot. For one of the C sets, if there are no schedulable elements corresponding to this set, no HARQ-ACK occasion needs to be allocated for this set. The HARQ-ACK occasions corresponding to the sets can be sequenced according to the indexes c of the sets. A second method for processing according to the starting OFDM symbol is as follows. When the number Q of different values of the starting OFDM symbols of PDSCHs of all schedulable elements is less than or equal to C, one HARQ-ACK occasion is allocated for each value of the starting OFDM, and the HARQ-ACK occasion to which one schedulable element is mapped can be directly obtained according to the starting OFDM symbol of the PDSCH of this schedulable element. For example, the $q^{th}$ value of the starting OFDM symbol of the PDSCH is mapped to the $Q^{th}$ HARQ-ACK occasion, where q=0, 1, . . . Q−1. When Q is greater than C, the HARQ-ACK occasion can be allocated by the first method for processing according to the starting OFDM symbol. Or, when Q is greater than C, the Q values of the starting OFDM symbol are classified into C sets, and one HARQ-ACK occasion is allocated for each set, so that the HARQ-ACK occasion to which the schedulable element is mapped is determined according to the set to which the starting OFDM symbol of the PDSCH of the schedulable element belongs. For example, the $q^{th}$ set includes an index $$\left\lfloor \frac{Q}{C} \cdot c \right\rfloor \le q < \left\lfloor \frac{Q}{C} \cdot (c+1) \right\rfloor$$

for the Q values of the starting OFDM symbol.

The maximum number of PDSCHs which can be received by the UE within one slot is recorded as C. The parameter C can be determined by the capability of the UE to receive the maximum number of PDSCHs within one slot, or the C can be semi-statically configured by a higher layer. Within one slot, for one schedulable element in the set T, the HARQ-ACK occasion to which this schedulable element is mapped can be determined according to the ending OFDM symbol of the PDSCH of the schedulable element. A first method for processing according to the ending OFDM symbol is as follows. The number of OFDM symbols within one slot is recorded as L. For example, L is equal to 14. The L OFDM symbols can be classified into C sets, and at most one HARQ-ACK occasion is allocated for each set, so that the HARQ-ACK occasion to which the schedulable element is mapped is determined according to the set to which the ending OFDM symbol of the PDSCH of the schedulable element belongs. For example, successive OFDM symbols are classified to one set, and the $c^{th}$ set includes an OFDM symbol index $$\left\lfloor \frac{L}{C} \cdot c \right\rfloor \leq p < \left\lfloor \frac{L}{C} \cdot (c+1) \right\rfloor,$$

where c=0, 1, . . . C−1 and p is an index of an OFDM symbol within the slot. For one of the C sets, if there are no schedulable elements corresponding to this set, no HARQ-ACK occasion needs to be allocated for this set. The HARQ-ACK occasions corresponding to the sets can be sequenced according to the indexes c of the sets. A second method for processing according to the ending OFDM symbol is as follows. When the number Q of different values of the ending OFDM symbols of PDSCHs of all schedulable elements is less than or equal to C, one HARQ-ACK occasion is allocated for each value of the ending OFDM symbol, and the HARQ-ACK occasion to which one schedulable element is mapped can be directly obtained according to the ending OFDM symbol of the PDSCH of this schedulable element. For example, the $q^{th}$ value of the ending OFDM symbol of the PDSCH is mapped to the $Q^{th}$ HARQ-ACK occasion, where q=0, 1, . . . Q−1. When Q is greater than C, the HARQ-ACK occasion can be allocated by the first method for processing according to the ending OFDM symbol. Or, when Q is greater than C, the Q values of the ending OFDM symbol are classified into C sets, and one HARQ-ACK occasion is allocated for each set, so that the HARQ-ACK occasion to which the schedulable element is mapped is determined according to the set to which the ending OFDM symbol of the PDSCH of the schedulable element belongs. For example, the $q^{th}$ set includes an index $$\left\lfloor \frac{Q}{C} \cdot c \right\rfloor \leq q < \left\lfloor \frac{Q}{C} \cdot (c+1) \right\rfloor$$

for the Q values of the ending OFDM symbol.

In accordance with the schedulable elements in the set T, HARQ-ACK occasions for PDSCHs of type A and HARQ-ACK occasions for PDSCHs of type B can be determined, respectively. For the set T, when multiple PDSCH resources of type A are configured, it is assumed that the base station will actually schedule at most one PDSCH of type A within only one slot. In addition, within one slot, the base station can schedule zero, one or more PDSCHs of type B. If there are schedulable PDSCH resources of type A in the set T, the NTA is 1; or otherwise, the NTA is 0. Correspondingly, it is only necessary to allocate NTA HARQ-ACK occasions for PDSCHs of type A. NTB HARQ-ACK occasions are allocated for PDSCHs of type B, and the parameter X can be equal to NTB+NTA. For the X HARQ-ACK occasions, it is possible that, first, NTA occasions are used for PDSCHs of type A, then NTB occasions are used for PDSCHs of type B. Or, it is possible that, first, NTB occasions are used for PDSCHs of type B, then NTA occasions are used for PDSCHs of type A.

Based on the above analysis, the NTB can be equal to the number of schedulable elements of type B in the set T. In FIG. 4, X is equal to 4, and PDSCH resources 401 and 402 are mapped to a same HARQ-ACK occasion. If the NTA is equal to 1, the HARQ-ACK occasions for PDSCHs of type A can be the first occasion, followed by NTB HARQ-ACK occasions for PDSCHs of type B; or, the NTB HARQ-ACK occasions for PDSCHs of type B can start from the first occasion, followed by the HARQ-ACK occasions for PDSCHs of type A. For a schedulable element of type B, one of the NTB HARQ-ACK occasions occupied by this element can be determined according to the order of elements in the set T, for example, according to the row number.

Or, the NTB can be equal to the number of different parameter pairs (K0 and the starting OFDM symbol of the PDSCH) indicated by the schedulable elements of type B in the set T. In FIG. 4, X is equal to 3, PDSCH resources 401 and 402 are mapped to a same HARQ-ACK occasion, and PDSCH resources 405 and 407 are mapped to a same HARQ-ACK occasion. The parameter pairs (K0 and the starting OFDM symbol of the PDSCH) of the schedulable elements of type B in the set T are sequenced. For example, the parameter pairs are sequenced in an order of elements first appearing in the set T. If the set T is a table, the order can be the row number. For one schedulable element of type B, one of the NTB HARQ-ACK occasions occupied by this element can be determined according to the parameter pair (K0 and the starting OFDM symbol of the PDSCH) indicated of this element.

Or, if there are schedulable PDSCH resources of type B in the set T, the NTB is 1; or otherwise, the NTB is 0. The base station can schedule at most one PDSCH of type B within one slot, and correspondingly, it is only necessary to allocate NTB HARQ-ACK occasions for the PDSCH of type B. Or, it is supported that the base station schedules multiple PDSCHs of type B within one slot, and the UE can bind HARQ-ACK information of the multiple PDSCHs of type B so that the number of HARQ-ACK bits is equal to the number of HARQ-ACK bits of one PDSCH of type B. For example, if it is assumed that the PDSCHs are transmitted based on TBs, the binding can be to perform an AND operation on HARQ-ACKs of the multiple PDSCHs of type B. The AND operation means that, ACK is output when all bits are ACKs, or otherwise, NACK is output. If it is assumed that the PDSCHs of type B are generally applied to services having very high requirements for the delay and the reliability, since the error probability of PDCCHs is very low, the probability of occurrence of confusion during the binding is very low.

Or, it is assumed that the base station schedules at most Bmax PDSCHs of type B within one slot, where the Bmax is greater than 1, and the NTB can be equal to Bmax or $\min(B_{max}, N_B)$. The $N_B$ is the number of schedulable elements of type B in the set T, or the N is the number of different parameter pairs (K0 and the starting OFDM symbol of the PDSCH) indicated by the schedulable elements of type B in the set T. In PDCCHs scheduling the PDSCHs of type B, a DAI can be included. For example, the DAI indicates that how many PDSCHs of type B are scheduled till to the current PDSCH of type B within the current slot. The UE can obtain one of Bmax HARQ-ACK occasions according to the value of the DAI. The parameter Bmax can be semi-statically configured by a higher-level signaling or predefined.

Or, if PDSCH resources for two schedulable elements of type B in the set T are overlapped completely or partially, it is assumed that the UE does not need to feed back HARQ-ACK information of the two PDSCHs, so that the number of HARQ-ACK occasions to be allocated can be reduced by utilizing this characteristic. Here, it is possible that the base station cannot simultaneously schedule the PDSCH resources for the two elements, or it is also possible that the UE feeds back HARQ-ACK information of only one PDSCH according to a certain preference strategy although the base station simultaneously schedules the PDSCH resources for the two elements. For all schedulable elements of type B in the set T, the total number NTB of HARQ-ACK occasions to be mapped is determined; and for each schedulable element of type B, one of the NTB HARQ-ACK occasions to which the element is mapped is determined. By this method, the NTB is equal to the maximum number of non-overlapped PDSCH resources among PDSCH resources for all schedulable elements of type B in the set T. In FIG. 4, X is equal to 2, PDSCH resources 401 and 402 are mapped to a same HARQ-ACK occasion, and PDSCH resources 405, 406 and 407 are mapped to a same HARQ-ACK occasion.

In order to determine the NTB and one of the NTB HARQ-ACK occasions corresponding to a PDSCH of a schedulable element of type B in the set T, the following method can be used.

A first method for determining HARQ-ACK occasions of PDSCH time resources for schedulable elements of type B in the set T is as follows.

Firstly, schedulable elements in the set T are determined. It can be determined whether one element in the set T is schedulable, according to one of the following conditions: 1) when the first condition and the second condition for the schedulable element are both satisfied, it is considered that the one element is schedulable; 2) when the first condition for the schedulable element is satisfied, it is considered that the one element is schedulable; and, 3) when the second condition for the schedulable element is satisfied, it is considered that the one element is schedulable. Or, as a simplification, it can also be considered that all elements are schedulable. Subsequently, for the set T, the total number NTB of HARQ-ACK occasions to be mapped is determined; and for each element, one of the NTB HARQ-ACK occasions to which this element is mapped is determined.

For example, the following method is employed:

1) the counter h of HARQ-ACK occasions is initialized as 0;

2) for the current set T, the minimum index of an ending OFDM symbol of the PDSCH represented by each schedulable element is determined as E;

3) for one schedulable element in the current set T, if the index of the starting OFDM symbol of the PDSCH represented by this schedulable element is recorded as S and S≤E, the PDSCH represented by the one element is mapped to an HARQ-ACK occasion h; the one element is removed from the current set T; and the step 3) is repeated until all schedulable elements satisfying S≤E are processed; and 4) h=h+1; if there are still schedulable elements in the current set T, the process proceeds to 2); or otherwise, NTB=h, and the process ends.

Or, the following equivalent method is employed:

1) the counter h of HARQ-ACK occasions is initialized as 0;

2) the minimum index of an ending OFDM symbol of a PDSCH represented by each schedulable element in the set T, which has been not yet allocated with any HARQ-ACK occasion, is determined as E;

3) for one schedulable element in the set T which has been not yet allocated with any HARQ-ACK occasion, if the index of the starting OFDM symbol of the PDSCH represented by the one element is recorded as S and S≤E, the PDSCH represented by the one element is mapped to an HARQ-ACK occasion h; and the step 3) is repeated until all schedulable elements satisfying S≤E are processed; and 4) h=h+1; if not all schedulable elements in the current set T have been processed, the process proceeds to 2); or otherwise, NTB=h, and the process ends.

A second method for determining HARQ-ACK occasions of PDSCH time resources for schedulable elements of type B in the set T is as follows.

Firstly, schedulable elements in the set T are determined. When one element in the set T satisfies the second condition for the schedulable element, it is considered that the one element is schedulable. Or, it is also possible that no element needs to be removed from the set T. Equivalently, it is considered that all elements are schedulable. Subsequently, for the set T, the total number NTB of HARQ-ACK occasions to be mapped is determined; and for each element, one of the NTB HARQ-ACK occasions to which this element is mapped is determined.

For example, the following method is employed:

1) the counter h of HARQ-ACK occasions is initialized as 0;

2) for the current set T, the minimum index of an ending OFDM symbol of the PDSCH represented by each schedulable element is determined as E; if the OFDM symbol E is indicated as an uplink OFDM symbol in a semi-static slot pattern, NTB=h; or otherwise, the process ends;

3) for one schedulable element in the current set T, if the index of the starting OFDM symbol of the PDSCH represented by this schedulable element is recorded as S and S≤E, the PDSCH represented by the one element is mapped to an HARQ-ACK occasion h; the one element is removed from the current set T; and the step 3) is repeated until all schedulable elements satisfying S≤E are processed; and 4) h=h+1; if there are still schedulable elements in the current set T, the process proceeds to 2); or otherwise, NTB=h, and the process ends.

Or, the following equivalent method is employed:

1) the counter h of HARQ-ACK occasions is initialized as 0;

2) the minimum index of an ending OFDM symbol of a PDSCH represented by each schedulable element in the set T, which has been not yet allocated with any HARQ-ACK occasion, is determined as E; if the OFDM symbol E is indicated as an uplink OFDM symbol in a semi-static slot pattern, the NTB=h; or otherwise, the process ends;

3) for one schedulable element in the set T which has been not yet allocated with any HARQ-ACK occasion, if the index of the starting OFDM symbol of the PDSCH represented by this schedulable element is recorded as S and S≤E, the PDSCH represented by the one element is mapped to an HARQ-ACK occasion h; and the step 3) is repeated until all schedulable elements satisfying S≤E are processed; and 4) h=h+1; if not all schedulable elements in the current set T have been processed, the process proceeds to 2); or otherwise, NTB=h, and the process ends.

The flow of determining the NTB and the HARQ-ACK occasion of one element of type B in the present invention has been described above. Actually, the specific form of the flow should not be limited in the present invention, and any flow having the same effect or essence as the above method shall fall into the scope of the present invention.

Based on any one of the above preferred flows and in accordance with the set T which contains only the time resource table for the DCI of type 2, an HARQ-ACK occasion is determined; and then, one HARQ-ACK occasion determined according to the time resource table for the DCI of type 2 to which one row in the time resource table for DCI of type 1 is mapped is further determined. Or, if it is assumed that the DCI of type 1 and the DCI of type 2 in the USS use a same time resource table, HARQ-ACK occasions for the DCI of type 1 and the DCI of type 2 in the USS are determined in accordance with the set T which contains the same time resource table; and then, one of the determined HARQ-ACK occasions to which one row in the time resource table for DCI of type 1 in the CCS is mapped is further determined.

Or, based on any one of the above preferred flows, during the determination of the HARQ-ACK occasion for the set T based on the time resource table for the DCI of type 2, one HARQ-ACK occasion to which one row in the time resource table for DCI of type 1 is mapped can be determined in the step 3). For example, the PDSCH type A in the time resource table for the DCI of type 1 is mapped to NTA HARQ-ACK occasions allocated for the PDSCHs of type A. The PDSCH type B in the time resource table for the DCI of type 1 is based on the first method for determining HARQ-ACK occasions of PDSCH time resources for schedulable elements of type B in the set T:

1) the counter h of HARQ-ACK occasions is initialized as 0;

2) for the current set T, the minimum index of an ending OFDM symbol of the PDSCH represented by each element is determined as E;

3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; for one element in the time resource table for the DCI of type 1, if the index of the starting OFDM symbol of the PDSCH represented by this element is recorded as S1 and S1≤E, the PDSCH represented by the one element is mapped to an HARQ-ACK occasion h; and the step 3) is repeated until all elements satisfying S1≤E are processed; and 4) h=h+1; if the current set T is not null, the process proceeds to 2); or otherwise, MK1=h, and the process ends.

Or, if it is assumed that the DCI of type 1 and the DCI of type 2 in the USS use a same time resource table, based on any one of the above preferred flows, when the HARQ-ACK occasions for the DCI of type 1 and the DCI of type 2 in the USS are determined in accordance with the set T which contains the same time resource table, one HARQ-ACK occasion to which one row in the time resource table for DCI of type 1 in the CCS is mapped can be determined in the step 3). For example, the PDSCH type A in the time resource table for the DCI of type 1 in the CSS is mapped to NTA HARQ-ACK occasions allocated for the PDSCHs of type A. For the PDSCH type B in the time resource table for the DCI of type 1 in the CSS, it is based on the first method for determining HARQ-ACK occasions of PDSCH time resources for schedulable elements of type B in the set T:

1) the counter h of HARQ-ACK occasions is initialized as 0;

2) for the current set T, the minimum index of an ending OFDM symbol of the PDSCH represented by each element is determined as E;

3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; for one element in the time resource table for the DCI of type 1 in the CSS, if the index of the starting OFDM symbol of the PDSCH represented by this element is recorded as S1 and S1≤E, the PDSCH represented by the one element is mapped to an HARQ-ACK occasion h; and the step 3) is repeated until all elements satisfying S1≤E are processed; and 4) h=h+1; if the current set T is not null, the process proceeds to 2); or otherwise, MK1=h, and the process ends.

For one slot n−K1, it is possible that at most one HARQ-ACK occasion is allocated so that the feedback overhead is reduced as far as possible. If there are schedulable elements in the set T, the parameter X is 1; or otherwise, the parameter X is 0. If it is assumed that the UE receives the scheduling to multiple PDSCHs within one slot n−K1 and the multiple PDSCHs are mapped to a same PUCCH feedback within an uplink slot n, the UE can feed back HARQ-ACK information of only one of the PDSCHs, for example, the latest scheduled PDSCH. Or, if it is assumed that the UE receives the scheduling to multiple PDSCHs within one slot S, the uplink slot for feeding back HARQ-ACKs for the multiple PDSCHs can include one or more slots, and the UE feeds back HARQ-ACK information of only one PDSCH within the one slot S. For example, for only the latest scheduled PDSCH, the HARQ-ACK information of this PDSCH is fed back within an uplink slot for feeding back an HARQ-ACK for this PDSCH.

In the method, when it is configured that only one PDSCH is mapped to one slot, the HARQ-ACK occasion of one slot n−K1 is determined by the method; when it is configured that one PDSCH spans over N slots, at most one HARQ-ACK occasion is allocated to one slot n−K1. If there are schedulable elements in the set T, the parameter X is 1; or otherwise, the parameter X is 0.

In the method for respectively determining HARQ-ACK occasions for PDSCH type A and HARQ-ACK occasions for PDSCH type B, in one possible scenario, when the base station has scheduled a PDSCH of type A within one slot, due to a more urgent service, the base station has to schedule the PDSCH of type B again within this slot, and the PDSCH of type B can even be mapped to part of or all of time-frequency resources for the PDSCH of type A. When this requirement is satisfied, for the PDSCH of type B, a small delay is generally required to feed back the HARQ-ACK, so that the setting of K1 is limited. In accordance with the various methods in this embodiment, for one slot n−K1, the method used for processing the HARQ-ACK occasion can be related to K1. When the delay of the HARQ-ACK feedback is large, the method for allocating at most one HARQ-ACK occasion for one slot n−K1 is employed; however, when the delay of the HARQ-ACK feedback is small, the method for respectively determining HARQ-ACK occasions for PDSCHs type A and HARQ-ACK occasions for PDSCHs type B is employed. For example, when K1 exceeds a threshold D, the method for allocating at most one HARQ-ACK occasion for one slot n−K1 is employed; however, when K1 is less than the threshold D, the method for respectively determining HARQ-ACK occasions for PDSCHs type A and HARQ-ACK occasions for PDSCHs type B is employed. Or, for the configured minimum value or multiple values of K1, the method for respectively determining HARQ-ACK occasions for PDSCHs type A and HARQ-ACK occasions for PDSCHs type B is employed; however, for other configured values of K1, the method for allocating at most one HARQ-ACK occasion for one slot n−K1 is employed.

In the various embodiments of this embodiment, one HARQ-ACK occasion is not related to the PDSCH type of schedulable elements in the set T, and Y HARQ-ACK bits are allocated. For one BWP, Y is the number of HARQ-ACK bits of the configured PDSCHs. When multiple BWPs are configured, Y can be the maximum value of the number of HARQ-ACK bits of PDSCHs configured on the multiple BWPs.

Or, in the various methods in this embodiment, if it is assumed that all elements in the set T employ the same PDSCH type, for the one HARQ-ACK occasion, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits configured for this PDSCH type on the multiple BWPs.

Or, in the various methods in this embodiment, if all elements in the set T employ the PDSCH type A, YA HARQ-ACK bits are allocated to one HARQ-ACK occasion; if all elements in the set T employ the PDSCH type B, YB HARQ-ACK bits are allocated to one HARQ-ACK occasion; and, if the elements in the set T employ both the PDSCH type A and the PDSCH type B, Y HARQ-ACK bits are allocated to one HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits configured for the PDSCH type A on the multiple BWPs, YB can be the maximum value of the number of HARQ-ACK bits configured for the PDSCH type B on the multiple BWPs, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, for one HARQ-ACK occasion, Y can be the maximum value of the number of HARQ-ACK bits of PDSCHs configured on BWPs of all elements mapped to this HARQ-ACK occasion in the set T.

Or, in the various methods in this embodiment, for one HARQ-ACK occasion, if all elements mapped to this HARQ-ACK occasion in the set T employ the PDSCH type A, YA HARQ-ACK bits are allocated to this HARQ-ACK occasion; if all elements mapped to this HARQ-ACK occasion in the set T employ the PDSCH type B, YB HARQ-ACK bits are allocated to this HARQ-ACK occasion; and, if the elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, for one HARQ-ACK occasion, YA can be the maximum value of the number of HARQ-ACK bits configured on BWPs of all elements of the PDSCH type A mapped to this HARQ-ACK occasion in the set T, YB can be the maximum value of the number of HARQ-ACK bits configured on BWPs of all elements of the PDSCH type B mapped to this HARQ-ACK occasion in the set T, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, Y can be the maximum value of the number of HARQ-ACK bits of PDSCHs configured on BWPs of all schedulable elements in the set T.

Or, in the various methods in this embodiment, if it is assumed that all schedulable elements in the set T employ the same PDSCH type, for the one HARQ-ACK occasion, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits of PDSCHs configured on BWPs of all schedulable elements of this PDSCH type in the set T.

Or, in the various methods in this embodiment, if all schedulable elements in the set T employ the PDSCH type A, YA HARQ-ACK bits are allocated to one HARQ-ACK occasion; if all schedulable elements in the set T employ the PDSCH type B, YB HARQ-ACK bits are allocated to one HARQ-ACK occasion; and, if the schedulable elements in the set T employ both the PDSCH type A and the PDSCH type B, Y HARQ-ACK bits are allocated to one HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits of PDSCHs configured on BWPs of all schedulable elements of the PDSCH type A in the set T, YB can be the maximum value of the number of HARQ-ACK bits of configured PDSCHs on BWPs of all schedulable elements of the PDSCH type B in the set T, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, for one HARQ-ACK occasion, Y can be the maximum value of the number of HARQ-ACK bits of PDSCHs configured on BWPs of all schedulable elements mapped to this HARQ-ACK occasion in the set T.

Or, in the various methods in this embodiment, for one HARQ-ACK occasion, if all schedulable elements mapped to this HARQ-ACK occasion in the set T employ the PDSCH type A, YA HARQ-ACK bits are allocated to this HARQ-ACK occasion; if all schedulable elements mapped to this HARQ-ACK occasion in the set T employ the PDSCH type B, YB HARQ-ACK bits are allocated to this HARQ-ACK occasion; and, if the schedulable elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, for one HARQ-ACK occasion, YA can be the maximum value of the number of HARQ-ACK bits of PDSCHs configured on BWPs of all schedulable elements of the PDSCH type A mapped to this HARQ-ACK occasion in the set T, YB can be the maximum value of the number of HARQ-ACK bits of PDSCHs configured on BWPs of all schedulable elements of the PDSCH type B mapped to this HARQ-ACK occasion in the set T, and Y is the larger one of the YA and YB.

Or, in the various methods in this embodiment, in accordance with the configured PDCCH monitoring occasion, if all schedulable elements in the set T correspond to the DCI of type 1, one HARQ-ACK bit is allocated to the one HARQ-ACK occasion; or otherwise, Y HARQ-ACK bits are allocated to the one HARQ-ACK occasion. For one BWP, Y is the number of HARQ-ACK bits of the configured PDSCHs. When multiple BWPs are configured, Y can be the maximum value of the number of HARQ-ACK bits of PDSCHs configured on BWPs corresponding to all schedulable elements in the set T.

Or, in the various methods in this embodiment, in accordance with the configured PDCCH monitoring occasion, if all schedulable elements in the set T correspond to the DCI of type 1, one HARQ-ACK bit is allocated to the one HARQ-ACK occasion. Otherwise, it is assumed that all schedulable elements in the set T employ the same PDSCH type; and, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits of PDSCHs configured on BWPs of all schedulable elements of this PDSCH type in the set T.

Or, in the various methods in this embodiment, in accordance with the configured PDCCH monitoring occasion, if all schedulable elements in the set T correspond to the DCI of type 1, one HARQ-ACK bit is allocated to this HARQ-ACK occasion; or otherwise, the number of HARQ-ACK bits of this HARQ-ACK occasion is determined according to the PDSCH type. If all schedulable elements in the set T employ the PDSCH type A, YA HARQ-ACK bits are allocated to this HARQ-ACK occasion; if all schedulable elements in the set T employ the PDSCH type B, YB HARQ-ACK bits are allocated to one HARQ-ACK occasion; and, if the schedulable elements in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits of PDSCHs configured on BWPs of all schedulable elements of the PDSCH type A in the set T, YB can be the maximum value of the number of HARQ-ACK bits of PDSCHs configured on BWPs of all schedulable elements of the PDSCH type B in the set T, and Y is the larger one of the YA and YB.

Or, in the various methods in this embodiment, for one HARQ-ACK occasion, in accordance with the configured PDCCH monitoring occasion, if all schedulable elements in the set T mapped to the one HARQ-ACK occasion correspond to the DCI of type 1, one HARQ-ACK bit is allocated to the one HARQ-ACK occasion; or otherwise, Y HARQ-ACK bits are allocated to the one HARQ-ACK occasion. For one BWP, Y is the number of HARQ-ACK bits of the configured PDSCHs. When multiple BWPs are configured, Y can be the maximum value of the number of HARQ-ACK bits of PDSCHs configured on BWPs of all schedulable elements mapped to the one HARQ-ACK occasion in the set T.

Or, in the various methods in this embodiment, for one HARQ-ACK occasion, in accordance with the configured PDCCH monitoring occasion, if all schedulable elements in the set T mapped to the one HARQ-ACK occasion correspond to the DCI of type 1, one HARQ-ACK bit is allocated to the one HARQ-ACK occasion. Otherwise, it is assumed that all schedulable elements in the set T employ the same PDSCH type; and, for one BWP, the number of HARQ-ACK bits of the one HARQ-ACK occasion is determined according to this PDSCH type. When multiple BWPs are configured, Y can be the maximum value of the number of HARQ-ACK bits of PDSCHs configured on BWPs of all schedulable elements of this PDSCH type mapped to the one HARQ-ACK occasion in the set T.

Or, in the various methods in this embodiment, for one HARQ-ACK occasion, in accordance with the configured PDCCH monitoring occasion, if all schedulable elements in the set T mapped to this HARQ-ACK occasion correspond to the DCI of type 1, one HARQ-ACK bit is allocated to the one HARQ-ACK occasion; or otherwise, the number of HARQ-ACK bits of this HARQ-ACK occasion is determined according to the PDSCH type. For this HARQ-ACK occasion, if all schedulable elements mapped to this HARQ-ACK occasion in the set T employ the PDSCH type A, YA HARQ-ACK bits are allocated to this HARQ-ACK occasion; if all schedulable elements mapped to this HARQ-ACK occasion in the set T employ the PDSCH type B, YB HARQ-ACK bits are allocated to this HARQ-ACK occasion; and, if the schedulable elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits of PDSCHs configured on BWPs of all schedulable elements of the PDSCH type A mapped to the one HARQ-ACK occasion in the set T, YB can be the maximum value of the number of HARQ-ACK bits of PDSCHs configured on BWPs of all schedulable elements of the PDSCH type B mapped to the one HARQ-ACK occasion in the set T, and Y is the larger one of the YA and YB.

Embodiment 4

For one slot, it is assumed that the starting OFDM symbol and the number of symbols of a PDSCH can only be some particular values, so that the overhead for indicating PDSCH time resources can be reduced. All possible PDSCH time resources form a set T for configuring a PDSCH scheduling. Each element in the set T indicates one possibility of the starting OFDM symbol and the number of symbols of the PDSCH. Each element in the set T can further indicate the PDSCH type. For example, the set T can be in form of a table, and an element in the set T corresponds to a row of the table; or, the set T can correspond to multiple tables, and an element in the set T corresponds to a row of one table. For example, different tables are configured for the two DCI types, respectively.

For one element in the set K, if the element only corresponds to one of the two DCI types, the set T can only contain the table for this DCI type; and, if the element corresponds to the two DCI types, the set T contains the tables for the two DCI types. Or, for one element in the set K, the set T always contain the tables for the two DCI types.

The set T can further contain some other elements. For example, in order to support the SPS, the base station needs to dynamically activate the SPS and allocate PDSCH resources. For the activation of the SPS and the allocation of PDSCH resources, the related parameter K0, the starting OFDM symbol and the number of symbols of the PDSCH and the PDSCH type can be configured independently. After the activation of the SPS, without transmitting any PDCCH, the PDSCHs allocated for the SPS can be transmitted directly. If the number of elements in the set T is recorded as NT, the number of PDSCHs that can be scheduled within one slot is less than or equal to NT. For two elements in the set T, the PDSCH resources represented by the two elements can be overlapped partially, so that the base station cannot simultaneously schedule PDSCHs represented by the two elements.

For an uplink slot n, in accordance with the set K of the parameter K1, it is possible that the slot n−K1 corresponding to only a part of K1 need to feed back HARQ-ACKs within the slot n. The set of K1 required to feed back HARQ-ACKs within the slot n is recorded as K'. During the determination of an HARQ-ACK codebook for the slot n, only the set K' will be taken into consideration.

A first method for determining the set K' is as follows. A slot n−K1 (where K1∈K') should be able to transmit PDSCHs, that is, the slot n−K1 cannot contain only uplink OFDM symbols, for example, no downlink OFDM symbols and unknown OFDM symbols. Within the slot n−K1 (where K1∈K'), there is at least one parameter K0, so that a slot n−K1−K0 should be able to transmit PDCCHs. The slot n−K1−K0 cannot only contain uplink OFDM symbols, for example, no downlink OFDM symbols and unknown OFDM symbols. The slot n−K1−K0 should be able to transmit a PDCCH according to the parameter K0. For example, there are PDCCH candidates within the slot n−K1−K0 in accordance with the configured PDCCH monitoring occasion, and the PDSCH is scheduled according to the parameter K0.

A second method for determining the set K' is as follows. The slot n−K1−K0 cannot contain only uplink OFDM symbols, for example, no downlink OFDM symbols and unknown OFDM symbols. The slot n−K1−K0 should be able to transmit a PDCCH according to the parameter K0. For example, there are PDCCH candidates within the slot n−K1−K0 in accordance with the configured PDCCH monitoring occasion, and the PDSCH is scheduled according to the parameter K0.

For one slot n−K1 (where K1∈K'), in accordance with a semi-static slot pattern (it is possible to employ the indication method in the first level and/or the second level) and according to the configured set T, the total number MK1 of HARQ-ACK occasions to which all possible PDSCH time resources within one slot are required to be mapped is determined; and for each PDSCH time resource in the set T, one of the MK1 HARQ-ACK occasions to which the PDSCH time resource is mapped is determined.

A first method for determining the HARQ-ACK occasion of each PDSCH time resource within one slot is as follows.

Firstly, in accordance with the semi-static slot pattern, elements that cannot be scheduled actually are removed from the set T. Specifically, for one element in the set T, in accordance with the starting OFDM symbol and the number of OFDM symbols, if one or more OFDM symbols of this PDSCH are indicated as uplink OFDM symbols in the semi-static slot pattern, this element is removed from the set T.

Subsequently, for the current set T, the total number MK1 of HARQ-ACK occasions to be mapped is determined; and for each element, one of the MK1 HARQ-ACK occasions to which this element is mapped is determined.

For example, the following method is employed:
1) the counter h of HARQ-ACK occasions is initialized as 0;
2) for the current set T, the minimum index of an ending OFDM symbol of the PDSCH represented by each element is determined as E;
3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; and
4) h=h+1; if the current set T is not null, the process proceeds to 2); or otherwise, MK1=h, and the process ends.

Or, the following equivalent method is employed:
1) the counter h of HARQ-ACK occasions is initialized as 0;
2) the minimum index of an ending OFDM symbol of a PDSCH represented by each element in the set T, which has been not yet allocated with any HARQ-ACK occasion, is determined as E;
3) for one element in the set T which has been not yet allocated with any HARQ-ACK occasion, if the index of the starting OFDM symbol of the PDSCH represented by the one element is recorded as S and S≤E, the PDSCH represented by the one element is mapped to an HARQ-ACK occasion h; and the step 3) is repeated until all elements satisfying S≤E are processed; and
4) h=h+1; if not all elements in the current set T have been processed, the process proceeds to 2); or otherwise, MK1=h, and the process ends.

A second method for determining the HARQ-ACK occasion of each PDSCH time resource within one slot is as follows.

Firstly, schedulable elements in the set T are marked according to a semi-static slot pattern. Specifically, for one element in the set T, in accordance with the starting OFDM symbol and the number of OFDM symbols, if any OFDM symbol of this PDSCH is not indicated as an uplink OFDM symbol in the semi-static slot pattern, this element in the set T is marked as being available.

Subsequently, for the set T, the total number MK1 of HARQ-ACK occasions to be mapped is determined; and for each element, one of the MK1 HARQ-ACK occasions to which this element is mapped is determined.

For example, the following method is employed:
1) the counter h of HARQ-ACK occasions is initialized as 0;
2) for the current set T, the minimum index of an ending OFDM symbol of the PDSCH represented by each schedulable element is determined as E;
3) for one schedulable element in the current set T, if the index of the starting OFDM symbol of the PDSCH represented by this schedulable element is recorded as S and S≤E, the PDSCH represented by the one element is mapped to an HARQ-ACK occasion h; the one element is removed from the current set T; and the step 3) is repeated until all schedulable elements satisfying S≤E are processed; and
4) h=h+1; if there are still schedulable elements in the current set T, the process proceeds to 2); or otherwise, MK1=h, and the process ends.

For example, the following method is employed:
1) the counter h of HARQ-ACK occasions is initialized as 0;
2) the minimum index of an ending OFDM symbol of a PDSCH represented by each schedulable element in the set T, which has been not yet allocated with any HARQ-ACK occasion, is determined as E;
3) for one schedulable element in the set T which has been not yet allocated with any HARQ-ACK occasion, if the index of the starting OFDM symbol of the PDSCH represented by this schedulable element is recorded as S and S≤E, the PDSCH represented by the one element is mapped to an HARQ-ACK occasion h; and the step 3) is repeated until all schedulable elements satisfying S≤E are processed; and 4) h=h+1; if not all schedulable elements in the current set T have been processed, the process proceeds to 2); or otherwise, MK1=h, and the process ends.

A third method for determining the HARQ-ACK occasion of each PDSCH time resource within one slot is as follows.

For the set T, the total number MK1 of HARQ-ACK occasions to be mapped is determined; and for each element, one of the MK1 HARQ-ACK occasions to which this element is mapped is determined.

For example, the following method is employed:

1) the counter h of HARQ-ACK occasions is initialized as 0;

2) for the current set T, the minimum index of an ending OFDM symbol of the PDSCH represented by each element is determined as E; and, if the OFDM symbol E is indicated as an uplink OFDM symbol in the semi-static slot pattern, MK1=h, and the process ends;

3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; and 4) h=h+1; if the current set T is not null, the process proceeds to 2); or otherwise, MK1=h, and the process ends.

Or, the following equivalent method is employed:

1) the counter h of HARQ-ACK occasions is initialized as 0;

2) the minimum index of an ending OFDM symbol of a PDSCH represented by each element in the set T, which has been not yet allocated with any HARQ-ACK occasion, is determined as E; and, if the OFDM symbol E is indicated as an uplink OFDM symbol in the semi-static slot pattern, the MK1=h, and the process ends;

3) for one element in the set T which has been not yet allocated with any HARQ-ACK occasion, if the index of the starting OFDM symbol of the PDSCH represented by the one element is recorded as S and S≤E, the PDSCH represented by the one element is mapped to an HARQ-ACK occasion h; and the step 3) is repeated until all elements satisfying S≤E are processed; and 4) h=h+1; if not all elements in the set T have been processed, the process proceeds to 2); or otherwise, MK1=h, and the process ends.

A fourth method for determining the HARQ-ACK occasion of each PDSCH time resource within one slot is as follows.

For the set T, depending upon the condition that all OFDM symbols of one slot are not uplink OFDM symbols, the total number of MK1 of HARQ-ACK occasions to be mapped is determined; and, for each element, one of the MK1 HARQ-ACK occasions to which this element is mapped is determined.

For example, the following method is employed:

1) the counter h of HARQ-ACK occasions is initialized as 0;

2) for the current set T, the minimum index of an ending OFDM symbol of a PDSCH represented by each element is determined as E;

3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; and 4) h=h+1; if the current set T is not null, the process proceeds to 2); or otherwise, MK1=h, and the process ends.

Or, the following equivalent method is employed:

1) the counter h of HARQ-ACK occasions is initialized as 0;

2) the minimum index of an ending OFDM symbol of a PDSCH represented by each element in the set T, which has been not yet allocated with any HARQ-ACK occasion, is determined as E;

3) for one element in the set T which has been not yet allocated with any HARQ-ACK occasion, if the index of the starting OFDM symbol of the PDSCH represented by the one element is recorded as S and S≤E, the PDSCH represented by the one element is mapped to an HARQ-ACK occasion h; and the step 3) is repeated until all elements satisfying S≤E are processed; and 4) h=h+1; if not all elements in the set T have been processed, the process proceeds to 2); or otherwise, MK1=h, and the process ends.

In accordance with the semi-static slot pattern, if the maximum value of the index of the HARQ-ACK occasion of a schedulable element in the set T is recorded as hmax, the total number MK1 of HARQ-ACK occasions to be mapped within one slot n−K1 is equal to hmax+1. For one element in the set T, in accordance with the starting OFDM symbol and the number of OFDM symbols, if any OFDM symbol of this PDSCH is not indicated as an uplink OFDM symbol in the semi-static slot pattern, this element is schedulable.

Several preferred flows of the present invention have been described above. Actually, the specific form of the flow should not be limited in the present invention, and any flow having the same effect or essence as the above method shall fall into the scope of the present invention.

Embodiment 5

For one slot, it is assumed that the K0, the starting OFDM symbol and the number of symbols of a PDSCH can only be some particular values, so that the overhead for indicating PDSCH time resources can be reduced. All possible PDSCH time resources form a set T for configuring a PDSCH scheduling. Each element in the set T can indicate one possibility of the starting OFDM symbol and the number of symbols of the PDSCH. Each element in the set T can further indicate a scheduling delay K0. Each element in the set T can further indicate the PDSCH type. The set T can only contain all possible PDSCH time resources corresponding to one BWP. When multiple BWPs are configured, for one element in the set K, the set T can contain all possible PDSCH time resources for the multiple BWPs. Or, when multiple BWPs are configured, for one element in the set K, the set T can contain all possible PDSCH time resources for a BWP if the set of K1 of the BWP contains the one element of the set K.

For example, the set T can be in form of a time resource table, and an element in the set T corresponds to a row of the time resource table; or, the set T can correspond to multiple time resource tables, and an element in the set T corresponds to a row of one time resource table. When multiple BWPs are configured, it is possible that a time resource table is respectively configured for each BWP; and, for one element in the set K, the set T contains the time resource table for a BWP if the set of K1 for the BWP contains the one element in the set K. Or, the set T can contain the time resource tables for the multiple BWPs.

For one BWP, the time resource tables for the two DCI types may be the same, so that the set T is the same time resource table. Or, for one BWP, the UE may receive the PDSCH according to the D time resource tables, for example, D is equal to 2. The time resource table of DCI of type 2 is expressed as the time resource table A. For example, different time resource tables may be configured separately for the two DCI types. The time resource table for the DCI of type 1 of each BWP may be the same. For the DCI of type 1, the UE may receive the PDSCH according to the D time resource tables, and one of the time resource tables is the same as the time resource table A described above. For example, the time resource tables for the DCI of type 1 transmitted within the CSS and the USS may be different, and the time resource table for the DCI of type 1 transmitted within the USS is the same as the DCI of type 2 (i.e. the time resource table A). Alternatively, the time resource tables for the DCI of type 1 of different CSSs may be different. In the NR system, a control resource set (CORESET) is used for transmitting the PDCCH, wherein CORESET 0 is a common CORESET indicated by pdcch-ConfigSIB1 of the PBCH, and it may schedule transmission of remaining system information (RMSI) and etc. Differentiating the CSS associated with CORESET 0 and the CSS not associated with CORESET 0, the time resource table for the DCI of type 1 may be different, and the time resource table for the DCI of type 1 transmitted within the CSS not associated with CORESET 0 described above is the same as the DCI of type 1 and the DCI of type 2 within the USS (i.e. the time resource table A).

For example, in the NR system, three types of multiplexing patterns of synchronization channels/PBCH and CORESET 0/RMSI are supported, and correspondingly, time resource tables corresponding to the three multiplexing patterns are predefined, which are used to transmit the RMSI, respectively. Wherein, the first multiplexing pattern supports the multiplexing of the synchronization channel/PBCH, CORESET 0 and RMSI by using Time Division Multiplexing (TDM). In the communication after receiving the RMSI, for the DCI of type 1 and the DCI of type 2 in the USS and the DCI of type 1 of the CSS not associated with CORESET 0, if the high layer signaling is configured with a dedicated time resource table, this table is used to schedule PDSCH transmission; if the dedicated time resource table is not configured, but a time resource table is configured in the RMSI, the time resource table configured in the RMSI is used to schedule the PDSCH transmission; if the dedicated time resource table is not configured, the time resource table is not configured in RMSI either, the time resource table of the first multiplexing pattern described above is used to schedule PDSCH transmission. For the DCI of type 1 of the CSS associated with CORESET 0, if the time resource table is configured in the RMSI, this table is used to schedule the PDSCH transmission; if the time resource table is not configured in the RMSI, the time resource table of the first multiplexing pattern described above is used to schedule PDSCH transmissions.

For one element in the set K, for one BWP, if the element corresponds to only one of the two DCI types, the set T can only contain the time resource table for this DCI type; and, if the element corresponds to the two DCI types, the set T contains the time resource tables for the two DCI types. Or, for one element in the set K, for one BWP, the set T always contain the time resource tables for the two DCI types. For one BWP, it is assumed that the UE receives the PDSCH according to the D time resource tables, and the D time resource tables need to be included in the set T.

Or, for one BWP, if identical rows in the time resource table for the DCI of type 1 and the time resource table for the DCI of type 2 are recorded as Ft, the DCI of type 2 can schedule PDSCHs by using rows in the time resource table for the DCI of type 2, while the DCI of type 1 can only schedule PDSCHs by using rows in the Ft. By this method, the table used for scheduling PDSCHs is the time resource table for the DCI of type 2, so that the set T can always be the time resource table for the DCI of type 2. For example, after the UE establishes an RRC connection, the DCI of type 1 can only schedule PDSCHs by using the rows in the Ft, and the overhead of the HARQ-ACK feedback is controlled by the above method. Before the UE establishes an RRC connection, the time resource table for the DCI of type 2 is not yet configured, so that it is not limited that the DCI of type 1 can only schedule PDSCHs by using the rows in the Ft. Or, for one BWP, it is assumed that the UE receives the PDSCH according to the D time resource tables, and the same row of the D time resource tables is expressed as Ft. The set T may be the time resource table A described above. For the case where the time table A is not used, only the rows in the Ft may be used to schedule the PDSCH. For example, the DCI of type 1 and the DCI of type 2 in the USS and the DCI of type 1 of the CSS not associated with CORESET 0 may use the rows of the time resource table A to schedule the PDSCH, and the DCI of type 1 of the CSS associated with the CORESET 0 may only use the row in the Ft to schedule the PDSCH. Alternatively, the DCI of type 1 and the DCI of type 2 in the USS may use the rows of the time resource table A described above to schedule the PDSCH, and the DCI of type 1 of the CSS can schedule the PDSCH only by using the rows in Ft.

Or, for one element in the set K, for one BWP, if the element corresponds to only one of the two DCI types, the set T can only contain the time resource table for this DCI type, and for the DCI of type 1, it is not limited that the DCI of type 1 can only schedule PDSCHs by using rows in the Ft; however, if the element corresponds to the two DCI types, the DCI of type 2 can schedule PDSCHs by using rows in the time resource table for the DCI of type 2, and the DCI of type 1 can only schedule PDSCHs by using rows in the Ft, so that the set T can be the time resource table for the DCI of type 2.

Or, for one BWP, the set T can contain the time resource table for the DCI of type 2 and at least parts of rows of the time resource table for the DCI of type 1. The number of HARQ-ACK bits calculated in the case where the set T contains at least a part of rows of the time resource table for the DCI of type 1 is equal to the number of HARQ-ACK bits calculated in the case where the set T only contains the time resource table for the DCI of type 2.

Or, for one element in the set K, for one BWP, if the element corresponds to only one of the two DCI types, the set T can only contain the time resource table for this DCI type; however, if the element corresponds to the two DCI types, the set T can contain the time resource table for the DCI of type 2 and at least a part of rows of the time resource table for the DCI of type 1. The number of HARQ-ACK bits calculated in the case where the set T contains at least a part of rows of the time resource table for the DCI of type 1 is equal to the number of HARQ-ACK bits calculated in the case where the set T only contains the time resource table for the DCI of type 2.

For example, for one element in the set K, for one BWP, the set T can always be the time resource table for the DCI of type 2. The DCI of type 2 can schedule a PDSCH by a row in the time resource table for the DCI of type 2, while DCI of type 1 may use the rows of the time resource table of DCI of type 1 to schedule the PDSCH, and the scheduled PDSCH is always mapped to one of the HARQ-ACK occasions (for example, the first occasion) determined according to the time resource table of DCI of type 2. Or, it is assumed that the UE receives the PDSCH according to the D time resource tables, and the set T may be the time resource table A. For the case where the time table A is not used, the PDSCH is scheduled by using the row of the corresponding time resource table, and the HARQ-ACK is mapped to one of the HARQ-ACK occasion determined according to the time resource table A described above. For the DC of type 1 and the DC of type 2 in the USS and the DC of type 1 of CSS not associated with CORESET 0, the PDSCH may be scheduled by using the row of time resource table A described above, and for the DCI of type 1 of the CSS associated with CORESET 0, it is always mapped to one of the HARQ-ACK occasions (for example, the first occasion) determined according to time resource table A described above. If it is unnecessary to allocate the HARQ-ACK occasion within one slot according to the set T, then this slot cannot schedule the PDSCH by using the DCI of type 1 of the CSS associated with CORESET 0. Alternatively, the DCI of type 1 and the DCI of type 2 in the USS may schedule the PDSCH by using the row of the time resource table A described above, and for the DCI of type 1 in the CSS, it is always mapped to one of the HARQ-ACK occasions (for example, the first occasion) determined according to the time resource table A described above. If it is not necessary to allocate the HARQ-ACK position within one slot according to the set T, this slot cannot schedule the PDSCH by using the DCI of type 1 of the CSS.

For example, for one element in the set K, for one BWP, the DCI of type 2 can schedule a PDSCH by a row in the time resource table for the DCI of type 2, and the DCI of type 1 can schedule a PDSCH only by a row for the PDSCH type A in the time resource table for the DCI of type 1. In this way, the set T can always be the time resource table for the DCI of type 2. The PDSCH scheduled by the DCI of type 1 can be mapped to the same HARQ-ACK occasion as the PDSCH type A scheduled by the DCI of type 2. Or, it is assumed that the UE receives the PDSCH according to the D time resource tables, and the set T may be the time resource table A. For the case where the time table A is not used, the PDSCH is scheduled only by using the rows of the PDSCH type A, thus mapping to the same HARQ-ACK occasion as the PDSCH type A of the time resource table A described above. For the DCI of type 1 and the DCI of type 2 in the USS and the DCI of type 1 of the CSS not associated with CORESET 0, the PDSCH may be scheduled by using the row of time resource table A described above, the DCI of type 1 in the CSS associated to CORESET 0 can only use the row of the PDSCH type A to schedule the PDSCH, thus mapping to the same HARQ-ACK occasion as the PDSCH type A of the time resource table A described above. If it is unnecessary to allocate the HARQ-ACK occasion for the PDSCH type A within one slot according to the set T, then this slot cannot schedule the PDSCH by using the DCI of type 1 of the CSS associated with CORESET 0. Or, the DCI of type 1 and the DCI of type 2 in the USS may schedule the PDSCH by using the rows of the time resource table A described above, and the DCI of type 1 in the CSS can schedule the PDSCH only by using the rows of the PDSCH type A described above, thus mapping to the same HARQ-ACK occasion as the PDSCH type A of the time resource table A describe above. If it is not necessary to allocate the HARQ-ACK occasion for PDSCH type A within one slot according to the set T, this slot cannot schedule the PDSCH by using the DCI of type 1 of the CSS.

For example, firstly, an HARQ-ACK occasion for one slot is determined according to the time resource table for the DCI of type 2 as the set T; and then, one HARQ-ACK occasion determined according to the time resource table for the DCI of type 2 to which one row in the time resource table for DCI of type 1 is mapped is further determined. Or, it is assumed that the UE receives the PDSCH according to the D time resource tables, and the set T may be the time resource table A. The HARQ-ACK occasion of one slot is determined according to the set T. For the case where the time table A is not used, the rows of the corresponding time resource table are used to schedule the PDSCH and are mapped to one HARQ-ACK occasion determined according to the time resource table A described above. For example, the row of the time resource table of DCI of type 1 of the CSS associated with CORESET 0 is mapped to one HARQ-ACK occasion determined according to the above-described time resource table A. Or, the row of the time resource table of the DCI of type 1 of the CSS is mapped to one HARQ-ACK occasion determined according to the time resource table A described above.

The set T can further contain some other elements. For example, in order to support the SPS, the base station needs to dynamically activate the SPS and allocate PDSCH resources. For the activation of the SPS and the allocation of PDSCH resources, the related parameter K0, the starting OFDM symbol and the number of symbols of the PDSCH and the PDSCH type can be configured independently. After the activation of the SPS, without transmitting any PDCCH, the PDSCHs allocated for the SPS can be transmitted directly. If the number of elements in the set T is recorded as NT, the number of PDSCHs that can be scheduled within one slot is less than or equal to NT. For two elements in the set T, PDSCH resources represented by the two elements can be overlapped completely or partially.

The following method in this embodiment can be used for allocating the HARQ-ACK occasion only for one BWP. At this time, the set K is a set of K1 for this BWP. Or, when multiple BWPs are configured, the following method in this embodiment can also be used for allocating HARQ-ACK occasions for the multiple BWPs. If it is assumed that the sets of K1 configured on different BWPs can be different, the set K is a superset of the sets of K1 for the multiple BWPs; or otherwise, the sets of K1 can be used as the set K.

For an uplink slot n, in accordance with the set K of the parameter K1, it is possible that the slot n−K1 corresponding to only a part of K1 needs to feed back HARQ-ACKs within the slot n. The set of K1 required to feed back HARQ-ACKs within the slot n is recorded as K'. During the determination of an HARQ-ACK codebook within the slot n, only the set K' will be taken into consideration.

A first method for determining the set K' is as follows. A slot n−K1 (where K1∈K') should be able to transmit a PDSCH. The condition can be that the slot n−K1 cannot contain only uplink OFDM symbols, for example, no downlink OFDM symbols and unknown OFDM symbols. The condition can also be as follows: for the slot n−K1, there is at least one element in the set T, any OFDM symbol of a PDSCH resource of the element cannot be indicated as an uplink OFDM symbol in a semi-static slot pattern. Here, it can be further required that the DCI type of the at least one element in the set T is the same as at least one DCI type corresponding to the parameter K1 on a BWP corresponding to at least one element in the set T.

A second method for determining the set K' is as follows. For one uplink slot n−K1, PDSCH resources for the SPS are allocated; or, there is at least one element in the set T so that a slot n−K1−K0 should be able to transmit a PDCCH to schedule PDSCH resources for this element. The slot n−K1−K0 cannot contain only uplink OFDM symbols, for example, no downlink OFDM symbols and unknown OFDM symbols. The slot n−K1−K0 should be able to transmit a PDCCH according to the parameter K0 so as to schedule PDSCH resources of this element. For example, there is a PDCCH candidate within the slot n−K1−K0 in accordance with the configured PDCCH monitoring occasion, and the PDCCH candidate can schedule the PDSCH of this element according to the parameter K0. Here, it can be further required that the DCI type of the PDCCH candidate should be the same as at least one DCI type corresponding to the at least one element in the set T; and/or, it can be further required that the DCI type of the at least one element in the set T is the same as at least one DCI type corresponding to the parameter K1 on a BWP corresponding to the at least one element in the set T.

A third method for determining the set K' is as follows. For a slot n−K1, at least one element in the set T can satisfy the following conditions: 1) any OFDM symbol of a PDSCH resource of this element cannot be indicated as an uplink OFDM symbol in a semi-static slot pattern. 2) Corresponding PDSCH resources for the SPS are allocated; or, in accordance with the parameter K0 of this element, a slot n−K1−K0 should be able to transmit a PDCCH to schedule PDSCH resources of this element. Here, it can be further required that the DCI type of the PDCCH candidate should be the same as at least one DCI type corresponding to the at least one element in the set T; and/or, it can be further required that the DCI type of the at least one element in the set T is the same as at least one DCI type corresponding to the parameter K1 on a BWP corresponding to the at least one element in the set T.

A fourth method for determining the set K' is that K' is allowed to be equal to K. That is, no additional operations are needed to determine K'.

For one slot n−K1 (where K1∈K'), in accordance with a semi-static slot pattern (it is possible to employ the indication method in the first level and/or the second level) and according to the configured PDCCH monitoring occasion and the configured set T, the total number MK1 of HARQ-ACK occasions to which all possible PDSCH time resources within one slot are mapped is determined; and, for each PDSCH time resource in the set T, one of the MK1 HARQ-ACK occasions to which the PDSCH time resource is mapped is determined.

In accordance with the semi-statically configured slot pattern or other information, it is possible that PDSCH resources of only part of elements in the set T are schedulable. For one slot, the number of required HARQ-ACK occasions can be determined according to schedulable elements in the set T, and one HARQ-ACK occasion occupied by one schedulable element is determined. For one slot, each schedulable element satisfies one or more of the following conditions.

The first condition is as follows: any OFDM symbol of a PDSCH resource of the schedulable element cannot be indicated as an uplink OFDM symbol in a semi-static slot pattern. Or, the first condition is as follows: the DCI type of the schedulable element is the same as at least one DCI type corresponding to the parameter K1 on a BWP corresponding to the schedulable element. Or, the first condition is as follows: any OFDM symbol of a PDSCH resource of the schedulable element cannot be indicated as an uplink OFDM symbol in a semi-static slot pattern, and the DCI type of the schedulable element is the same as at least one DCI type corresponding to the parameter K1 on a BWP corresponding to the schedulable element. As shown in FIG. 4, since the last two OFDM symbols 411 and 412 of the slot are uplink OFDM symbols, PDSCH resources 403 and 408 are not schedulable.

The second condition is as follows: in accordance with the parameter K0 of the schedulable element, a slot n−K1−K0 can transmit a PDCCH according to the parameter K0 so as to schedule PDSCH resources of this schedulable element. For example, in accordance with the configured PDCCH monitoring occasion, there is a PDCCH candidate within the slot n−K1−K0, and the PDCCH candidate can schedule the PDSCH of this schedulable element according to the parameter K0. Or, the second condition is as follows: in accordance with the parameter K0 of the schedulable element, a slot n−K1−K0 can transmit a PDCCH to schedule PDSCH resources of this schedulable element. For example, in accordance with the configured PDCCH monitoring occasion, there is a PDCCH candidate within the slot n−K1−K0, and the PDCCH candidate can schedule the PDSCH of this schedulable element. As shown in FIG. 4, since there is no available PDCCH resource 424, accordingly the PDSCH resource 404 is not schedulable. Here, it can be further required that the DCI type of the PDCCH candidate should be the same as at least one DCI type corresponding to the schedulable element; and/or, it can be further required that the DCI type of the schedulable element is the same as at least one DCI type corresponding to the parameter K1 on a BWP corresponding to the schedulable element. Or, if it is assumed that there are PDSCH resources allocated for the SPS within the slot n−K1, it is not necessary to determine, according to the parameter K0, whether elements in the set T corresponding to the PDSCH resources allocated for the SPS are schedulable.

In FIG. 4, for this slot, the required HARQ-ACK occasions can be determined only according to the PDSCH resources 401, 402 and 405-407.

When it is supported that one PDSCH spans over N slots, for one slot n−K1, schedulable elements in the set T can be obtained with reference to the N slots of the PDSCH, i.e., a slot n−K1+q, where q=0, 1, . . . N−1. Subsequently, the number of required HARQ-ACK occasions can be determined according to the schedulable elements in the set T, and then one HARQ-ACK occasion occupied by one schedulable element is determined. Each schedulable element satisfies one or more of the following conditions.

The first condition is as follows: there is at least one q, and within a slot n−K1+q, any OFDM symbol of a PDSCH resource of the schedulable element cannot be indicated as an uplink OFDM symbol in a semi-static slot pattern. Or, the first condition is as follows: there is at least one q, and within a slot n−K1+q, the DCI type of the schedulable element is the same as at least one DCI type corresponding to the parameter K1 on a BWP corresponding to the schedulable element. Or, the first condition is as follows: there is at least one q; within a slot n−K1+q, any OFDM symbol of a PDSCH resource of the schedulable element cannot be indicated as an OFDM symbol in a semi-static slot pattern; and the DCI type of the schedulable element is the same as at least one DCI type corresponding to the parameter K1 on a BWP corresponding to the schedulable element.

The second condition is as follows: in accordance with the parameter K0 of the schedulable element, a slot n−K1−K0 can transmit a PDCCH according to the parameter K0 so as to schedule PDSCH resources for this schedulable element. For example, in accordance with the configured PDCCH monitoring occasion, there is a PDCCH candidate within the slot n−K1−K0, and the PDCCH candidate can schedule the PDSCH of this schedulable element according to the parameter K0. Or, the second condition is as follows: in accordance with the parameter K0 of the schedulable element, a slot n−K1−K0 can transmit a PDCCH to schedule PDSCH resources of this schedulable element. For example, in accordance with the configured PDCCH monitoring occasion, there is a PDCCH candidate within the slot n−K1−K0, and the PDCCH candidate can schedule the PDSCH of this schedulable element. Here, it can be further required that the DCI type of the PDCCH candidate should be the same as at least one DCI type corresponding to the schedulable element; and/or, it can be further required that the DCI type of the schedulable element is the same as at least one DCI type corresponding to the parameter K1 on a BWP corresponding to the schedulable element. Or, if it is assumed that there are PDSCH resources allocated for the SPS within the slot n−K1, it is not necessary to determine, according to the parameter K0, whether elements in the set T corresponding to the PDSCH resources allocated for the SPS are schedulable.

Or, when it is supported that one PDSCH spans over N slots, it is assumed that the set of K1 is divided into one or more subsets, and each value of K1 belongs to only one subset. For one subset $K_s$, if there are multiple K1, PDSCHs spanning over N slots corresponding to any two K1 are partially overlapped, that is, $|K_{1,a}-K_{1,b}|<N$, where $K_{1,a}\in K_s$ and $K_{1,b}\in K_s$. For one subset $K_s$, schedulable elements in the set T are obtained according to the slot n−K1 corresponding to each K1 in the $K_s$. Subsequently, the number of required HARQ-ACK occasions can be determined according to the schedulable elements in the set T, and then one HARQ-ACK occasion occupied by one schedulable element is determined. Each schedulable element satisfies one or more of the following conditions.

The first condition is as follows: for one subset $K_s$, there is at least one K1; and within a slot n−K1, any OFDM symbol of a PDSCH resource of the schedulable element cannot be indicated as an uplink OFDM symbol in a semi-static slot pattern. Or, the first condition is as follows: for one subset $K_s$, there is at least one K1; and within a slot n−K1, the DCI type of the schedulable element is the same as at least one DCI type corresponding to the parameter K1 on a BWP corresponding to the schedulable element. Or, the first condition is as follows: for one subset $K_s$, there is at least one K1; within a slot n−K1, any OFDM symbol of a PDSCH resource of the schedulable element cannot be indicated as an uplink OFDM symbol in a semi-static slot pattern; and the DCI type of the schedulable element is the same as at least one DCI type corresponding to the parameter K1 on a BWP corresponding to the schedulable element.

The second condition is as follows: for one subset $K_s$, there is at least one K1; and in accordance with the parameter K0 of the schedulable element, a slot n−K1−K0 can transmit a PDCCH according to the parameter K0 so as to schedule PDSCH resources for this schedulable element. For example, in accordance with the configured PDCCH monitoring occasion, there is a PDCCH candidate within the slot n−K1−K0, and the PDSCH of this schedulable element can be scheduled according to the parameter K0. Or, the second condition is as follows: for one subset $K_s$, there is at least one K1; and in accordance with the parameter K0 of the schedulable element, a slot n−K1−K0 can transmit a PDCCH to schedule PDSCH resources of this schedulable element. For example, in accordance with the configured PDCCH monitoring occasion, there is a PDCCH candidate within the slot n−K1−K0, and the PDSCH of this schedulable element can be scheduled. Here, it can be further required that the DCI type of the PDCCH candidate should be the same as at least one DCI type corresponding to the schedulable element; and/or, it can be further required that the DCI type of the schedulable element is the same as at least one DCI type corresponding to the parameter K1 on a BWP corresponding to the schedulable element. Or, if it is assumed that there are PDSCH resources allocated for the SPS within the slot n−K1, it is not necessary to determine, according to the parameter K0, whether elements in the set T corresponding to the PDSCH resources allocated for the SPS are schedulable.

Or, when it is supported that one PDSCH spans over N slots, it is assumed that the set of K1 is divided into one or more subsets, and each value of K1 belongs to only one subset. For one subset $K_s$, if there are multiple K1, PDSCHs spanning over N slots corresponding to any two K1 are partially overlapped, that is, $|K_{1,a}-K_{1,b}|<N$, where $K_{1,a}\in K_s$ and $K_{1,b}\in K_s$. For one subset $K_s$, schedulable elements in the set T are obtained according to N slots (slot n−K1+q) corresponding to each K1 in the K. Subsequently, the number of required HARQ-ACK occasions can be determined according to the schedulable elements in the set T, and then one HARQ-ACK occasion occupied by one schedulable element is determined. Each schedulable element satisfies one or more of the following conditions.

The first condition is as follows: for one subset $K_s$, there are at least one K1 and at least one q; and within a slot n−K1+q, any OFDM symbol of a PDSCH resource of the schedulable element cannot be indicated as an uplink OFDM symbol in a semi-static slot pattern. Or, the first condition is as follows: for one subset $K_s$, there is at least one K1 and at least one q; and within a slot n−K1+q, the DCI type of the schedulable element is the same as at least one DCI type corresponding to the parameter K1 on a BWP corresponding to the schedulable element. Or, the first condition is as follows: for one subset $K_s$, there is at least one K1 and at least one q; within a slot n−K1+q, any OFDM symbol of a PDSCH resource of the schedulable element cannot be indicated as an uplink OFDM symbol in a semi-static slot pattern; and the DCI type of the schedulable element is the same as at least one DCI type corresponding to the parameter K1 on a BWP corresponding to the schedulable element.

The second condition is as follows: for one subset $K_s$, there is at least one K1; and in accordance with the parameter K0 of the schedulable element, a slot n−K1−K0 can transmit a PDCCH according to the parameter K0 so as to schedule PDSCH resources for this schedulable element. For example, in accordance with the configured PDCCH monitoring occasion, there is a PDCCH candidate within the slot n−K1−K0, and the PDSCH of this schedulable element can be scheduled according to the parameter K0. Or, the second condition is as follows: for one subset $K_s$, there is at least one K1; and in accordance with the parameter K0 of the schedulable element, a slot n−K1−K0 can transmit a PDCCH to schedule PDSCH resources of this schedulable element. For example, in accordance with the configured PDCCH monitoring occasion, there is a PDCCH candidate within the slot n−K1−K0, and the PDSCH of this schedulable element can be scheduled. Here, it can be further required that the DCI type of the PDCCH candidate should be the same as at least one DCI type corresponding to the schedulable element; and/or, it can be further required that the DCI type of the schedulable element is the same as at least one DCI type corresponding to the parameter K1 on a BWP corresponding to the schedulable element. Or, if it is assumed that there are PDSCH resources allocated for the SPS within the slot n−K1, it is not necessary to determine, according to the parameter K0, whether elements in the set T corresponding to the PDSCH resources allocated for the SPS are schedulable.

If PDSCH resources of two schedulable elements in the set T are overlapped completely or partially, it is assumed that the UE does not need to feed back HARQ-ACK information of the two PDSCHs, so that the number of HARQ-ACK occasions to be allocated can be reduced by utilizing this characteristic. Here, it is possible that the base station cannot simultaneously schedule the PDSCH resources of the two elements, or it is also possible that the UE feeds back HARQ-ACK information of only one PDSCH according to a certain preference strategy although the base station simultaneously schedules the PDSCH resources of the two elements. For all schedulable elements in the set T, the total number MK1 of HARQ-ACK occasions to be mapped is determined; and, for each schedulable element, one of the MK1 HARQ-ACK occasions to which this element is mapped is determined. In this method, the MK1 is equal to the maximum number of non-overlapped PDSCH resources among PDSCH resources of all schedulable elements in the set T. In FIG. 4, the MK1 is equal to 2, PDSCH resources 401, 402, 405 and 407 are mapped to a same HARQ-ACK occasion, and the PDSCH resource 406 is mapped to a same HARQ-ACK occasion.

A first method for determining the HARQ-ACK occasion of each PDSCH time resource within one slot is as follows.

Firstly, elements that cannot be scheduled actually are removed from the set T. It can be determined whether one element in the set T is schedulable, according to one of the following conditions: 1) when the first condition and the second condition for the schedulable element are both satisfied, it is considered that the one element is schedulable; 2) when the first condition for the schedulable element is satisfied, it is considered that the one element is schedulable; and, 3) when the second condition for the schedulable element is satisfied, it is considered that the one element is schedulable. Or, as a simplification, it is also possible that no element needs to be removed from the set T. Equivalently, it is considered that all elements are schedulable. Subsequently, for the current set T, the total number MK1 of HARQ-ACK occasions to be mapped is determined; and for each element, one of the MK1 HARQ-ACK occasions to which this element is mapped is determined.

For example, the following method is employed:

1) the counter h of HARQ-ACK occasions is initialized as 0;
2) for the current set T, the minimum index of an ending OFDM symbol of the PDSCH represented by each element is determined as E;
3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; and
4) h=h+1; if the current set T is not null, the process proceeds to 2); or otherwise, MK1=h, and the process ends.

Or, the following equivalent method is employed:

1) the counter h of HARQ-ACK occasions is initialized as 0;
2) the minimum index of an ending OFDM symbol of the PDSCH represented by each element in the current set T, which has been not yet allocated with any HARQ-ACK occasion, is determined as E;
3) for one element in the current set T which has been not yet allocated with any HARQ-ACK occasion, if the index of the starting OFDM symbol of the PDSCH represented by the one element is recorded as S and S≤E, the PDSCH represented by the one element is mapped to an HARQ-ACK occasion h; and the step 3) is repeated until all elements satisfying S≤E are processed; and
4) h=h+1; if not all elements in the current set T have been processed, the process proceeds to 2); or otherwise, MK1=h, and the process ends.

A second method for determining the HARQ-ACK occasion of each PDSCH time resource within one slot is as follows.

Firstly, elements that cannot be scheduled actually are removed from the set T. When one element in the set T satisfies the second condition of the schedulable element, it is considered that the one element is schedulable. Or, it is also possible that no element needs to be removed from the set T. Equivalently, it is considered that all elements are schedulable. Subsequently, for the current set T, the total number MK1 of HARQ-ACK occasions to be mapped is determined; and for each element, one of the MK1 HARQ-ACK occasions to which this element is mapped is determined.

For example, the following method is employed:

1) the counter h of HARQ-ACK occasions is initialized as 0;
2) for the current set T, the minimum index of an ending OFDM symbol of the PDSCH represented by each element is determined as E; and if the OFDM symbol E is indicated as an uplink OFDM symbol in the semi-static slot pattern, MK1=h, and the process ends;
3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; and
4) h=h+1; if the current set T is not null, the process proceeds to 2); or otherwise, MK1=h, and the process ends.

Or, the following equivalent method is employed:

1) the counter h of HARQ-ACK occasions is initialized as 0;
2) the minimum index of an ending OFDM symbol of a PDSCH represented by each element in the current set T, which has been not yet allocated with any HARQ-ACK occasion, is determined as E; and, if the OFDM symbol E is indicated as an uplink OFDM symbol in the semi-static slot pattern, the MK1=h, and the process ends;
3) for one element in the current set T which has been not yet allocated with any HARQ-ACK occasion, if the index of the starting OFDM symbol of the PDSCH represented by the one element is recorded as S and S≤E, the PDSCH represented by the one element is mapped to an HARQ-ACK occasion h; and the step 3) is repeated until all elements satisfying S≤E are processed; and
4) h=h+1; if not all elements in the current set T have been processed, the process proceeds to 2); or otherwise, MK1=h, and the process ends.

A third method for determining the HARQ-ACK occasion of each PDSCH time resource within one slot is as follows.

Firstly, schedulable elements in the set T are determined. It can be determined whether one element in the set T is schedulable, according to one of the following conditions: 1) when the first condition and the second condition for the schedulable element are both satisfied, it is considered that the one element is schedulable; 2) when the first condition for the schedulable element is satisfied, it is considered that the one element is schedulable; and, 3) when the second condition for the schedulable element is satisfied, it is considered that the one element is schedulable. Subsequently, for the set T, the total number MK1 of HARQ-ACK occasions to be mapped is determined; and for each element, one of the MK1 HARQ-ACK occasions to which this element is mapped is determined.

For example, the following method is employed:

1) the counter h of HARQ-ACK occasions is initialized as 0;

2) for the current set T, the minimum index of an ending OFDM symbol of the PDSCH represented by each schedulable element is determined as E;

3) for one schedulable element in the current set T, if the index of the starting OFDM symbol of the PDSCH represented by this schedulable element is recorded as S and $S \leq E$, the PDSCH represented by the one element is mapped to an HARQ-ACK occasion h; the one element is removed from the current set T; and the step 3) is repeated until all schedulable elements satisfying $S \leq E$ are processed; and 4) h=h+1; if there are still schedulable elements in the current set T, the process proceeds to 2); or otherwise, MK1=h, and the process ends.

Or, the following equivalent method is employed:

1) the counter h of HARQ-ACK occasions is initialized as 0;

2) the minimum index of an ending OFDM symbol of a PDSCH represented by each schedulable element in the set T, which has been not yet allocated with any HARQ-ACK occasion, is determined as E;

3) for one schedulable element in the set T which has been not yet allocated with any HARQ-ACK occasion, if the index of the starting OFDM symbol of the PDSCH represented by the one element is recorded as S and $S \leq E$, the PDSCH represented by the one element is mapped to an HARQ-ACK occasion h; and the step 3) is repeated until all schedulable elements satisfying $S \leq E$ are processed; and 4) h=h+1; if not all schedulable elements in the current set T have been processed, the process proceeds to 2); or otherwise, MK1=h, and the process ends.

A fourth method for determining the HARQ-ACK occasion of each PDSCH time resource within one slot is as follows.

Firstly, schedulable elements in the set T are determined. When one element in the set T satisfies the second condition for the schedulable element, it is considered that the one element is schedulable. Or, it is also possible that no element needs to be removed from the set T. Equivalently, it is considered that all elements are schedulable. Subsequently, for the set T, the total number MK1 of HARQ-ACK occasions to be mapped is determined; and for each element, one of the MK1 HARQ-ACK occasions to which this element is mapped is determined.

For example, the following method is employed:

1) the counter h of HARQ-ACK occasions is initialized as 0;

2) for the current set T, the minimum index of an ending OFDM symbol of the PDSCH represented by each schedulable element is determined as E; and, if the OFDM symbol E is indicated as an uplink OFDM symbol in a semi-static slot pattern, MK1=h, and the process ends;

3) for one schedulable element in the current set T, if the index of the starting OFDM symbol of the PDSCH represented by this schedulable element is recorded as S and $S \leq E$, the PDSCH represented by the one element is mapped to an HARQ-ACK occasion h; the one element is removed from the current set T; and the step 3) is repeated until all schedulable elements satisfying $S \leq E$ are processed; and 4) h=h+1; if there are still schedulable elements in the current set T, the process proceeds to 2); or otherwise, MK1=h, and the process ends.

Or, the following equivalent method is employed:

1) the counter h of HARQ-ACK occasions is initialized as 0;

2) the minimum index of an ending OFDM symbol of a PDSCH represented by each schedulable element in the set T, which has been not yet allocated with any HARQ-ACK occasion, is determined as E; and, if the OFDM symbol E is indicated as an uplink OFDM symbol in a semi-static slot pattern, the MK1=h, and the process ends;

3) for one schedulable element in the set T which has been not yet allocated with any HARQ-ACK occasion, if the index of the starting OFDM symbol of the PDSCH represented by this schedulable element is recorded as S and $S \leq E$, the PDSCH represented by the one element is mapped to an HARQ-ACK occasion h; and the step 3) is repeated until all schedulable elements satisfying $S \leq E$ are processed; and 4) h=h+1; if not all schedulable elements in the current set T have been processed, the process proceeds to 2); or otherwise, MK1=h, and the process ends.

A fifth method for determining the HARQ-ACK occasion of each PDSCH time resource within one slot is as follows.

For the set T, the total number MK of HARQ-ACK occasions to be mapped is determined; and for each element, one of the MK HARQ-ACK occasions to which this element is mapped is determined.

For example, the following method is employed:

1) the counter h of HARQ-ACK occasions is initialized as 0;

2) for the current set T, the minimum index of an ending OFDM symbol of the PDSCH represented by each element is determined as E;

3) for one element in the current set T, if the index of the starting OFDM symbol of the PDSCH represented by this element is recorded as S and $S \leq E$, the PDSCH represented by the one element is mapped to an HARQ-ACK occasion h; the one element is removed from the current set T; and the step 3) is repeated until all elements satisfying $S \leq E$ are processed; and 4) h=h+1; if the current set T is not null, the process proceeds to 2); or otherwise, MK=h, and the process ends.

Or, the following equivalent method is employed:

1) the counter h of HARQ-ACK occasions is initialized as 0;

2) the minimum index of an ending OFDM symbol of a PDSCH represented by each element in the set T, which has been not yet allocated with any HARQ-ACK occasion, is determined as E;

3) for one element in the set T which has been not yet allocated with any HARQ-ACK occasion, if the index of the starting OFDM symbol of the PDSCH represented by the one element is recorded as S and $S \leq E$, the PDSCH represented by the one element is mapped to an HARQ-ACK occasion h; and the step 3) is repeated until all elements satisfying $S \leq E$ are processed; and 4) h=h+1; if not all elements in the set T have been processed, the process proceeds to 2); or otherwise, MK=h, and the process ends.

After the step 4) has been executed, if the maximum value of the index of the HARQ-ACK occasion of a schedulable element in the set T is recorded as hmax, the total number MK1 of HARQ-ACK occasions to be mapped within one slot n−K1 is equal to hmax+1. Or, after the step 4) has been executed, the MK1 is equal to the number of HARQ-ACK occasions actually possibly occupied by the schedulable elements in the set T, and the HARQ-ACK occasions actually possibly occupied by the schedulable elements in the set T are re-sequenced according to the new order of their indexes. Here, it can be determined whether one element in the set T is schedulable, according to one of the following conditions: 1) when the first condition and the second condition for the schedulable element are both satisfied, it is considered that the one element is schedulable; 2) when the first condition for the schedulable element is satisfied, it is considered that the one element is schedulable; and, 3) when the second condition for the schedulable element is satisfied, it is considered that the one element is schedulable.

A sixth method for determining the HARQ-ACK occasion of each PDSCH time resource within one slot is as follows.

For the set T, the total number MK1 of HARQ-ACK occasions to be mapped is determined; and for each element, one of the MK1 HARQ-ACK occasions to which this element is mapped is determined.

For example, the following method is employed:

1) the counter h of HARQ-ACK occasions is initialized as 0;

2) for the current set T, the minimum index of an ending OFDM symbol of the PDSCH represented by each element satisfying the second condition for the schedulable element is determined as E; and, if the OFDM symbol E is indicated as an uplink OFDM symbol in a semi-static slot pattern, MK1=h, and the process ends;

3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; and 4) h=h+1; if the current set T is not null, the process proceeds to 2); or otherwise, MK1=h, and the process ends.

Or, the following equivalent method is employed:

1) the counter h of HARQ-ACK occasions is initialized as 0;

2) the minimum index of an ending OFDM symbol of a PDSCH represented by each element satisfying the second condition for the schedulable element in the current set T, which has been not yet allocated with any HARQ-ACK occasion, is determined as E; and, if the OFDM symbol E is indicated as an uplink OFDM symbol in a semi-static slot pattern, MK1=h, and the process ends;

3) for one element in the current set T which has been not yet allocated with any HARQ-ACK occasion, if the index of the starting OFDM symbol of the PDSCH represented by the one element is recorded as S and S≤E, the PDSCH represented by the one element is mapped to an HARQ-ACK occasion h; and the step 3) is repeated until all elements satisfying S≤E are processed; and 4) h=h+1; if not all elements in the current set T have been processed, the process proceeds to 2); or otherwise, MK1=h, and the process ends.

Several preferred flows of the present invention have been described above. Actually, the specific form of the flow should not be limited in the present invention, and any flow having the same effect or essence as the above method shall fall into the scope of the present invention.

Based on any one of the above preferred flows and in accordance with the set T which contains only the time resource table for the DCI of type 2, an HARQ-ACK occasion is determined; and then, one HARQ-ACK occasion determined according to the time resource table for the DCI of type 2 to which one row in the time resource table for DCI of type 1 is mapped is determined. Or, if it is assumed that the DCI of type 1 and the DCI of type 2 in the USS use a same time resource table, HARQ-ACK occasions for the DCI of type 1 and the DCI of type 2 in the USS are determined in accordance with the set T which contains the same time resource table; and then, one of the determined HARQ-ACK occasions to which one row in the time resource table for DCI of type 1 in the CCS is mapped is determined.

Or, based on any one of the above preferred flows, during the determination of the HARQ-ACK occasion for the set T based on the time resource table for the DCI of type 2, one HARQ-ACK occasion to which one row in the time resource table for DCI of type 1 is mapped can be determined in the step 3). For example, it is based on the first method for determining HARQ-ACK occasions of PDSCH time resources with slots:

1) the counter h of HARQ-ACK occasions is initialized as 0;

2) for the current set T, the minimum index of an ending OFDM symbol of the PDSCH represented by each element is determined as E;

3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; for one element in the time resource table for the DCI of type 1, if the index of the starting OFDM symbol of the PDSCH represented by this element is recorded as S1 and S1≤E, the PDSCH represented by the one element is mapped to an HARQ-ACK occasion h; and the step 3) is repeated until all elements satisfying S1≤E are processed; and 4) h=h+1; if the current set T is not null, the process proceeds to 2); or otherwise, MK1=h, and the process ends.

Or, if it is assumed that the DCI of type 1 and the DCI of type 2 in the USS use a same time resource table, based on any one of the above preferred flows, when the HARQ-ACK occasions for the DCI of type 1 and the DCI of type 2 in the USS are determined in accordance with the set T which contains the same time resource table, one HARQ-ACK occasion to which one row in the time resource table for DCI of type 1 in the CCS is mapped can be determined in the step 3). For example, it is based on the first method for determining HARQ-ACK occasions of PDSCH time resources within slots:

1) the counter h of HARQ-ACK occasions is initialized as 0;

2) for the current set T, the minimum index of an ending OFDM symbol of the PDSCH represented by each element is determined as E;

3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; for one element in the time resource table for the DCI of type 1 in the CSS, if the index of the starting OFDM symbol of the PDSCH represented by this element is recorded as S1 and S1≤E, the PDSCH represented by the one element is mapped to an HARQ-ACK occasion h; and the step 3) is repeated until all elements satisfying S1≤E are processed; and 4) h=h+1; if the current set T is not null, the process proceeds to 2); or otherwise, MK1=h, and the process ends.

Based on any one of the above preferred flows and in accordance with the maximum number C of PDSCHs which can be received by the UE within one slot, the total number of HARQ-ACK occasions to be actually allocated within one slot can be min(MK1,C). The parameter C can be determined by the capability of the UE to receive the maximum number of PDSCHs within one slot, or the C can be semi-statically configured by a higher layer.

When the MK1 is less than or equal to C, in accordance with the above preferred flows, the MK1 HARQ occasions are mapped to MK1 HARQ-ACK occasions.

When the MK1 is greater than C, the MK1 HARQ occasions need to be mapped to C HARQ-ACK occasions. Multiple HARQ-ACK occasions among the MK1 HARQ-ACK occasions are mapped to a same one of the C HARQ-ACK occasions. For example, the $c^{th}$ HARQ occasion among the C HARQ-ACK occasions corresponds to the HARQ-ACK occasion $$\left\lfloor \frac{MK1}{c} \cdot c \right\rfloor \le h < \left\lfloor \frac{MK1}{c} + (c+1) \right\rfloor$$

among the MK1 HARQ-ACK occasions, where c=0, 1, ... C−1 and h is an index of one occasion among the MK1 HARQ-ACK occasions. Or, the $c^{th}$ HARQ occasion among the C HARQ-ACK occasions corresponds to the HARQ-ACK occasion h=C·p+c among the MK1 HARQ-ACK occasions, where p=0, 1, . . . . .

Or, a DAI field can be contained in the DCI, so that sequencing is performed according to the value of the DAI. The UE can sequence the HARQ-ACK information within one slot according to the DAI, and the total number of HARQ-ACK occasions allocated within the one slot is min(MK1,C) Or, the UE can also sequence the HARQ-ACK information within slots corresponding to the set K according to the DAI, and the total number of HARQ-ACK occasions allocated within slots corresponding to the set K is equal to the sum of the number of HARQ-ACK occasions allocated within each slot corresponding to the set K.

In the method, when it is configured that only one PDSCH is mapped to one slot, the HARQ-ACK occasion of one slot n−K1 is determined by the method; when it is configured that one PDSCH spans over N slots, at most one HARQ-ACK occasion is allocated to one slot n−K1. If there are schedulable elements in the set T, the parameter X is 1; or otherwise, the parameter X is 0.

In the various embodiments of this embodiment, one HARQ-ACK occasion is not related to the PDSCH type of schedulable elements in the set T, and Y HARQ-ACK bits are allocated. For one BWP, Y is the number of HARQ-ACK bits of the configured PDSCHs. When multiple BWPs are configured, Y can be the maximum value of the number of HARQ-ACK bits of PDSCHs configured on the multiple BWPs.

Or, in the various methods in this embodiment, if it is assumed that all elements in the set T employ the same PDSCH type, for the one HARQ-ACK occasion, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits configured for this PDSCH type on the multiple BWPs.

Or, in the various methods in this embodiment, if all elements in the set T employ the PDSCH type A, YA HARQ-ACK bits are allocated to one HARQ-ACK occasion; if all elements in the set T employ the PDSCH type B, YB HARQ-ACK bits are allocated to one HARQ-ACK occasion; and, if the elements in the set T employ both the PDSCH type A and the PDSCH type B, Y HARQ-ACK bits are allocated to one HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits configured for the PDSCH type A on the multiple BWPs, YB can be the maximum value of the number of HARQ-ACK bits configured for the PDSCH type B on the multiple BWPs, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, for one HARQ-ACK occasion, Y can be the maximum value of the number of HARQ-ACK bits of PDSCHs configured on BWPs of all elements mapped to this HARQ-ACK occasion in the set T.

Or, in the various methods in this embodiment, for one HARQ-ACK occasion, if all elements mapped to this HARQ-ACK occasion in the set T employ the PDSCH type A, YA HARQ-ACK bits are allocated to this HARQ-ACK occasion; if all elements mapped to this HARQ-ACK occasion in the set T employ the PDSCH type B, YB HARQ-ACK bits are allocated to this HARQ-ACK occasion; and, if the elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, for one HARQ-ACK occasion, YA can be the maximum value of the number of HARQ-ACK bits configured for BWPs of all elements of the PDSCH type A mapped to this HARQ-ACK occasion in the set T, YB can be the maximum value of the number of HARQ-ACK bits configured for BWPs of all elements of the PDSCH type B mapped to this HARQ-ACK occasion in the set T, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, Y can be the maximum value of the number of HARQ-ACK bits of PDSCHs configured on BWPs of all schedulable elements in the set T.

Or, in the various methods in this embodiment, if it is assumed that all schedulable elements in the set T employ the same PDSCH type, for the one HARQ-ACK occasion, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits of PDSCHs configured on BWPs of all schedulable elements of this PDSCH type in the set T.

Or, in the various methods in this embodiment, if all schedulable elements in the set T employ the PDSCH type A, YA HARQ-ACK bits are allocated to one HARQ-ACK occasion; if all schedulable elements in the set T employ the PDSCH type B, YB HARQ-ACK bits are allocated to one HARQ-ACK occasion; and, if the schedulable elements in the set T employ both the PDSCH type A and the PDSCH type B, Y HARQ-ACK bits are allocated to one HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits of PDSCHs configured on BWPs of all schedulable elements of the PDSCH type A in the set T, YB can be the maximum value of the number of HARQ-ACK bits of PDSCHs configured on BWPs of all schedulable elements of the PDSCH type B in the set T, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, for one HARQ-ACK occasion, Y can be the maximum value of the number of HARQ-ACK bits of PDSCHs configured on BWPs of all schedulable elements mapped to this HARQ-ACK occasion in the set T.

Or, in the various methods in this embodiment, for one HARQ-ACK occasion, if all schedulable elements mapped to this HARQ-ACK occasion in the set T employ the PDSCH type A, YA HARQ-ACK bits are allocated to this HARQ-ACK occasion; if all schedulable elements mapped to this HARQ-ACK occasion in the set T employ the PDSCH type B, YB HARQ-ACK bits are allocated to this HARQ-ACK occasion; and, if the schedulable elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, for one HARQ-ACK occasion, YA can be the maximum value of the number of HARQ-ACK bits of PDSCHs configured on BWPs of all schedulable elements of the PDSCH type A mapped to this HARQ-ACK occasion in the set T, YB can be the maximum value of the number of HARQ-ACK bits of PDSCHs configured on BWPs of all schedulable elements of the PDSCH type B mapped to this HARQ-ACK occasion in the set T, and Y is the larger one of the YA and YB.

Or, in the various methods in this embodiment, in accordance with the configured PDCCH monitoring occasion, if all schedulable elements in the set T correspond to the DCI of type 1, one HARQ-ACK bit is allocated to the one HARQ-ACK occasion; or otherwise, Y HARQ-ACK bits are allocated to the one HARQ-ACK occasion. For one BWP, Y is the number of HARQ-ACK bits of the configured PDSCHs. When multiple BWPs are configured, Y can be the maximum value of the number of HARQ-ACK bits of PDSCHs configured on BWPs corresponding to all schedulable elements in the set T.

Or, in the various methods in this embodiment, in accordance with the configured PDCCH monitoring occasion, if all schedulable elements in the set T correspond to the DCI of type 1, one HARQ-ACK bit is allocated to the one HARQ-ACK occasion. Otherwise, it is assumed that all schedulable elements in the set T employ the same PDSCH type; and, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits of PDSCHs configured on BWPs of all schedulable elements of this PDSCH type in the set T.

Or, in the various methods in this embodiment, in accordance with the configured PDCCH monitoring occasion, if all schedulable elements in the set T correspond to the DCI of type 1, one HARQ-ACK bit is allocated to this HARQ-ACK occasion; or otherwise, the number of HARQ-ACK bits of this HARQ-ACK occasion is determined according to the PDSCH type. If all schedulable elements in the set T employ the PDSCH type A, YA HARQ-ACK bits are allocated to this HARQ-ACK occasion; if all schedulable elements in the set T employ the PDSCH type B, YB HARQ-ACK bits are allocated to this HARQ-ACK occasion; and, if the schedulable elements in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits of PDSCHs configured on BWPs of all schedulable elements of the PDSCH type A in the set T, YB can be the maximum value of the number of HARQ-ACK bits of PDSCHs configured on BWPs of all schedulable elements of the PDSCH type B in the set T, and Y is the larger one of the YA and YB.

Or, in the various methods in this embodiment, for one HARQ-ACK occasion, in accordance with the configured PDCCH monitoring occasion, if all schedulable elements in the set T mapped to the one HARQ-ACK occasion correspond to the DCI of type 1, one HARQ-ACK bit is allocated to the one HARQ-ACK occasion; or otherwise, Y HARQ-ACK bits are allocated to the one HARQ-ACK occasion. For one BWP, Y is the number of HARQ-ACK bits of the configured PDSCHs. When multiple BWPs are configured, Y can be the maximum value of the number of HARQ-ACK bits of PDSCHs configured on BWPs of all schedulable elements mapped to the one HARQ-ACK occasion in the set T.

Or, in the various methods in this embodiment, for one HARQ-ACK occasion, in accordance with the configured PDCCH monitoring occasion, if all schedulable elements in the set T mapped to the one HARQ-ACK occasion correspond to the DCI of type 1, one HARQ-ACK bit is allocated to the one HARQ-ACK occasion. Otherwise, it is assumed that all schedulable elements in the set T employ the same PDSCH type; and, for one BWP, the number of HARQ-ACK bits of the one HARQ-ACK occasion is determined according to this PDSCH type. When multiple BWPs are configured, Y can be the maximum value of the number of HARQ-ACK bits of PDSCHs configured on BWPs of all schedulable elements of this PDSCH type mapped to the one HARQ-ACK occasion in the set T.

Or, in the various methods in this embodiment, for one HARQ-ACK occasion, in accordance with the configured PDCCH monitoring occasion, if all schedulable elements in the set T mapped to this HARQ-ACK occasion correspond to the DCI of type 1, one HARQ-ACK bit is allocated to this HARQ-ACK occasion; or otherwise, the number of HARQ-ACK bits of this HARQ-ACK occasion is determined according to the PDSCH type. For this HARQ-ACK occasion, if all schedulable elements mapped to this HARQ-ACK occasion in the set T employ the PDSCH type A, YA HARQ-ACK bits are allocated to this HARQ-ACK occasion; if all schedulable elements mapped to this HARQ-ACK occasion in the set T employ the PDSCH type B, YB HARQ-ACK bits are allocated to this HARQ-ACK occasion; and, if the schedulable elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits of PDSCHs configured on BWPs of all schedulable elements of the PDSCH type A mapped to the one HARQ-ACK occasion in the set T, YB can be the maximum value of the number of HARQ-ACK bits of PDSCHs configured on BWPs of all schedulable elements of the PDSCH type B mapped to the one HARQ-ACK occasion in the set T, and Y is the larger one of the YA and YB.

Embodiment 6

For one slot, it is assumed that the K0, the starting OFDM symbol and the number of symbols of a PDSCH can only be some particular values, so that the overhead for indicating PDSCH time resources can be reduced. All possible PDSCH time resources form a set T for configuring a PDSCH scheduling. Each element in the set T can indicate one possibility of the starting OFDM symbol and the number of symbols of the PDSCH. Each element in the set T can further indicate a scheduling delay K0. Each element in the set T can further indicate the PDSCH type. The set T can only contain all possible PDSCH time resources corresponding to one BWP. When multiple BWPs are configured, for one element in the set K, the set T can contain all possible PDSCH time resources for the multiple BWPs. Or, when multiple BWPs are configured, for one element in the set K, if the set of K1 of one BWP contains one element of the set K, the set T can contain all possible PDSCH time resources for this BWP.

For example, the set T can be in form of a time resource table, and each element in the set T corresponds to a row of the table time resource; or, the set T can correspond to multiple time resource tables, and each element in the set T corresponds to a row of one time resource table. When multiple BWPs are configured, it is possible that a time resource table is respectively configured for each BWP; and, for one element in the set K, and if the set of K1 of one BWP contains one element in the set K, the set T contains the table of this BWP. Or, the set T can contain the tables for the multiple BWPs. For one BWP, different time resource tables are configured for the two DCI types. The time resource table for the DCI of type 1 of each BWP can be identical. Or, for the DCI of type 1, it is possible to further distinguish a CSS from a USS, so that time resource tables for the DCI of type 1 transmitted within the CSS and the USS can be different. In addition, if there are CSSs of different types, for example, distinguishing a CSS for an initial BWP from a CSS for a BWP configured by RRC, time resource tables for the DCI of type 1 can be different.

For example, in an NR system, three types of multiplexing patterns of synchronization channels/PBCH and CORESET 0/RMSI are supported, and correspondingly, time resource tables corresponding to the three multiplexing patterns are predefined, which are used to transmit the RMSI, respectively. Wherein, the first multiplexing pattern supports the multiplexing of the synchronization channel/PBCH, CORESET 0 and RMSI by using Time Division Multiplexing (TDM). In the communication after receiving the RMSI, for the DCI of type 1 and the DCI of type 2 in the USS and the DCI of type 1 of the CSS not associated with CORESET 0, if the high layer signaling is configured with a dedicated time resource table, this table is used to schedule PDSCH transmission; if the dedicated time resource table is not configured, but the time resource table is configured in the RMSI, the time resource table configured in the RMSI is used to schedule the PDSCH transmission; if the dedicated time resource table is not configured, the time resource table is not configured in RMSI either, the time resource table of the first multiplexing pattern described above is used to schedule PDSCH transmission. For the DCI of type 1 of the CSS associated with CORESET 0, if the time resource table is configured in the RMSI, this table is used to schedule the PDSCH transmission; if the time resource table is not configured in the RMSI, the time resource table of the first multiplexing pattern described above is used to schedule PDSCH transmission. For one element in the set K, for one BWP, if the element corresponds to only one of the two DCI types, the set T can only contain the time resource table for this DCI type; and, if the element corresponds to the two DCI types, the set T contains the time resource tables for the two DCI types. Or, for one element in the set K, for one BWP, the set T always contain the time resource tables for the two DCI types. For the DCI of type 1, if it is assumed that there are multiple time resource tables, for example, if USSs and CSSs use different time resource tables or CSSs of different types use different time resource tables, the multiple time resource tables need to be contained in the set T.

Or, for one BWP, if identical rows in the time resource table for the DCI of type 1 and the time resource table for the DCI of type 2 are recorded as Ft, the DCI of type 2 can schedule PDSCHs by using rows in the time resource table for the DCI of type 2, while the DCI of type 1 can only schedule PDSCHs by using rows in the Ft. By this method, the table used for scheduling PDSCHs is the time resource table for the DCI of type 2, so that the set T can always be the time resource table for the DCI of type 2. For example, after the UE establishes an RRC connection, the DCI of type 1 can only schedule PDSCHs by using the rows in the Ft, and the overhead of the HARQ-ACK feedback is controlled by the above method. Before the UE establishes an RRC connection, the time resource table for the DCI of type 2 is not yet configured, so that it is not limited that the DCI of type 1 can only schedule PDSCHs by using the rows in the Ft. Or, for one BWP, for a USS, if it is assumed that the DCI of type 1 and the DCI of type 2 use a same time resource table, the time resource tables for the DCI of type 1 in the CSS and the USS can be different, and the set T can be the time resource table for the USS. if identical rows in the time resource table for the DCI of type 1 in the CSS and the time resource table in the USS are recorded as Ft, the DCI of type 2 can schedule a PDSCH by a row in the time resource table for the USS, the DCI of type 1 in the USS can schedule a PDSCH by a row in the time resource table for the USS, and the DCI of type 1 in the CSS can schedule a PDSCH only by a row in Ft.

Or, for one element in the set K, for one BWP, if the element corresponds to only one of the two DCI types, the set T can only contain the time resource table for this DCI type, and for the DCI of type 1, it is not limited that the DCI of type 1 can only schedule PDSCHs by using rows in the Ft; however, if the element corresponds to the two DCI types, the DCI of type 2 can schedule PDSCHs by using rows in the time resource table for the DCI of type 2, and the DCI of type 1 can only schedule PDSCHs by using rows in the Ft, so that the set T can be the time resource table for the DCI of type 2.

Or, for one BWP, the set T can contain the time resource table for the DCI of type 2 and at least parts of rows of the time resource table for the DCI of type 1. The number of HARQ-ACK bits calculated in the case where the set T contains at least a part of rows of the time resource table for the DCI of type 1 is equal to the number of HARQ-ACK bits calculated in the case where the set T only contains the time resource table for the DCI of type 2.

Or, for one element in the set K, for one BWP, if the element corresponds to only one of the two DCI types, the set T can only contain the time resource table for this DCI type; however, if the element corresponds to the two DCI types, the set T can contain the time resource table for the DCI of type 2 and at least a part of rows of the time resource table for the DCI of type 1. The number of HARQ-ACK bits calculated in the case where the set T contains at least a part of rows of the time resource table for the DCI of type 1 is equal to the number of HARQ-ACK bits calculated in the case where the set T only contains the time resource table for the DCI of type 2.

For example, for one element in the set K, for one BWP, the set T can always be the time resource table for the DCI of type 2. The DCI of type 2 can schedule a PDSCH by a row in the time resource table for the DCI of type 2, and the PDSCH scheduled by the DCI of type 1 is always mapped to one occasion (for example, the first occasion) among HARQ-ACK occasions determined according to the time resource table for the DCI of type 2. Or, if it is assumed that the DCI of type 1 and the DCI of type 2 in the USS use a same time resource table, the time resource tables for the DCI of type 1 in the CSS and the USS can be different, and the set T can be the time resource table for the USS. The DCI of type 2 can schedule a PDSCH by a row in the time resource table for the USS, the DCI of type 1 in the USS can schedule a PDSCH by a row in the time resource table for the USS, and the DCI of type 1 in the CSS is always mapped to one occasion (for example, the first occasion) among HARQ-ACK occasions determined according to the time resource table for the DCI of type 2. If it is unnecessary to allocate the HARQ-ACK occasion within one slot according to the set T, any PDSCH cannot be scheduled within this slot by the DCI of type 1.

For example, for one element in the set K, for one BWP, the DCI of type 2 can schedule a PDSCH by a row in the time resource table for the DCI of type 2, and the DCI of type 1 can schedule a PDSCH only by a row for the PDSCH type A in the time resource table for the DCI of type 1. In this way, the set T can always be the time resource table for the DCI of type 2. The PDSCH scheduled by the DCI of type 1 can be mapped to the same HARQ-ACK occasion as the PDSCH type A scheduled by the DCI of type 2. Or, if it is assumed that the DCI of type 1 and the DCI of type 2 in the USS use a same time resource table, the time resource tables for the DCI of type 1 in the CSS and the USS can be different, and the set T can be the time resource table for the USS. The DCI of type 2 can schedule a PDSCH by a row in the time resource table for the USS, the DCI of type 1 in the USS can schedule a PDSCH by a row in the time resource table for the USS, and the DCI of type 1 in the CSS can schedule a PDSCH only by a row for the PDSCH type A in the time resource table for the DCI of type 1, so that the PDSCH type A in the time resource table for the USS is mapped to the same HARQ-ACK occasion. If it is unnecessary to allocate the HARQ-ACK occasion for the PDSCH type A within one slot according to the set T, any PDSCH cannot be scheduled within this slot by the DCI of type 1.

For example, firstly, an HARQ-ACK occasion for one slot is determined according to the time resource table for the DCI of type 2 as the set T; and then, one HARQ-ACK occasion determined according to the time resource table for the DCI of type 2 to which one row in the time resource table for DCI of type 1 is mapped is determined. Or, if it is assumed that the DCI of type 1 and the DCI of type 2 in the USS use a same time resource table, the time resource tables for the DCI of type 1 in the CSS and the USS can be different. Firstly, an HARQ-ACK occasion for one slot is determined according to the time resource table for the USS as the set T; and then, one HARQ-ACK occasion determined according to the time resource table in the USS to which one row in the time resource table for DCI of type 1 is mapped is determined.

The set T can further contain some other elements. For example, in order to support the SPS, the base station needs to dynamically activate the SPS and allocate PDSCH resources. For the activation of the SPS and the allocation of PDSCH resources, the related parameter K0, the starting OFDM symbol and the number of symbols of the PDSCH and the PDSCH type can be configured independently. After the activation of the SPS, without transmitting any PDCCH, the PDSCHs allocated for the SPS can be transmitted directly. If the number of elements in the set T is recorded as NT, the number of PDSCHs that can be scheduled within one slot is less than or equal to NT. For two elements in the set T, PDSCH resources represented by the two elements can be overlapped completely or partially.

The following method in this embodiment can be used for allocating the HARQ-ACK occasion only for one BWP. At this time, the set K is a set of K1 for this BWP. Or, when multiple BWPs are configured, the following method in this embodiment can also be used for allocating HARQ-ACK occasions for the multiple BWPs. If it is assumed that the sets of K1 configured on different BWPs can be different, the set K is a superset of the sets of K1 for the multiple BWPs; or otherwise, the sets of K1 can be used as the set K.

For one slot n−K1 (where K1∈K'), in accordance with a semi-static slot pattern (it is possible to employ the indication method in the first level and/or the second level) and according to the configured PDCCH monitoring occasion and the configured set T, the total number MK1 of HARQ-ACK occasions to which all possible PDSCH time resources within one slot are mapped is determined; and, for each PDSCH time resource in the set T, one of the MK1 HARQ-ACK occasions to which the PDSCH time resource is mapped is determined.

In accordance with the semi-statically configured slot pattern or other information, it is possible that PDSCH resources of only part of elements in the set T are schedulable. For one slot, the number of required HARQ-ACK occasions can be determined according to schedulable elements in the set T, and one HARQ-ACK occasion occupied by one schedulable element is determined. For one slot, each schedulable element satisfies one or more of the following conditions.

The first condition is as follows: at least one OFDM symbol of a PDSCH resource of the schedulable element cannot be indicated as an uplink OFDM symbol in a semi-static slot pattern. Or, the first condition is as follows: the first OFDM symbol of a PDSCH resource of the schedulable element cannot be indicated as an uplink OFDM symbol in a semi-static slot pattern. Based on the first condition, a part of OFDM symbols of a PDSCH scheduled by the base station may be configured as uplink OFDM symbols and the uplink OFDM symbols cannot be used for the PDSCH transmission. When PDSCH rate matching is executed, the rate matching is executed according to the above condition that the uplink OFDM can transmit PDSCH, however, but the OFDM symbols are punched when the PDSCH is actually transmitted. Or, when PDSCH rate matching is executed, the rate matching is executed according to the above condition that the uplink OFDM does not transmit PDSCH and the uplink OFDM symbols are skipped when the PDSCH is mapped. Or, the first condition is as follows: the DCI type of the schedulable element is the same as at least one DCI type corresponding to the parameter K1 on a BWP corresponding to the schedulable element. Or, the first condition is as follows: at least one OFDM symbol of a PDSCH resource of the schedulable element cannot be indicated as an uplink OFDM symbol in a semi-static slot pattern, and the DCI type of the schedulable element is the same as at least one DCI type corresponding to the parameter K1 on a BWP corresponding to the schedulable element. Or, the first condition is as follows: the first OFDM symbol of a PDSCH resource of the schedulable element cannot be indicated as an uplink OFDM symbol in a semi-static slot pattern, and the DCI type of the schedulable element is the same as at least one DCI type corresponding to the parameter K1 on a BWP corresponding to the schedulable element.

The second condition is as follows: in accordance with the parameter K0 of the schedulable element, a slot n−K1−K0 can transmit a PDCCH according to the parameter K0 so as to schedule PDSCH resources of this schedulable element. For example, in accordance with the configured PDCCH monitoring occasion, there is a PDCCH candidate within the slot n−K1−K0, and the PDCCH candidate can schedule the PDSCH of this schedulable element according to the parameter K0. Or, the second condition is as follows: in accordance with the parameter K0 of the schedulable element, a slot n−K1−K0 can transmit a PDCCH to schedule PDSCH resources of this schedulable element. For example, in accordance with the configured PDCCH monitoring occasion, there is a PDCCH candidate within the slot n−K1−K0, and the PDCCH candidate can schedule the PDSCH of this schedulable element. Here, it can be further required that the DCI type of the PDCCH candidate should be the same as at least one DCI type corresponding to the schedulable element; and/or, it can be further required that the DCI type of the schedulable element is the same as at least one DCI type corresponding to the parameter K1 on a BWP corresponding to the schedulable element. Or, if it is assumed that there are PDSCH resources allocated for the SPS within the slot n−K1, it is not necessary to determine, according to the parameter K0, whether elements in the set T corresponding to the PDSCH resources allocated for the SPS are schedulable.

When it is supported that one PDSCH spans over N slots, for one slot n−K1, schedulable elements in the set T can be obtained with reference to the N slots of the PDSCH, i.e., a slot n−K1+q, where q=0, 1 . . . N−1. Subsequently, the number of required HARQ-ACK occasions can be determined according to the schedulable elements in the set T, and then one HARQ-ACK occasion occupied by one schedulable element is determined. Each schedulable element satisfies one or more of the following conditions.

The first condition is as follows: there is at least one q, and within a slot n−K1+q, at least one OFDM symbol of a PDSCH resource of the schedulable element cannot be indicated as an uplink OFDM symbol in a semi-static slot pattern. Or, the first condition is as follows: there is at least one q, and within a slot n−K1+q, the first OFDM symbol of a PDSCH resource of the schedulable element cannot be indicated as an uplink OFDM symbol in a semi-static slot pattern. Or, the first condition is as follows: there is at least one q, and within a slot n−K1+q, the DCI type of the schedulable element is the same as at least one DCI type corresponding to the parameter K1 on a BWP corresponding to the schedulable element. Or, the first condition is as follows: there is at least one q; within a slot n−K1+q, at least one OFDM symbol of a PDSCH resource of the schedulable element cannot be indicated as an uplink OFDM symbol in a semi-static slot pattern; and the DCI type of the schedulable element is the same as at least one DCI type corresponding to the parameter K1 on a BWP corresponding to the schedulable element. Or, the first condition is as follows: there is at least one q; within a slot n−K1+q, the first OFDM symbol of a PDSCH resource of the schedulable element cannot be indicated as an uplink OFDM symbol in a semi-static slot pattern; and the DCI type of the schedulable element is the same as at least one DCI type corresponding to the parameter K1 on a BWP corresponding to the schedulable element.

The second condition is as follows: in accordance with the parameter K0 of the schedulable element, a slot n−K1−K0 can transmit a PDCCH according to the parameter K0 so as to schedule PDSCH resources for this schedulable element. For example, in accordance with the configured PDCCH monitoring occasion, there is a PDCCH candidate within the slot n−K1−K0, and the PDCCH candidate can schedule the PDSCH of this schedulable element according to the parameter K0. Or, the second condition is as follows: in accordance with the parameter K0 of the schedulable element, a slot n−K1−K0 can transmit a PDCCH to schedule PDSCH resources of this schedulable element. For example, in accordance with the configured PDCCH monitoring occasion, there is a PDCCH candidate within the slot n−K1−K0, and the PDCCH candidate can schedule the PDSCH of this schedulable element. Here, it can be further required that the DCI type of the PDCCH candidate should be the same as at least one DCI type corresponding to the schedulable element; and/or, it can be further required that the DCI type of the schedulable element is the same as at least one DCI type corresponding to the parameter K1 on a BWP corresponding to the schedulable element. Or, if it is assumed that there are PDSCH resources allocated for the SPS within the slot n−K1, it is not necessary to determine, according to the parameter K0, whether elements in the set T corresponding to the PDSCH resources allocated for the SPS are schedulable.

Or, when it is supported that one PDSCH spans over N slots, it is assumed that the set of K1 is divided into one or more subsets, and each value of K1 belongs to only one subset. For one subset $K_s$, if there are multiple K1, PDSCHs spanning over N slots corresponding to any two K1 are partially overlapped, that is, $|K_{1,a}-K_{1,b}|<N$, where $K_{1,a} \in K$ and $K_{1,b} \in K_s$. For one subset $K_s$, schedulable elements in the set T are obtained according to the slot n−K1 corresponding to each K1 in the $K_s$. Subsequently, the number of required HARQ-ACK occasions can be determined according to the schedulable elements in the set T, and then one HARQ-ACK occasion occupied by one schedulable element is determined. Each schedulable element satisfies one or more of the following conditions.

The first condition is as follows: for one subset $K_s$, there is at least one K; and within a slot n−K1, any OFDM symbol of a PDSCH resource of the schedulable element cannot be indicated as an uplink OFDM symbol in a semi-static slot pattern. Or, the first condition is as follows: for one subset $K_s$, there is at least one K1; and within a slot n−K1, the DCI type of the schedulable element is the same as at least one DCI type corresponding to the parameter K1 on a BWP corresponding to the schedulable element. Or, the first condition is as follows: for one subset $K_s$, there is at least one K1; within a slot n−K1, any OFDM symbol of a PDSCH resource of the schedulable element cannot be indicated as an uplink OFDM symbol in a semi-static slot pattern; and the DCI type of the schedulable element is the same as at least one DCI type corresponding to the parameter K1 on a BWP corresponding to the schedulable element.

The second condition is as follows: for one subset $K_s$, there is at least one K1; and in accordance with the parameter K0 of the schedulable element, a slot n−K1−K0 can transmit a PDCCH according to the parameter K0 so as to schedule PDSCH resources for this schedulable element. For example, in accordance with the configured PDCCH monitoring occasion, there is a PDCCH candidate within the slot n−K1−K0, and the PDSCH of this schedulable element can be scheduled according to the parameter K0. Or, the second condition is as follows: for one subset $K_s$, there is at least one K1; and in accordance with the parameter K0 of the schedulable element, a slot n−K1−K0 can transmit a PDCCH to schedule PDSCH resources of this schedulable element. For example, in accordance with the configured PDCCH monitoring occasion, there is a PDCCH candidate within the slot n−K1−K0, and the PDSCH of this schedulable element can be scheduled. Here, it can be further required that the DCI type of the PDCCH candidate should be the same as at least one DCI type corresponding to the schedulable element; and/or, it can be further required that the DCI type of the schedulable element is the same as at least one DCI type corresponding to the parameter K1 on a BWP corresponding to the schedulable element. Or, if it is assumed that there are PDSCH resources allocated for the SPS within the slot n−K1, it is not necessary to determine, according to the parameter K0, whether elements in the set T corresponding to the PDSCH resources allocated for the SPS are schedulable.

Or, when it is supported that one PDSCH spans over N slots, it is assumed that the set of K1 is divided into one or more subsets, and each value of K1 belongs to only one subset. For one subset $K_s$, if there are multiple K1, PDSCHs spanning over N slots corresponding to any two K1 are partially overlapped, that is, $|K_{1,a}-K_{1,b}|<N$ where $K_{1,a} \in K_s$ and $K_{1,b} \in K_s$. For one subset $K_s$, schedulable elements in the set T are obtained according to N slots (slot n−K1+q) corresponding to each K1 in the $K_s$. Subsequently, the number of required HARQ-ACK occasions can be determined according to the schedulable elements in the set T, and then one HARQ-ACK occasion occupied by one schedulable element is determined. Each schedulable element satisfies one or more of the following conditions.

The first condition is as follows: for one subset $K_s$, there are at least one K1 and at least one q; and within a slot n−K1+q, any OFDM symbol of a PDSCH resource of the schedulable element cannot be indicated as an uplink OFDM symbol in a semi-static slot pattern. Or, the first condition is as follows: for one subset $K_s$, there is at least one K1 and at least one q; and within a slot n−K1+q, the DCI type of the schedulable element is the same as at least one DCI type corresponding to the parameter K1 on a BWP corresponding to the schedulable element. Or, the first condition is as follows: for one subset $K_s$, there is at least one K1 and at least one q; within a slot n−K1+q, any OFDM symbol of a PDSCH resource of the schedulable element cannot be indicated as an uplink OFDM symbol in a semi-static slot pattern; and the DCI type of the schedulable element is the same as at least one DCI type corresponding to the parameter K1 on a BWP corresponding to the schedulable element.

The second condition is as follows: for one subset $K_s$, there is at least one K1; and in accordance with the parameter K0 of the schedulable element, a slot n−K1−K0 can transmit a PDCCH according to the parameter K0 so as to schedule PDSCH resources for this schedulable element. For example, in accordance with the configured PDCCH monitoring occasion, there is a PDCCH candidate within the slot n−K1−K0, and the PDSCH of this schedulable element can be scheduled according to the parameter K0. Or, the second condition is as follows: for one subset $K_s$, there is at least one K1; and in accordance with the parameter K0 of the schedulable element, a slot n−K1−K0 can transmit a PDCCH to schedule PDSCH resources of this schedulable element. For example, in accordance with the configured PDCCH monitoring occasion, there is a PDCCH candidate within the slot n−K1−K0, and the PDSCH of this schedulable element can be scheduled. Here, it can be further required that the DCI type of the PDCCH candidate should be the same as at least one DCI type corresponding to the schedulable element; and/or, it can be further required that the DCI type of the schedulable element is the same as at least one DCI type corresponding to the parameter K1 on a BWP corresponding to the schedulable element. Or, if it is assumed that there are PDSCH resources allocated for the SPS within the slot n−K1, it is not necessary to determine, according to the parameter K0, whether elements in the set T corresponding to the PDSCH resources allocated for the SPS are schedulable.

If PDSCH resources of two schedulable elements in the set T are overlapped completely or partially, it is assumed that the UE does not need to feed back HARQ-ACK information of the two PDSCHs, so that the number of HARQ-ACK occasions to be allocated can be reduced by utilizing this characteristic. Here, it is possible that the base station cannot simultaneously schedule the PDSCH resources of the two elements, or it is also possible that the UE feeds back HARQ-ACK information of only one PDSCH according to a certain preference strategy although the base station simultaneously schedules the PDSCH resources of the two elements. For all schedulable elements in the set T, the total number MK1 of HARQ-ACK occasions to be mapped is determined; and, for each schedulable element, one of the MK1 HARQ-ACK occasions to which this element is mapped is determined. In this method, the MK1 is equal to the maximum number of non-overlapped PDSCH resources among PDSCH resources of all schedulable elements in the set T. In FIG. 4, the MK1 is equal to 2, PDSCH resources 401, 402, 405 and 407 are mapped to a same HARQ-ACK occasion, and the PDSCH resource 406 is mapped to a same HARQ-ACK occasion.

A first method for determining the HARQ-ACK occasion of each PDSCH time resource within one slot is as follows.

Firstly, elements that cannot be scheduled actually are removed from the set T. It can be determined whether one element in the set T is schedulable, according to one of the following conditions: 1) when the first condition and the second condition for the schedulable element are both satisfied, it is considered that the one element is schedulable; 2) when the first condition for the schedulable element is satisfied, it is considered that the one element is schedulable; and, 3) when the second condition for the schedulable element is satisfied, it is considered that the one element is schedulable. Or, as a simplification, it is also possible that no element needs to be removed from the set T. Equivalently, it is considered that all elements are schedulable. Subsequently, for the current set T, the total number MK1 of HARQ-ACK occasions to be mapped is determined; and for each element, one of the MK1 HARQ-ACK occasions to which this element is mapped is determined.

For example, the following method is employed:
1) the counter h of HARQ-ACK occasions is initialized as 0;
2) for the current set T, the minimum index of an ending OFDM symbol of the PDSCH represented by each element is determined as E;
3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; and
4) h=h+1; if the current set T is not null, the process proceeds to 2); or otherwise, MK1=h, and the process ends.

Or, the following equivalent method is employed:
1) the counter h of HARQ-ACK occasions is initialized as 0;
2) the minimum index of an ending OFDM symbol of the PDSCH represented by each element in the current set T, which has been not yet allocated with any HARQ-ACK occasion, is determined as E;
3) for one element in the set T which has been not yet allocated with any HARQ-ACK occasion, if the index of the starting OFDM symbol of the PDSCH represented by the one element is recorded as S and S≤E, the PDSCH represented by the one element is mapped to an HARQ-ACK occasion h; and the step 3) is repeated until all elements satisfying S≤E are processed; and
4) h=h+1; if not all elements in the current set T have been processed, the process proceeds to 2); or otherwise, MK1=h, and the process ends.

A second method for determining the HARQ-ACK occasion of each PDSCH time resource within one slot is as follows.

Firstly, schedulable elements in the set T are determined. It can be determined whether one element in the set T is schedulable, according to one of the following conditions: 1) when the first condition and the second condition for the schedulable element are both satisfied, it is considered that the one element is schedulable; 2) when the first condition for the schedulable element is satisfied, it is considered that the one element is schedulable; and, 3) when the second condition for the schedulable element is satisfied, it is considered that the one element is schedulable. Subsequently, for the set T, the total number MK1 of HARQ-ACK occasions to be mapped is determined; and for each element, one of the MK1 HARQ-ACK occasions to which this element is mapped is determined.

For example, the following method is employed:
1) the counter h of HARQ-ACK occasions is initialized as 0;
2) for the current set T, the minimum index of an ending OFDM symbol of the PDSCH represented by each schedulable element is determined as E;
3) for one schedulable element in the current set T, if the index of the starting OFDM symbol of the PDSCH represented by this schedulable element is recorded as S and S≤E, the PDSCH represented by the one element is mapped to an HARQ-ACK occasion h; the one element is removed from the current set T; and the step 3) is repeated until all schedulable elements satisfying S≤E are processed; and
4) h=h+1; if there are still schedulable elements in the current set T, the process proceeds to 2); or otherwise, MK1=h, and the process ends.

Or, the following equivalent method is employed:
1) the counter h of HARQ-ACK occasions is initialized as 0;
2) the minimum index of an ending OFDM symbol of a PDSCH represented by each schedulable element in the set T, which has been not yet allocated with any HARQ-ACK occasion, is determined as E;
3) for one schedulable element in the set T which has been not yet allocated with any HARQ-ACK occasion, if the index of the starting OFDM symbol of the PDSCH represented by the one element is recorded as S and S≤E, the PDSCH represented by the one element is mapped to an HARQ-ACK occasion h; and the step 3) is repeated until all schedulable elements satisfying S≤E are processed; and
4) h=h+1; if not all schedulable elements in the current set T have been processed, the process proceeds to 2); or otherwise, MK1=h, and the process ends.

A third method for determining the HARQ-ACK occasion of each PDSCH time resource within one slot is as follows.

For the set T, the total number MK of HARQ-ACK occasions to be mapped is determined; and for each element, one of the MK HARQ-ACK occasions to which this element is mapped is determined.

For example, the following method is employed:
1) the counter h of HARQ-ACK occasions is initialized as 0;
2) for the current set T, the minimum index of an ending OFDM symbol of the PDSCH represented by each element is determined as E;
3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; and
4) h=h+1; if the current set T is not null, the process proceeds to 2); or otherwise, MK=h, and the process ends.

Or, the following equivalent method is employed:
1) the counter h of HARQ-ACK occasions is initialized as 0;
2) the minimum index of an ending OFDM symbol of a PDSCH represented by each element in the set T, which has been not yet allocated with any HARQ-ACK occasion, is determined as E;

3) for one element in the set T which has been not yet allocated with any HARQ-ACK occasion, if the index of the starting OFDM symbol of the PDSCH represented by the one element is recorded as S and S≤E, the PDSCH represented by the one element is mapped to an HARQ-ACK occasion h; and the step 3) is repeated until all elements satisfying S≤E are processed; and 4) h=h+1; if not all elements in the set T have been processed, the process proceeds to 2); or otherwise, MK=h, and the process ends.

After the step 4) has been executed, if the maximum value of the index of the HARQ-ACK occasion of a schedulable element in the set T is recorded as hmax, the total number MK1 of HARQ-ACK occasions to be mapped within one slot n−K1 is equal to hmax+1. Or, after the step 4) has been executed, the MK1 is equal to the number of HARQ-ACK occasions actually possibly occupied by the schedulable elements in the set T, and the HARQ-ACK occasions actually possibly occupied by the schedulable elements in the set T are re-sequenced according to the new order of their indexes. Here, it can be determined whether one element in the set T is schedulable, according to one of the following conditions: 1) when the first condition and the second condition for the schedulable element are both satisfied, it is considered that the one element is schedulable; 2) when the first condition for the schedulable element is satisfied, it is considered that the one element is schedulable; and, 3) when the second condition for the schedulable element is satisfied, it is considered that the one element is schedulable.

Several preferred flows of the present invention have been described above. Actually, the specific form of the flow should not be limited in the present invention, and any flow having the same effect or essence as the above method shall fall into the scope of the present invention.

Based on any one of the above preferred flows and in accordance with the set T which contains only the time resource table for the DCI of type 2, an HARQ-ACK occasion is determined; and then, one HARQ-ACK occasion determined according to the time resource table for the DCI of type 2 to which one row in the time resource table for DCI of type 1 is mapped is determined. Or, if it is assumed that the DCI of type 1 and the DCI of type 2 in the USS use a same time resource table, HARQ-ACK occasions for the DCI of type 1 and the DCI of type 2 in the USS are determined in accordance with the set T which contains the same time resource table; and then, one of the determined HARQ-ACK occasions to which one row in the time resource table for DCI of type 1 in the CCS is mapped is determined.

Or, based on any one of the above preferred flows, during the determination of the HARQ-ACK occasion for the set T based on the time resource table for the DCI of type 2, one HARQ-ACK occasion to which one row in the time resource table for DCI of type 1 is mapped can be determined in the step 3). For example, it is based on the first method for determining HARQ-ACK occasions of PDSCH time resources within slots:

1) the counter h of HARQ-ACK occasions is initialized as 0;

2) for the current set T, the minimum index of an ending OFDM symbol of the PDSCH represented by each element is determined as E;

3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; for one element in the time resource table for the DCI of type 1, if the index of the starting OFDM symbol of the PDSCH represented by this element is recorded as S1 and S1≤E, the PDSCH represented by the one element is mapped to an HARQ-ACK occasion h; and the step 3) is repeated until all elements satisfying S1≤E are processed; and 4) h=h+1; if the current set T is not null, the process proceeds to 2); or otherwise, MK1=h, and the process ends.

Or, if it is assumed that the DCI of type 1 and the DCI of type 2 in the USS use a same time resource table, based on any one of the above preferred flows, when the HARQ-ACK occasions for the DCI of type 1 and the DCI of type 2 in the USS are determined in accordance with the set T which contains the same time resource table, one HARQ-ACK occasion to which one row in the time resource table for DCI of type 1 in the CCS is mapped can be determined in the step 3). For example, it is based on the first method for determining HARQ-ACK occasions of PDSCH time resources within slots:

1) the counter h of HARQ-ACK occasions is initialized as 0;

2) for the current set T, the minimum index of an ending OFDM symbol of the PDSCH represented by each element is determined as E;

3) for one element in the current set T, if the index of the starting OFDM symbol of the PDSCH represented by this element is recorded as S and S≤E, the PDSCH represented by the one element is mapped to an HARQ-ACK occasion h; the one element is removed from the current set T; and the step 3) is repeated until all elements satisfying S≤E are processed; for one element in the time resource table for the DCI of type 1, if the index of the starting OFDM symbol of the PDSCH represented by this element is recorded as S1 and S1≤E, the PDSCH represented by the one element is mapped to an HARQ-ACK occasion h; and the step 3) is repeated until all elements satisfying S1≤E are processed; and 4) h=h+1; if the current set T is not null, the process proceeds to 2); or otherwise, MK1=h, and the process ends.

Based on any one of the above preferred flows and in accordance with the maximum number C of PDSCHs which can be received by the UE within one slot, the total number of HARQ-ACK occasions to be actually allocated within one slot can be min(MK1,C). The parameter C can be determined by the capability of the UE to receive the maximum number of PDSCHs within one slot, or the C can be semi-statically configured by a higher layer.

When the MK1 is less than or equal to C, in accordance with the above preferred flows, the MK1 HARQ occasions are mapped to MK1 HARQ-ACK occasions.

When the MK1 is greater than C, the MK1 HARQ occasions need to be mapped to C HARQ-ACK occasions. Multiple HARQ-ACK occasions among the MK1 HARQ-ACK occasions are mapped to a same one of the C HARQ-ACK occasions. For example, the $c^{th}$ HARQ occasion among the C HARQ-ACK occasions corresponds to the HARQ-ACK occasion $$\left\lfloor \frac{MK1}{c} \cdot c \right\rfloor \le h < \left\lfloor \frac{MK1}{c} + (c+1) \right\rfloor$$

among the MK1 HARQ-ACK occasions, where c=0, 1, ... C−1 and his an index of one occasion among the MK1

HARQ-ACK occasions. Or, the $c^{th}$ HARQ occasion among the C HARQ-ACK occasions corresponds to the HARQ-ACK occasion h=C·p+c among the MK1 HARQ-ACK occasions, where p=0, 1, . . . . .

Or, a DAI field can be contained in the DCI, so that sequencing is performed according to the value of the DAI. The UE can sequence the HARQ-ACK information within one slot according to the DAI, and the total number of HARQ-ACK occasions allocated within the one slot is min(MK1,C) Or, the UE can also sequence the HARQ-ACK information within slots corresponding to the set K according to the DAI, and the total number of HARQ-ACK occasions allocated within slots corresponding to the set K is equal to the sum of the number of HARQ-ACK occasions allocated within each slot corresponding to the set K.

In the method, when it is configured that only one PDSCH is mapped to one slot, MK1 HARQ-ACK occasions of one slot n−K1 are determined by the method; when it is configured that one PDSCH spans over N slots, at most one HARQ-ACK occasion is allocated to one slot n−K1. If there are schedulable elements in the set T, the parameter MK1 is 1; or otherwise, the parameter MK1 is 0.

Generally, for one slot n−K1, it is possible that at most one HARQ-ACK occasion is allocated so that the feedback overhead is reduced as far as possible. If there are schedulable elements in the set T, the parameter MK1 is 1; or otherwise, the parameter MK1 is 0.

The maximum number of PDSCHs which can be received by the UE within one slot is recorded as C, and the method for allocating HARQ-ACK occasions may be selected according to the parameter C. If the parameter C is equal to 1, for one slot, at most one PDSCH may be scheduled; correspondingly, the one slot may correspond to at most one HARQ-ACK occasion. The HARQ-ACK is determined, for example, by the method for allocating at most one HARQ-ACK occasion. However, if the parameter C is greater than 1, for one slot, multiple HARQ-ACK occasions may be allocated. For example, the HARQ-ACK occasion is determined according to the number of PDSCHs of non-overlapped elements in the time domain. In this case, even if C is less than the number of HARQ-ACK occasions within one slot, the HARQ-ACK is still determined according to the number of HARQ-ACK occasions within one slot; or, only C HARQ-ACK occasions may be allocated according to the method. When it is configured that one PDSCH spans over N slots, at most one HARQ-ACK occasion may be allocated to one slot n−K1.

In the various embodiments of this embodiment, one HARQ-ACK occasion is not related to the PDSCH type of schedulable elements in the set T, and Y HARQ-ACK bits are allocated. For one BWP, Y is the number of HARQ-ACK bits of the configured PDSCHs. When multiple BWPs are configured, Y can be the maximum value of the number of HARQ-ACK bits of PDSCHs configured on the multiple BWPs.

Or, in the various methods in this embodiment, if it is assumed that all elements in the set T employ the same PDSCH type, for the one HARQ-ACK occasion, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits configured for this PDSCH type on the multiple BWPs.

Or, in the various methods in this embodiment, if all elements in the set T employ the PDSCH type A, YA HARQ-ACK bits are allocated to one HARQ-ACK occasion; if all elements in the set T employ the PDSCH type B, YB HARQ-ACK bits are allocated to one HARQ-ACK occasion; and, if the elements in the set T employ both the PDSCH type A and the PDSCH type B, Y HARQ-ACK bits are allocated to one HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits configured for the PDSCH type A on the multiple BWPs, YB can be the maximum value of the number of HARQ-ACK bits configured for the PDSCH type B on the multiple BWPs, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, for one HARQ-ACK occasion, Y can be the maximum value of the number of HARQ-ACK bits of PDSCHs configured on BWPs of all elements mapped to this HARQ-ACK occasion in the set T.

Or, in the various methods in this embodiment, for one HARQ-ACK occasion, if all elements mapped to this HARQ-ACK occasion in the set T employ the PDSCH type A, YA HARQ-ACK bits are allocated to this HARQ-ACK occasion; if all elements mapped to this HARQ-ACK occasion in the set T employ the PDSCH type B, YB HARQ-ACK bits are allocated to this HARQ-ACK occasion; and, if the elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, for one HARQ-ACK occasion, YA can be the maximum value of the number of HARQ-ACK bits configured for BWPs of all elements of the PDSCH type A mapped to this HARQ-ACK occasion in the set T, YB can be the maximum value of the number of HARQ-ACK bits configured for BWPs of all elements of the PDSCH type B mapped to this HARQ-ACK occasion in the set T, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, Y can be the maximum value of the number of HARQ-ACK bits of PDSCHs configured on BWPs of all schedulable elements in the set T.

Or, in the various methods in this embodiment, if it is assumed that all schedulable elements in the set T employ the same PDSCH type, for the one HARQ-ACK occasion, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits of PDSCHs configured on BWPs of all schedulable elements of this PDSCH type in the set T.

Or, in the various methods in this embodiment, if all schedulable elements in the set T employ the PDSCH type A, YA HARQ-ACK bits are allocated to one HARQ-ACK occasion; if all schedulable elements in the set T employ the PDSCH type B, YB HARQ-ACK bits are allocated to one HARQ-ACK occasion; and, if the schedulable elements in the set T employ both the PDSCH type A and the PDSCH type B, Y HARQ-ACK bits are allocated to one HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits of PDSCHs configured on BWPs of all schedulable elements of the PDSCH type A in the set T, YB can be the maximum value of the number of HARQ-ACK bits of PDSCHs configured on BWPs of all schedulable elements of the PDSCH type B in the set T, and Y is the larger one of the YA and YB.

Or, in the various methods in this embodiment, for the set T, Y HARQ-ACK bits are allocated to one HARQ-ACK occasion. For one BWP, Y is the number of HARQ-ACK bits of the configured PDSCHs. When multiple BWPs are configured, for one HARQ-ACK occasion, Y can be the maximum value of the number of HARQ-ACK bits of PDSCHs configured on BWPs of all schedulable elements mapped to this HARQ-ACK occasion in the set T.

Or, in the various methods in this embodiment, for one HARQ-ACK occasion, if all schedulable elements mapped to this HARQ-ACK occasion in the set T employ the PDSCH type A, YA HARQ-ACK bits are allocated to this HARQ-ACK occasion; if all schedulable elements mapped to this HARQ-ACK occasion in the set T employ the PDSCH type B, YB HARQ-ACK bits are allocated to this HARQ-ACK occasion; and, if the schedulable elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, for one HARQ-ACK occasion, YA can be the maximum value of the number of HARQ-ACK bits of PDSCHs configured on BWPs of all schedulable elements of the PDSCH type A mapped to this HARQ-ACK occasion in the set T, YB can be the maximum value of the number of HARQ-ACK bits of PDSCHs configured on BWPs of all schedulable elements of the PDSCH type B mapped to this HARQ-ACK occasion in the set T, and Y is the larger one of the YA and YB.

Or, in the various methods in this embodiment, in accordance with the configured PDCCH monitoring occasion, if all schedulable elements in the set T correspond to the DCI of type 1, one HARQ-ACK bit is allocated to this HARQ-ACK occasion; or otherwise, Y HARQ-ACK bits are allocated to this HARQ-ACK occasion. For one BWP, Y is the number of HARQ-ACK bits of the configured PDSCH. When multiple BWPs are configured, Y can be the maximum value of the number of HARQ-ACK bits of the PDSCH configured on BWPs corresponding to all schedulable elements. Or, in the various methods in this embodiment, in accordance with the configured PDCCH monitoring occasion, if all schedulable elements in the set T correspond to the DCI of type 1, one HARQ-ACK bit is allocated to this HARQ-ACK occasion. Or, otherwise, if it is assumed that all schedulable elements in the set T employ the same PDSCH type, for one BWP, the number of HARQ-ACK bits of the one HARQ-ACK occasion is determined according to this PDSCH type. When multiple BWPs are configured, the number of HARQ-ACK bits can be allocated according to the maximum value of the number of HARQ-ACK bits of PDSCHs configured on BWPs of all schedulable elements of this PDSCH type in the set T.

Or, in the various methods in this embodiment, in accordance with the configured PDCCH monitoring occasion, if all schedulable elements in the set T correspond to the DCI of type 1, one HARQ-ACK bit is allocated to this HARQ-ACK occasion; or otherwise, the number of HARQ-ACK bits of this HARQ-ACK occasion is determined according to the PDSCH type. If all schedulable elements in the set T employ the PDSCH type A, YA HARQ-ACK bits are allocated to this HARQ-ACK occasion; if all schedulable elements in the set T employ the PDSCH type B, YB HARQ-ACK bits are allocated to this HARQ-ACK occasion; and, if the schedulable elements in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits of PDSCHs configured on BWPs of all schedulable elements of the PDSCH type A in the set T, YB can be the maximum value of the number of HARQ-ACK bits of PDSCHs configured on BWPs of all schedulable elements of the PDSCH type B in the set T, and Y is the larger one of the YA and YB.

Or, in the various methods in this embodiment, for one HARQ-ACK occasion, in accordance with the configured PDCCH monitoring occasion, if all schedulable elements in the set T mapped to the one HARQ-ACK occasion correspond to the DCI of type 1, one HARQ-ACK bit is allocated to the one HARQ-ACK occasion; or otherwise, Y HARQ-ACK bits are allocated to the one HARQ-ACK occasion. For one BWP, Y is the number of HARQ-ACK bits of the configured PDSCHs. When multiple BWPs are configured, Y can be the maximum value of the number of HARQ-ACK bits of PDSCHs configured on BWPs of all schedulable elements mapped to the one HARQ-ACK occasion in the set T.

Or, in the various methods in this embodiment, for one HARQ-ACK occasion, in accordance with the configured PDCCH monitoring occasion, if all schedulable elements in the set T mapped to the one HARQ-ACK occasion correspond to the DCI of type 1, one HARQ-ACK bit is allocated to the one HARQ-ACK occasion; or, if it is assumed that all elements in the set T employ the same PDSCH type, for one BWP, the number of HARQ-ACK bits of the one HARQ-ACK occasion is determined according to this PDSCH type. When multiple BWPs are configured, Y can be the maximum value of the number of HARQ-ACK bits of PDSCHs configured on BWPs of all schedulable elements mapped to this HARQ-ACK occasion in the set T.

Or, in the various methods in this embodiment, for one HARQ-ACK occasion, in accordance with the configured PDCCH monitoring occasion, if all schedulable elements in the set T mapped to this HARQ-ACK occasion correspond to the DCI of type 1, one HARQ-ACK bit is allocated to this HARQ-ACK occasion; or otherwise, the number of HARQ-ACK bits of this HARQ-ACK occasion is determined according to the PDSCH type. For this HARQ-ACK occasion, if all schedulable elements mapped to this HARQ-ACK occasion in the set T employ the PDSCH type A, YA HARQ-ACK bits are allocated to this HARQ-ACK occasion; if all schedulable elements mapped to this HARQ-ACK occasion in the set T employ the PDSCH type B, YB HARQ-ACK bits are allocated to this HARQ-ACK occasion; and, if the schedulable elements mapped to this HARQ-ACK occasion in the set T employ both the PDSCH type A and the PDSCH type B, Y HARQ-ACK bits are allocated to this HARQ-ACK occasion. For one BWP, YA is the number of HARQ-ACK bits configured for the PDSCH type A, YB is the number of HARQ-ACK bits configured for the PDSCH type B, and Y is the larger one of the YA and YB. When multiple BWPs are configured, YA can be the maximum value of the number of HARQ-ACK bits of PDSCHs configured on BWPs of all schedulable elements of the PDSCH type A mapped to the one HARQ-ACK occasion in the set T, YB can be the maximum value of the number of HARQ-ACK bits of PDSCHs configured on BWPs of all schedulable elements of the PDSCH type B mapped to the one HARQ-ACK occasion in the set T, and Y is the larger one of the YA and YB.

In addition, as a special implementation, the maximum number of PDSCHs which can be received by the UE within one slot is recorded as C. If the parameter C is equal to 1, for one slot, only one PDSCH may be scheduled; and, the one slot may only correspond to only one HARQ-ACK occasion. The HARQ-ACK can be determined, for example, by an implementation in Embodiment 3 when X=1, i.e. the method for allocating at most one HARQ-ACK occasion. However, if the parameter C is greater than 1, the HARQ-ACK is determined by the method for determining multiple HARQ-ACK occasions within one slot in the present invention. For example, the HARQ-ACK occasion is determined according to the number of PDSCHs of non-overlapped elements in the time domain in Embodiment 5. In this case, even if C is less than the number of HARQ-ACK occasions within one slot, the HARQ-ACK is still determined according to the number of HARQ-ACK occasions within one slot. When it is configured that one PDSCH spans over N slots, at most one HARQ-ACK occasion may be allocated to one slot n−K1.

Corresponding to the method, the present application further discloses an equipment, which can be used to implement the above method. As shown in FIG. 5, the equipment includes a PDCCH and PDSCH receiving module, a slot HARQ-ACK information generating module, an HARQ-ACK codebook generating module and an HARQ-ACK transmitting module, wherein:

the PDCCH and PDSCH receiving module is configured to monitor a PDCCH and receive a PDSCH scheduled by the PDCCH;

the slot HARQ-ACK information generating module is configured to determine, for one slot of one carrier and according to a configured slot pattern and a configured PDCCH monitoring occasion, the HARQ-ACK occasion and the number of HARQ-ACK bits occupied by the one slot;

the HARQ-ACK codebook generating module is configured to generate, by a UE, an HARQ-ACK codebook according to the HARQ-ACK occasion and the number of HARQ-ACK bits occupied by the one slot; and the HARQ-ACK transmitting module is configured to transmit HARQ-ACK information.

It can be understood by a person of ordinary skilled in the art that all of or a part of steps in the embodiment methods can be implemented by instructing related hardware by programs. The programs can be stored in a computer-readable storage medium, and, when executed, include one or a combination of the steps of the method embodiments.

In addition, each functional unit in each embodiment of the present application can be integrated into a processing module; or, each unit can exist alone physically; or, two or more units can be integrated into one module. The integrated module can be implemented in the form of hardware, or can be implemented in the form of a software functional module. If the integrated module is implemented in the form of a software functional module and sold or used as an independent product, the integrated module can also be stored in a computer-readable storage medium.

The storage medium mentioned above can be a read-only memory, a magnetic disk, an optical disk, etc.

The forgoing description merely shows preferred embodiments of the present application and is not intended to limit the present application. Any modification, equivalent replacement or improvement made within the spirit and principle of the present application shall fall into the protection scope of the present application.

The invention claimed is:

1. A method performed by a terminal in a communication system, the method comprising:
    receiving, from a base station, configuration information on lists of physical downlink shared channel (PDSCH) time resources, each of the PDSCH time resources including information on a slot offset between a PDSCH and downlink control information (DCI) and information on a starting symbol and a number of symbols;
    receiving, from the base station, the DCI on a physical downlink control channel (PDCCH);
    receiving, from the base station, data based on a PDSCH reception occasion, the PDSCH reception occasion being identified based on reception time of the DCI and the configuration information;
    identifying, based on the DCI, a hybrid automatic repeat request-acknowledgement (HARQ-ACK) occasion;
    generating HARQ-ACK information based on reception of the data, the HARQ-ACK information being determined based on the PDSCH reception occasion, wherein a PDSCH time resource including an uplink symbol is removed from the PDSCH reception occasion; and
    transmitting the HARQ-ACK information based on the HARQ-ACK occasion.

2. The method of claim 1, wherein, in case that a starting symbol index of at least one of the PDSCH time resources is smaller than a smallest last symbol index of the PDSCH time resources, the at least one of the PDSCH time resources is removed from the PDSCH reception occasion.

3. The method of claim 1, wherein the configuration information includes slot timing values, and
    wherein the DCI includes information indicating a slot timing value for the HARQ-ACK occasion.

4. The method of claim 3, wherein, in case that the configuration information includes first slot timing values associated with a first type DCI and second slot timing values associated with a second type DCI, the slot timing value is determined based on a union of the first slot timing values and the second slot timing values.

5. A method performed by a base station in a communication system, the method comprising:
    transmitting, to a terminal, configuration information on lists of physical downlink shared channel (PDSCH) time resources, each of the PDSCH time resources including information on a slot offset between a PDSCH and downlink control information (DCI) and information on a starting symbol and a number of symbols;
    transmitting, to the terminal, the DCI on a physical downlink control channel (PDCCH);

transmitting, to the terminal, data based on a PDSCH reception occasion, the PDSCH reception occasion being identified based on transmission time of the DCI and the configuration information; and receiving, from the terminal, hybrid automatic repeat request-acknowledgement (HARQ-ACK) information in an HARQ-ACK occasion, the HARQ-ACK information being determined based on the PDSCH reception occasion, wherein a PDSCH time resource including an uplink symbol is removed from the PDSCH reception occasion.

6. The method of claim 5, wherein, in case that a starting symbol index of at least one of the PDSCH time resources is smaller than a smallest last symbol index of the PDSCH time resources, the at least one of the PDSCH time resources is removed from the PDSCH reception occasion.

7. The method of claim 5, wherein the configuration information includes slot timing values, and
wherein the DCI includes information indicating a slot timing value for the HARQ-ACK occasion.

8. The method of claim 7, wherein, in case that the configuration information includes first slot timing values associated with a first type DCI and second slot timing values associated with a second type DCI, the slot timing value is determined based on a union of the first slot timing values and the second slot timing values.

9. A terminal in a communication system, the terminal comprising:
a transceiver; and
a controller coupled with the transceiver and configured to:
receive, from a base station, configuration information on lists of physical downlink shared channel (PDSCH) time resources, each of the PDSCH time resources including information on a slot offset between a PDSCH and downlink control information (DCI) and information on a starting symbol and a number of symbols,
receive, from the base station, the DCI on a physical downlink control channel (PDCCH),
receive, from the base station, data based on a PDSCH reception occasion, the PDSCH reception occasion being identified based on reception time of the DCI and the configuration information,
identify, based on the DCI, a hybrid automatic repeat request-acknowledgement (HARQ-ACK) occasion,
generate HARQ-ACK information based on reception of the data, the HARQ-ACK information being determined based on the PDSCH reception occasion,
wherein a PDSCH time resource including an uplink symbol is removed from the PDSCH reception occasion, and
transmit the HARQ-ACK information based on the HARQ-ACK occasion.

10. The terminal of claim 9, wherein, in case that a starting symbol index of at least one of the PDSCH time resources is smaller than a smallest last symbol index of the PDSCH time resources, the at least one of the PDSCH time resources is removed from the PDSCH reception occasion.

11. The terminal of claim 9, wherein the configuration information includes slot timing values, and
wherein the DCI includes information indicating a slot timing value for the HARQ-ACK occasion.

12. The terminal of claim 11, wherein, in case that the configuration information includes first slot timing values associated with a first type DCI and second slot timing values associated with a second type DCI, the slot timing value is determined based on a union of the first slot timing values and the second slot timing values.

13. A base station in a communication system, the base station comprising:
a transceiver; and
a controller coupled with the transceiver and configured to:
transmit, to a terminal, configuration information on lists of physical downlink shared channel (PDSCH) time resources, each of the PDSCH time resources including information on a slot offset between a PDSCH and downlink control information (DCI) and information on a starting symbol and a number of symbols,
transmit, to the terminal, the DCI on a physical downlink control channel (PDCCH),
transmit, to the terminal, data based on a PDSCH reception occasion, the PDSCH reception occasion being identified based on transmission time of the DCI and the configuration information, and
receive, from the terminal, hybrid automatic repeat request-acknowledgement (HARQ-ACK) information in an HARQ-ACK occasion, the HARQ-ACK information being determined based on the PDSCH reception occasion,
wherein a PDSCH time resource including an uplink symbol is removed from the PDSCH reception occasion.

14. The base station of claim 13, wherein, in case that a starting symbol index of at least one of the PDSCH time resources is smaller than a smallest last symbol index of the PDSCH time resources, the at least one of the PDSCH time resources is removed from the PDSCH reception occasion.

15. The base station of claim 13, wherein the configuration information includes slot timing values,
wherein the DCI includes information indicating a slot timing value for the HARQ-ACK occasion, and
wherein in case that the configuration information includes first slot timing values associated with a first type DCI and second slot timing values associated with a second type DCI, the slot timing value is determined based on a union of the first slot timing values and the second slot timing values.

* * * * *